United States Patent
Ito et al.

(10) Patent No.: US 12,365,204 B2
(45) Date of Patent: Jul. 22, 2025

(54) PNEUMATIC TIRE AND METHOD FOR MANUFACTURING PNEUMATIC TIRE

(71) Applicants: The Yokohama Rubber Co., LTD., Kanagawa (JP); SHANDONG XINGDA TYRE CO. LTD., Shandong (CN)

(72) Inventors: Takanori Ito, Kanagawa (JP); Hiroaki Honda, Kanagawa (JP); Mari Shimizu, Kanagawa (JP); Mingquan Wang, Shandong (CN); Feng Gao, Shandong (CN); Jingwei Huang, Shandong (CN); Niancun Wang, Shandong (CN); Yulong Li, Shandong (CN); Jiang Wu, Shandong (CN); Xiquan Jia, Shandong (CN); Yuchao Jiao, Shandong (CN)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/548,173

(22) PCT Filed: Mar. 2, 2021

(86) PCT No.: PCT/CN2021/078721
§ 371 (c)(1),
(2) Date: Aug. 28, 2023

(87) PCT Pub. No.: WO2022/183377
PCT Pub. Date: Sep. 9, 2022

(65) Prior Publication Data
US 2024/0034101 A1 Feb. 1, 2024

(51) Int. Cl.
*B60C 15/04* (2006.01)

(52) U.S. Cl.
CPC ........ *B60C 15/04* (2013.01); *B60C 2015/046* (2013.01); *B60C 2015/048* (2013.01)

(58) Field of Classification Search
CPC .............. B60C 2015/048; B60C 15/06; B60C 15/0603; B60C 15/0607; B60C 2015/061; B60C 2009/0491
See application file for complete search history.

(56) References Cited

U.S. PATENT DOCUMENTS

| 10,723,180 B2 | 7/2020 | Tatsumi |
| 11,040,580 B2 | 6/2021 | Kouda et al. |

(Continued)

FOREIGN PATENT DOCUMENTS

| CN | 105793071 A | 7/2016 |
| CN | 107804122 A | 3/2018 |

(Continued)

OTHER PUBLICATIONS

Machine Translation: JP-2006199221-A, Kawakami K, (Year: 2024).*

(Continued)

*Primary Examiner* — Kendra Ly
(74) *Attorney, Agent, or Firm* — Thorpe North & Western

(57) ABSTRACT

In a pneumatic tire, a bead core has end portions in a tire width direction formed as vertical lines along a tire radial direction. A length of the vertical lines is from 20% to 30% of a core height. In two adjacent bead core layers of first, second and third layers, the radial outer layer tire includes two or more bead cores more than the radially inner layer tire, and a misalignment amount between the bead wires each at an end portion on one side in the tire width direction is one-half of a bead wire thickness. A side on which the misalignment amount between the first and second layer bead wires is one-half of the thickness of the bead wire is opposite in the tire width direction to a side on which the misalignment amount between the second and third layer bead wires is one-half of the thickness of the bead wire.

41 Claims, 25 Drawing Sheets

(56) References Cited

U.S. PATENT DOCUMENTS

| | | | |
|---|---|---|---|
| 11,413,909 B2 | 8/2022 | Akashi | |
| 2009/0056851 A1* | 3/2009 | Maruoka | B60C 15/06 152/543 |
| 2012/0211138 A1 | 8/2012 | Johnson et al. | |
| 2013/0220506 A1 | 8/2013 | Pottier et al. | |
| 2018/0056719 A1 | 3/2018 | Bishop | |
| 2018/0370295 A1 | 12/2018 | Nishio | |
| 2019/0359011 A1* | 11/2019 | Tauchi | B60C 15/0628 |
| 2020/0156418 A1 | 5/2020 | Nishio | |
| 2020/0369097 A1* | 11/2020 | Tauchi | B60C 15/04 |
| 2020/0376903 A1 | 12/2020 | Kouda et al. | |
| 2021/0107321 A1* | 4/2021 | Tauchi | B60C 15/024 |
| 2022/0324269 A1 | 10/2022 | Reix et al. | |

FOREIGN PATENT DOCUMENTS

| | | | | |
|---|---|---|---|---|
| CN | 108367637 A | | 8/2018 | |
| CN | 111699097 A | | 9/2020 | |
| CN | 111712388 A | | 9/2020 | |
| CN | 111936327 A | | 11/2020 | |
| CN | 114302813 A | | 4/2022 | |
| FR | 3029844 A1 | * | 6/2016 | B60C 15/04 |
| JP | 02256503 A | * | 10/1990 | D07B 1/0666 |
| JP | H09-240223 A | | 9/1997 | |
| JP | H09254611 A | | 9/1997 | |
| JP | H09254611 A1 | | 9/1997 | |
| JP | 2005088793 A | | 4/2005 | |
| JP | 2006199221 A | * | 8/2006 | |
| JP | 2007-055465 A | | 3/2007 | |
| JP | 2007-55465 A | | 3/2007 | |
| JP | 4243091 B2 | | 3/2009 | |
| JP | 2010006322 A | * | 1/2010 | B60C 15/0607 |
| JP | 2012254736 A | * | 12/2012 | |
| JP | 2014-172412 A | | 9/2014 | |
| JP | 2014237353 A | * | 12/2014 | |
| JP | 2018-34784 A | | 3/2018 | |
| JP | 2018-034784 A | | 3/2018 | |
| JP | 2018079931 A | | 5/2018 | |
| JP | 2018114843 A | | 7/2018 | |
| JP | 2018-118553 A | | 8/2018 | |
| JP | 2019-099056 A | | 6/2019 | |
| JP | 2019-99056 A | | 6/2019 | |
| JP | 2019-151301 A | | 9/2019 | |
| JP | 2020-131873 A | | 8/2020 | |
| JP | 2020163898 A | | 10/2020 | |
| WO | WO-2019155787 A1 | * | 8/2019 | B60C 15/024 |
| WO | WO-2019194257 A1 | * | 10/2019 | B60C 15/00 |

OTHER PUBLICATIONS

Machine Translation: JP-2010006322-A, Ito T, (Year: 2024).*
Machine Translation: JP-2012254736-A, Todoroki D, (Year: 2024).*
Machine Translation: JP-2014237353-A, Maruoka K, (Year: 2024).*
Machine Translation: JP-02256503-A, Fukuoka H, (Year: 2024).*
Machine Translation: FR-3029844-A1, Francia M, (Year: 2024).*

* cited by examiner

| | Conventional Example 1 | Comparative Example 1-1 | Comparative Example 1-2 | Example 1-1 | Example 1-2 | Example 1-3 | Example 1-4 | Example 1-5 | Example 1-6 |
|---|---|---|---|---|---|---|---|---|---|
| The bead core has vertical lines on the innermost side and the outermost side in the tyre width direction. | × | ○ | ○ | ○ | ○ | ○ | ○ | ○ | ○ |
| Ratio of vertical line length CV to core height CH | No | 15% | 35% | 20% | 30% | 30% | 30% | 30% | 30% |
| Ratio of distance Va from bead core bottom surface to inner end portion of vertical line to core height CH | No | 45% | 25% | 40% | 40% | 30% | 30% | 30% | 30% |
| In adjacent layers in the radial direction from the first layer to the third layer of the bead core, the number of wires on the outer side in the radial direction is larger by two or more. | × | ○ | ○ | ○ | ○ | ○ | ○ | ○ | ○ |
| From the first layer to the third layer of the bead core, the misalignment amount between the bead wires at each end portion on one side is one-half of the thickness of the bead wire. | × | ○ | ○ | ○ | ○ | ○ | ○ | ○ | ○ |
| Ratio of width CBW of bead core bottom surface to maximum width CW of bead core | 48% | 48% | 48% | 48% | 48% | 48% | 32% | 45% | 35% |
| Ratio of distance Vb between vertical line on inner side and bead core top surface end portion to maximum width CW of bead core | 45% | 45% | 45% | 45% | 45% | 45% | 45% | 45% | 45% |
| Ratio of distance Vc between vertical line on inner side and bead core bottom surface end portion to maximum width CW of bead core | 45% | 45% | 45% | 45% | 45% | 45% | 45% | 45% | 45% |
| Ratio of maximum width CW of bead core to core height CH | 1.4 times | 1.4 times | 1.4 times | 1.4 times | 1.4 times | 1.4 times | 1.4 times | 1.4 times | 1.4 times |
| Carcass damage in bead portion | — | 100 | 100 | 107 | 107 | 107 | 107 | 114 | 114 |
| Carcass breakage in bead portion | Yes | No | No | No | No | No | No | No | No |

FIG. 18A

| | Example 1-7 | Example 1-8 | Example 1-9 | Example 1-10 | Example 1-11 | Example 1-12 | Example 1-13 | Example 1-14 | Example 1-15 |
|---|---|---|---|---|---|---|---|---|---|
| The bead core has vertical lines on the innermost side and the outermost side in the tyre width direction. | ○ | ○ | ○ | ○ | ○ | ○ | ○ | ○ | ○ |
| Ratio of vertical line length CV to core height CH | 30% | 30% | 30% | 30% | 30% | 30% | 30% | 30% | 30% |
| Ratio of distance Va from bead core bottom surface to inner end portion of vertical line to core height CH | 30% | 30% | 30% | 30% | 30% | 30% | 30% | 30% | 30% |
| In adjacent layers in the radial direction from the first layer to the third layer of the bead core, the number of wires on the outer side in the radial direction is larger by two or more. | ○ | ○ | ○ | ○ | ○ | ○ | ○ | ○ | ○ |
| From the first layer to the third layer of the bead core, the misalignment amount between the bead wires at each end portion on one side is one-half of the thickness of the bead wire. | ○ | ○ | ○ | ○ | ○ | ○ | ○ | ○ | ○ |
| Ratio of width CBW of bead core bottom surface to maximum width CW of bead core | 35% | 35% | 35% | 35% | 35% | 35% | 35% | 35% | 35% |
| Ratio of distance Vb between vertical line on inner side and bead core top surface end portion to maximum width CW of bead core | 40% | 22% | 25% | 25% | 25% | 25% | 25% | 25% | 25% |
| Ratio of distance Vc between vertical line on inner side and bead core bottom surface end portion to maximum width CW of bead core | 45% | 45% | 45% | 40% | 22% | 25% | 25% | 25% | 25% |
| Ratio of maximum width CW of bead core to core height CH | 1.4 times | 1.4 times | 1.4 times | 1.4 times | 1.4 times | 1.4 times | 0.8 times | 0.9 times | 1.3 times |
| Carcass damage in bead portion | 123 | 114 | 123 | 133 | 123 | 133 | 133 | 145 | 145 |
| Carcass breakage in bead portion | No | No | No | No | No | No | No | No | No |

FIG. 18B

| | Conventional Example 2 | Example 2-1 | Example 2-2 | Example 2-3 | Example 2-4 | Example 2-5 | Example 2-6 | Example 2-7 |
|---|---|---|---|---|---|---|---|---|
| The bead core has vertical lines on the innermost side and the outermost side in the tyre width direction. | × | ○ | ○ | ○ | ○ | ○ | ○ | ○ |
| Ratio of vertical line length CV to core height CH | No | 20% | 30% | 30% | 30% | 30% | 30% | 30% |
| Ratio of distance Va from bead core bottom surface to inner end portion of vertical line to core height CH | No | 40% | 40% | 30% | 30% | 30% | 30% | 30% |
| In adjacent layers in the radial direction from the first layer to the third layer of the bead core, the number of wires on the outer side in the radial direction is larger by two or more. | × | ○ | ○ | ○ | ○ | ○ | ○ | ○ |
| From the first layer to the third layer of the bead core, the misalignment amount between the bead wires at each end portion on one side is one-half of the thickness of the bead wire. | × | ○ | ○ | ○ | ○ | ○ | ○ | ○ |
| Ratio of distance Db between bead core and carcass cord of turned-up portion to distance Dc between carcass cord of turned-up portion and bead portion outer surface | 5% | 10% | 10% | 10% | 15% | 15% | 15% | 15% |
| Ratio of distance Dd between outermost position in tyre width direction of bead core and bead portion outer surface to width BW of bead base portion | 15% | 15% | 15% | 15% | 15% | 28% | 25% | 20% |
| Ratio of radius of curvature RC of arc of carcass line to radius of curvature RB of arc passing through inner end portion of vertical line of bead core, outer end portion in tyre width direction of bead core bottom surface, and intermediate vertex | - | 0.7 times | 0.7 times | 0.7 times | 0.7 times | 0.7 times | 0.7 times | 0.7 times |
| Modulus of rim cushion rubber | 3.0 MPa | 3.0 MPa | 3.0 MPa | 3.0 MPa | 3.0 MPa | 3.0 MPa | 3.0 MPa | 3.0 MPa |
| Carcass damage in bead portion | - | 107 | 107 | 107 | 107 | 107 | 107 | 107 |
| Carcass breakage in bead portion | Yes | No | No | No | No | No | No | No |
| Air-sealing properties | 100 | 103 | 103 | 103 | 107 | 103 | 105 | 105 |

FIG. 19A

| | Example 2-8 | Example 2-9 | Example 2-10 | Example 2-11 | Example 2-12 | Example 2-13 | Example 2-14 |
|---|---|---|---|---|---|---|---|
| The bead core has vertical lines on the innermost side and the outermost side in the tyre width direction. | ○ | ○ | ○ | ○ | ○ | ○ | ○ |
| Ratio of vertical line length CV to core height CH | 30% | 30% | 30% | 30% | 30% | 30% | 30% |
| Ratio of distance Va from bead core bottom surface to inner end portion of vertical line to core height CH | 30% | 30% | 30% | 30% | 30% | 30% | 30% |
| In adjacent layers in the radial direction from the first layer to the third layer of the bead core, the number of wires on the outer side in the radial direction is larger by two or more. | ○ | ○ | ○ | ○ | ○ | ○ | ○ |
| From the first layer to the third layer of the bead core, the misalignment amount between the bead wires at each end portion on one side is one-half of the thickness of the bead wire. | ○ | ○ | ○ | ○ | ○ | ○ | ○ |
| Ratio of distance Db between bead core and carcass cord of turned-up portion to distance Dc between carcass cord of turned-up portion and bead portion outer surface | 15% | 15% | 15% | 15% | 15% | 15% | 15% |
| Ratio of distance Dd between outermost position in tyre width direction of bead core and bead portion outer surface to width BW of bead base portion | 20% | 20% | 20% | 20% | 20% | 20% | 20% |
| Ratio of radius of curvature RC of arc of carcass line to radius of curvature RB of arc passing through inner end portion of vertical line of bead core, outer end portion in tyre width direction of bead core bottom surface, and intermediate vertex | 1.8 times | 1.0 times | 1.5 times | 1.3 times | 1.3 times | 1.3 times | 1.3 times |
| Modulus of rim cushion rubber | 3.0 MPa | 3.0 MPa | 3.0 MPa | 3.0 MPa | 6.0 MPa | 3.5 MPa | 5.5 MPa |
| Carcass damage in bead portion | 107 | 107 | 107 | 107 | 107 | 107 | 107 |
| Carcass breakage in bead portion | No | No | No | No | No | No | No |
| Air-sealing properties | 105 | 108 | 108 | 108 | 108 | 110 | 110 |

FIG. 19B

| | Conventional Example 3 | Comparative Example 3 | Example 3-1 | Example 3-2 | Example 3-3 | Example 3-4 | Example 3-5 | Example 3-6 | Example 3-7 |
|---|---|---|---|---|---|---|---|---|---|
| The bead core has vertical lines on the innermost side and the outermost side in the tyre width direction. | × | × | ○ | ○ | ○ | ○ | ○ | ○ | ○ |
| Inclination angle θp of carcass body portion | 78° | 78° | 60° | 75° | 68° | 68° | 68° | 68° | 68° |
| Inclination angle θpu of carcass body portion | 73° | 73° | 73° | 73° | 47° | 50° | 70° | 60° | 60° |
| Presence of reinforcing layer | No | Yes | No | No | No | No | No | Yes | Yes |
| Three or more reinforcing layers | - | Three layers | - | - | - | - | - | One layer | Two layers |
| Hrf11/Rh | - | 0.85 | - | - | - | - | - | 0.85 | 0.85 |
| Hrf31/Rh | - | 1.4 | - | - | - | - | - | - | 1.4 |
| Hrf21/Rh | - | 1.2 | - | - | - | - | - | - | - |
| Hrf12/Rh | - | 0.75 | - | - | - | - | - | 0.95 | 0.95 |
| Hrf32/Rh | - | 0.3 | - | - | - | - | - | - | 0.35 |
| Hrf22/Rh | - | 0.15 | - | - | - | - | - | - | - |
| Inclination angle θrf1 of cord included in first reinforcing layer | - | 30° | - | - | - | - | - | 70° | 70° |
| Inclination angle θrf2 of cord included in second reinforcing layer | - | -45° | - | - | - | - | - | - | -70° |
| Inclination angle θrf3 of cord included in third reinforcing layer | - | 45° | - | - | - | - | - | - | - |
| Carcass damage in bead portion | 100 | 106 | 107 | 107 | 107 | 107 | 107 | 107 | 107 |
| Carcass separation resistance | 100 | 106 | 108 | 108 | 108 | 110 | 110 | 111 | 113 |

FIG. 20A

| | Example 3-8 | Example 3-9 | Example 3-10 | Example 3-11 | Example 3-12 | Example 3-13 | Example 3-14 | Example 3-15 | Example 3-16 |
|---|---|---|---|---|---|---|---|---|---|
| The bead core has vertical lines on the innermost side and the outermost side in the tyre width direction. | ◯ | ◯ | ◯ | ◯ | ◯ | ◯ | ◯ | ◯ | ◯ |
| Inclination angle θp of carcass body portion | 68° | 68° | 68° | 68° | 68° | 68° | 68° | 68° | 68° |
| Inclination angle θpu of carcass body portion | 60° | 60° | 60° | 60° | 60° | 60° | 60° | 60° | 60° |
| Presence of reinforcing layer | Yes | Yes | Yes | Yes | Yes | Yes | Yes | Yes | Yes |
| Three or more reinforcing layers | Three layers | Three layers | Three layers | Three layers | Three layers | Three layers | Three layers | Three layers | Three layers |
| Hrf11/Rh | 0.45 | 0.55 | 1.1 | 0.85 | 0.85 | 0.85 | 0.85 | 0.85 | 0.85 |
| Hrf31/Rh | 1.15 | 1.25 | 1.6 | 1.4 | 1.4 | 1.4 | 1.4 | 1.4 | 1.4 |
| Hrf21/Rh | 0.95 | 1.05 | 1.4 | 1.2 | 1.2 | 1.2 | 1.2 | 1.2 | 1.2 |
| Hrf12/Rh | 0.35 | 0.35 | 0.35 | 0.4 | 0.95 | 0.95 | 0.95 | 0.95 | 0.95 |
| Hrf32/Rh | 0.15 | 0.15 | 0.15 | 0.15 | 0.15 | 0.2 | 0.5 | 0.35 | 0.35 |
| Hrf22/Rh | 0.4 | 0.4 | 0.4 | 0.4 | 0.4 | 0.05 | 0.35 | 0.2 | 0.2 |
| Inclination angle θrf1 of cord included in first reinforcing layer | -70° | -70° | -70° | -70° | -70° | -70° | -70° | 20° | 65° |
| Inclination angle θrf2 of cord included in second reinforcing layer | -70° | -70° | -70° | -70° | -70° | -70° | -70° | -20° | -65° |
| Inclination angle θrf3 of cord included in third reinforcing layer | 70° | 70° | 70° | 70° | 70° | 70° | 70° | 20° | 65° |
| Carcass damage in bead portion | 107 | 107 | 107 | 107 | 107 | 107 | 107 | 107 | 107 |
| Carcass separation resistance | 114 | 116 | 116 | 117 | 117 | 118 | 118 | 119 | 119 |

FIG. 20B

| | Conventional Example 4 | Example 4-1 | Example 4-2 | Example 4-3 | Example 4-4 | Example 4-5 | Example 4-6 | Example 4-7 | Example 4-8 |
|---|---|---|---|---|---|---|---|---|---|
| The bead core has vertical lines on the innermost side and the outermost side in the tyre width direction. | × | ○ | ○ | ○ | ○ | ○ | ○ | ○ | ○ |
| BIC/RD | 1.02 | 1.01 | 1.01 | 1.01 | 1.03 | 1.03 | 1.01 | 1.01 | 1.01 |
| CW/BW | 0.57 | 0.52 | 0.52 | 0.52 | 0.52 | 0.52 | 0.52 | 0.52 | 0.52 |
| Including a plurality of tapered portions | ○ | ○ | ○ | ○ | ○ | ○ | ○ | ○ | ○ |
| The inclination angle θt2 of the second tapered portion is larger than the inclination angle θt1 of the first tapered portion. | × | ○ | ○ | ○ | ○ | ○ | ○ | ○ | ○ |
| Compression ratio of rubber located at center position in tyre width direction of bead core bottom surface | 36% | 50% | 50% | 50% | 50% | 50% | 50% | 51% | 52% |
| The bent portion is more on the inner side in the tyre width direction than the center position of the bead core bottom surface. | ○ | ○ | ○ | ○ | ○ | ○ | ○ | ○ | ○ |
| The first reinforcing layer is disposed to extend between the innermost portion and the outermost portion in the tyre width direction of the bead core. | ○ | ○ | ○ | ○ | ○ | ○ | ○ | ○ | ○ |
| The end portion on the inner side in the tyre radial direction of the second reinforcing layer is located more on the inner side in the tyre width direction than the end portion on the inner side in the tyre width direction of the bead core bottom surface, or more on the outer side in the tyre width direction than the end portion on the outer side in the tyre width direction of the bead core bottom surface. | ○ | ○ | ○ | ○ | ○ | ○ | ○ | ○ | ○ |
| Inclination angle θt1 of first tapered portion is 5° or larger. | ○ | × | ○ | ○ | ○ | ○ | ○ | ○ | ○ |
| Inclination angle θt1 of first tapered portion | 20.5° | 4° | 11° | 5° | 11° | 5° | 10° | 7° | 7° |
| Inclination angle θt2 of second tapered portion | 30° | 9° | 36° | 36° | 36° | 36° | 36° | 10° | 35° |
| T1/BW | 0.4 | 0.4 | 0.4 | 0.4 | 0.4 | 0.4 | 0.4 | 0.4 | 0.4 |
| T2/BW | 0.6 | 0.6 | 0.6 | 0.6 | 0.6 | 0.6 | 0.6 | 0.6 | 0.6 |
| Carcass damage in bead portion | — | 107 | 107 | 107 | 107 | 107 | 107 | 107 | 107 |
| Air-sealing properties | Air leakage | 100 | 103 | 103 | 105 | 105 | 105 | 105 | 105 |
| Rim slip resistance | Slip | 100 | 103 | 103 | 104 | 104 | 104 | 104 | 105 |

FIG. 21A

| | Example 4-9 | Example 4-10 | Example 4-11 | Example 4-12 | Example 4-13 | Example 4-14 | Example 4-15 | Example 4-16 | Example 4-17 |
|---|---|---|---|---|---|---|---|---|---|
| The bead core has vertical lines on the innermost side and the outermost side in the tyre width direction. | ○ | ○ | ○ | ○ | ○ | ○ | ○ | ○ | ○ |
| BiC/RD | 1.01 | 1.01 | 1.03 | 1.01 | 1.03 | 1.01 | 1.01 | 1.01 | 1.01 |
| CW/BW | 0.52 | 0.52 | 0.45 | 0.45 | 0.52 | 0.52 | 0.52 | 0.52 | 0.52 |
| Including a plurality of tapered portions | ○ | ○ | ○ | ○ | ○ | ○ | ○ | ○ | ○ |
| The inclination angle θt2 of the second tapered portion is larger than the inclination angle θt1 of the first tapered portion. | | | | | | | | | |
| Compression ratio of rubber located at center position in tyre width direction of bead core bottom surface | 53% | 54% | 36% | 36% | 36% | 36% | 40% | 45% | 50% |
| The bent portion is more on the inner side in the tyre width direction than the center position of the bead core bottom surface. | ○ | ○ | ○ | ○ | ○ | ○ | ○ | ○ | ○ |
| The first reinforcing layer is disposed to extend between the innermost portion and the outermost portion in the tyre width direction of the bead core. | ○ | ○ | ○ | ○ | ○ | ○ | ○ | ○ | ○ |
| The end portion on the inner side in the tyre radial direction of the second reinforcing layer is located more on the inner side in the tyre width direction than the end portion on the inner side in the tyre width direction of the bead core bottom surface, or more on the outer side in the tyre width direction than the end portion on the outer side in the tyre width direction of the bead core bottom surface. | | | | | | | | | ○ |
| Inclination angle θt1 of first tapered portion is 5° or larger. | 7° | 7° | 7° | 7° | 7° | 7° | 7° | 7° | 7° |
| Inclination angle θt1 of first tapered portion | 20° | 20° | 20° | 20° | 20° | 20° | 20° | 20° | 20° |
| Inclination angle θt2 of second tapered portion | 0.45 | 0.85 | 0.85 | 0.85 | 0.85 | 0.85 | 0.85 | 0.85 | 0.85 |
| T1/BW | 0.6 | 0.15 | 0.15 | 0.15 | 0.15 | 0.15 | 0.15 | 0.15 | 0.15 |
| T2/BW | 107 | 107 | 107 | 107 | 107 | 107 | 107 | 107 | 107 |
| Carcass damage in bead portion | 107 | 110 | 110 | 110 | 110 | 110 | 110 | 110 | 110 |
| Air-sealing properties | 105 | 110 | 110 | 105 | 120 | 115 | 120 | 125 | 130 |
| Rim slip resistance | | | | | | | | | |

FIG. 21B

PNEUMATIC TIRE AND METHOD FOR MANUFACTURING PNEUMATIC TIRE

TECHNICAL FIELD

The present technology relates to a pneumatic tire and a method for manufacturing a pneumatic tire.

BACKGROUND ART

A pneumatic tire is mounted on the rim wheel by fitting a bead portion including a bead core that is an annular member formed by bundling a plurality of bead wires into a rim of a rim wheel. The bead portion, which is a portion that is actually mounted on the rim wheel in mounting the pneumatic tire on the rim wheel, is an important portion for ensuring the performance of the pneumatic tire, and some known pneumatic tires achieve their desired performance by making various improvements to the bead portion.

For example, in a pneumatic tire described in Japan Unexamined Patent Publication No. 2018-034784 A, a bead core includes a substantially flat bead surface bonded to rounded end portions on both sides, thereby reducing wear in a bead region. In a heavy duty pneumatic tire described in Japan Unexamined Patent Publication No. H09-240223 A, inner and outer contours of a bead core in a radial direction are formed of a lower base and an upper base that extend in a tire axial direction, an outer contour in the tire axial direction is formed of an upper and lower pair of outer oblique sides that respectively extend inclined from outer ends of the lower base and the upper base in the tire axial direction toward the outer side in the tire axial direction, and an inner contour in the tire axial direction of the bead core is formed of an inner side connecting inner ends of the lower base and the upper base in the tire axial direction, thus improving durability performance of a bead portion.

In a bead core described in Japan Unexamined Patent Publication No. 2005-088793 A, a cross-sectional shape on a radially inner side from a cross-sectional center of the bead core is formed of bases parallel to an axial direction of the bead core, both left and right intermediate sides orthogonal to the axial direction of the bead core, and oblique sides formed of two sides that connect inner ends of the left and right intermediate sides to both sides of the bases, respectively, and each have an obtuse angle, thus reducing a breakage failure due to fretting of carcass cords and a tire failure due to an air pocket. In a pneumatic tire described in Japan Patent No. 4243091 B, in manufacturing a bead core having an annular shape as a whole and formed of wires arranged in a plurality of rows and a plurality of stages without a gap, a wire on the outermost side in the width direction of each wire row from the innermost circumferential side to the maximum width position is positioned on the outer side in the width direction with respect to each wire on the outermost side in the width direction of a wire row on the inner circumferential side of each wire row, and a misalignment amount thereof is reduced as a tendency from the innermost circumferential side to the maximum width position, thus preventing breakage of a carcass and generation of corrugation to a turned-up end portion of the carcass in, for example, manufacturing of the tire.

Here, although a bead core typically has a polygonal shape in a tire meridian cross-section, some ultra-large pneumatic tires include a nylon cover wound around a bead core to avoid stress concentration on a carcass from a corner of the bead core. However, only the nylon cover makes a distance between the corner of the bead core and the carcass insufficient, and thus a portion near the corner of the bead core and the carcass are likely to rub against each other while being subjected to large force when large tensile strength acts on the carcass. In this case, the corner of the bead core and the carcass rub against each other, and thus the carcass cord may break. For this reason, known pneumatic tires still have room for improvement in terms of durability of a bead portion.

SUMMARY

The present technology provides a pneumatic tire that can provide improved durability of a bead portion and a method for manufacturing a pneumatic tire.

A pneumatic tire according to an embodiment of the present technology includes: a pair of bead portions disposed on both respective sides of a tire equatorial plane in a tire width direction; a bead core disposed in each of the pair of bead portions, formed by winding a bead wire in a ring shape, and having a polygonal cross-sectional shape in a tire meridian cross-section; and a carcass including a carcass body portion disposed extending between the pair of bead portions and a turned-up portion formed continuously from the carcass body portion and folded back from an inner side in the tire width direction to an outer side in the tire width direction of the bead core, the carcass being formed by coating a carcass cord with a coating rubber. The bead core has a portion located on an innermost side in the tire width direction and a portion located on an outermost side in the tire width direction in a contour in the tire meridian cross-section each formed as a vertical line extending along a tire radial direction. The vertical line has a length within a range of 20% or more and 30% or less with respect to a core height that is a height of the bead core in the tire radial direction. The vertical line has a distance in the tire radial direction from a bead core bottom surface that is an inner peripheral surface of the bead core to an inner end portion in the tire radial direction of the vertical line within a range of 30% or more and 40% or less with respect to the core height. In the bead core, a plurality of circumferential portions of the bead wire wound in a ring shape is aligned in the tire width direction to form a layer, and a plurality of the layers is layered in the tire radial direction. For a first layer that is the layer located on an innermost circumference in the tire radial direction, a second layer that is the layer layered on an outer side of and adjacent to the first layer in the tire radial direction, and a third layer that is the layer layered on an outer side of and adjacent to the second layer in the tire radial direction of the plurality of the layers, in two of the layers adjacent to each other in the tire radial direction, the number of the bead wires in the layer located relatively on the outer side in the tire radial direction is larger by two or more than the number of the bead wires in the layer located on an inner side in the tire radial direction, and a misalignment amount in the tire width direction between the bead wires each located at an end portion on one side in the tire width direction is one-half of a thickness of the bead wire. A side on which the misalignment amount between the bead wires in the first layer and the second layer is one-half of the thickness of the bead wire is opposite in the tire width direction to a side on which the misalignment amount between the bead wires in the second layer and the third layer is one-half of the thickness of the bead wire.

In the pneumatic tire described above, the bead core preferably has a width of the bead core bottom surface in the tire meridian cross-section within a range of 35% or more and 45% or less with respect to a maximum width of the bead core.

In the pneumatic tire described above, the bead core preferably has a distance in the tire width direction between an end portion on an inner side in the tire width direction on a bead core top surface that is an outer peripheral surface in the tire meridian cross-section and the vertical line on the inner side in the tire width direction within a range of 25% or more and 40% or less with respect to a maximum width of the bead core, has a distance in the tire width direction between an end portion on the inner side in the tire width direction on the bead core bottom surface and the vertical line on the inner side in the tire width direction within a range of 25% or more and 40% or less with respect to the maximum width of the bead core, and has the maximum width of the bead core within a range of 0.9 times or more and 1.3 times or less as large as the core height.

In the pneumatic tire described above, the carcass preferably has an inclination angle $\theta 1p$ of the carcass cord with respect to a tire circumferential direction at a position in the tire radial direction identical to a position in the tire radial direction of a bead core top surface that is an outer peripheral surface of the bead core within a range $80° \leq \theta 1p \leq 89°$.

In the pneumatic tire described above, a bead filler including a lower filler and an upper filler on an outer side of the bead core in the tire radial direction is preferably disposed in the bead portion, and the lower filler preferably has a modulus at 100% elongation within a range of 7.5 MPa or more and 10.5 MPa or less.

In the pneumatic tire described above, the lower filler preferably has a height in the tire radial direction from the bead core bottom surface to an end portion on an outer side in the tire radial direction of the lower filler within a range of 50% or more and 70% or less with respect to a height in the tire radial direction from the bead core bottom surface to an end portion on an outer side in the tire radial direction of the turned-up portion.

In the pneumatic tire described above, the bead filler preferably has a ratio of an area of the lower filler to an area of the bead filler in the tire meridian cross-section in a range on an inner side in the tire radial direction from an end portion on an outer side in the tire radial direction of the turned-up portion within a range of 45% or more and 55% or less.

In the pneumatic tire described above, the bead portion preferably has a ratio Db/Dc of a distance Db between the bead core and the carcass cord in the turned-up portion on a straight line drawn from a center of gravity position of the bead core to the outer side in the tire width direction in the tire meridian cross-section to a distance Dc on the straight line between the carcass cord in the turned-up portion and a bead portion outer surface that is a surface on an outer side in the tire width direction of the bead portion within a range of 10% or more and 15% or less.

In the pneumatic tire described above, the bead portion preferably has a ratio Dd/BW of a distance Dd between the bead wire located on the outermost side in the tire width direction in the bead core and the bead portion outer surface to a width BW in the tire width direction of a bead base portion that is an inner peripheral surface of the bead portion within a range of 20% or more and 25% or less.

In the pneumatic tire described above, the bead core preferably has an intermediate vertex projecting in a direction toward the carcass between the inner end portion in the tire radial direction of the vertical line on the outer side in the tire width direction and an end portion on an outer side in the tire width direction of the bead core bottom surface. The carcass preferably has a radius of curvature of an arc of a carcass line in a range between the inner end portion in the tire radial direction of the vertical line and the end portion on the outer side in the tire width direction of the bead core bottom surface within a range of 1.0 times or more and 1.5 times or less as large as a radius of curvature of an arc passing through the inner end portion in the tire radial direction of the vertical line, the end portion on the outer side in the tire width direction of the bead core bottom surface, and the intermediate vertex.

In the pneumatic tire described above, the bead portion preferably includes a rim cushion rubber on an inner side in the tire radial direction of the bead core, and the rim cushion rubber preferably has a modulus at 100% elongation within a range of 3.5 MPa or more and 5.5 MPa or less.

In the pneumatic tire described above, the bead portion preferably has, in the tire meridian cross-section, an inclination angle $\theta p$ in the tire radial direction with respect to the tire width direction of a straight line connecting an intersection point between a straight line drawn in the tire width direction at a flange height and the carcass body portion to an intersection point between a straight line drawn in the tire width direction at an outermost position in the tire radial direction of the bead core and the carcass body portion within a range $60° \leq \theta p \leq 75°$.

In the pneumatic tire described above, the bead portion preferably has, in the tire meridian cross-section, an inclination angle $\theta pu$ in the tire radial direction with respect to the tire width direction of a straight line connecting an intersection point between a straight line drawn in the tire width direction at a flange height and the carcass body portion to an intersection point between a straight line drawn in the tire width direction at a position twice as high as the flange height in the tire radial direction and the carcass body portion within a range $50° \leq \theta pu \leq 70°$.

In the pneumatic tire described above, a reinforcing layer is preferably disposed along the carcass at least on an inner side of the carcass body portion in the tire width direction in the bead portion.

In the pneumatic tire described above, the reinforcing layer is preferably a steel reinforcing layer including a steel cord. The steel reinforcing layer is preferably disposed folded back along the carcass from the inner side in the tire width direction to the outer side in the tire width direction of the bead core and preferably has an end portion located on the inner side of the bead core in the tire width direction and an end portion located on the outer side of the bead core in the tire width direction both located more on an outer side in the tire radial direction than a core top surface that is an outer peripheral surface of the bead core. The steel cord included in the steel reinforcing layer preferably has an inclination angle $\theta rf1$ with respect to the tire circumferential direction at a position in the tire radial direction identical to a position in the tire radial direction of the core top surface within a range $20° \leq \theta rf1 \leq 65°$.

In the pneumatic tire described above, the steel reinforcing layer preferably has a height Hrf11 in the tire radial direction from a rim diameter reference position of an inner edge that is an end portion located on the inner side of the bead core in the tire width direction within a range $0.55 \leq Hrf11/Rh \leq 1.10$ with respect to a flange height Rh.

In the pneumatic tire described above, the steel reinforcing layer preferably has a height Hrf12 in the tire radial direction from a rim diameter reference position of an outer edge that is an end portion located on the outer side of the bead core in the tire width direction within a range $0.40 \leq Hrf12/Rh \leq 0.95$ with respect to a flange height Rh.

In the pneumatic tire described above, the reinforcing layer preferably includes a plurality of the reinforcing layers including a plurality of cords disposed layered. The reinforcing layers adjacent to each other of the plurality of the reinforcing layers preferably have inclination directions of the cords in the tire circumferential direction with respect to the tire radial direction opposite to each other.

In the pneumatic tire described above, preferably, the reinforcing layer includes three reinforcing layers, and the three reinforcing layers each have an inner edge height that is a height in the tire radial direction from a rim diameter reference position of an end portion on an outer side in the tire radial direction located on the inner side of the bead core in the tire width direction in the tire meridian cross-section, each inner edge height being different from each other. Of the three reinforcing layers, the inner edge height of a first reinforcing layer, which is the reinforcing layer adjacent to the carcass, is Hrf11, the inner edge height of a second reinforcing layer, which is the reinforcing layer adjacent to the first reinforcing layer on a surface side opposite to a side of the first reinforcing layer on which the carcass is located, is Hrf21, the inner edge height of a third reinforcing layer, which is the reinforcing layer adjacent to the second reinforcing layer on a surface side opposite to a side of the second reinforcing layer on which the first reinforcing layer is located, is Hrf31, the flange height is RH, and each inner edge height and the flange height preferably have relationships satisfying $0.55 \leq Hrf11/Rh \leq 1.10$, $1.05 \leq Hrf21/Rh \leq 1.40$, and $1.25 \leq Hrf31/Rh \leq 1.60$.

In the pneumatic tire described above, the first reinforcing layer is preferably disposed folded back along the carcass from the inner side in the tire width direction to the outer side in the tire width direction of the bead core, and an outer edge height Hrf12, which is a height in the tire radial direction from the rim diameter reference position of an end portion of the first reinforcing layer on a side located on the outer side of the bead core in the tire width direction, and the flange height Rh preferably have a relationship satisfying $0.40 \leq Hrf12/Rh \leq 0.95$.

In the pneumatic tire described above, preferably, the second reinforcing layer has a relationship between a height Hrf22 in the tire radial direction from the rim diameter reference position of an end portion on an inner side in the tire radial direction of the second reinforcing layer and the flange height Rh satisfying $0.05 \leq Hrf22/Rh \leq 0.35$, and the third reinforcing layer has a relationship between a height Hrf32 in the tire radial direction from the rim diameter reference position of an end portion on an inner side in the tire radial direction of the third reinforcing layer and the flange height Rh satisfying $0.20 \leq Hrf32/Rh \leq 0.50$.

In the pneumatic tire described above, preferably, the cord included in the first reinforcing layer has an inclination angle θrf1 with respect to the tire circumferential direction at a position in the tire radial direction identical to a position in the tire radial direction of an outermost portion in the tire radial direction of the bead core within a range $20° \leq θrf1 \leq 65°$, the cord included in the second reinforcing layer has an inclination angle θrf2 with respect to the tire circumferential direction at a position in the tire radial direction identical to the position in the tire radial direction of the outermost portion in the tire radial direction of the bead core within a range $-65° \leq θrf2 \leq -20°$, and the cord included in the third reinforcing layer has an inclination angle θrf3 with respect to the tire circumferential direction at a position in the tire radial direction identical to the position in the tire radial direction of the outermost portion in the tire radial direction of the bead core within a range $20° \leq θrf3 \leq 65°$.

In the pneumatic tire described above, the reinforcing layer preferably includes at least two reinforcing layers. Of the two reinforcing layers, a first reinforcing layer, which is the reinforcing layer adjacent to the carcass, is preferably disposed folded back along the carcass from the inner side in the tire width direction to the outer side in the tire width direction of the bead core and is thus disposed extending at least between a position identical to a position in the tire radial direction of an innermost portion in the tire width direction of the bead core and a position identical to a position in the tire radial direction of an outermost portion in the tire width direction of the bead core. Of the two reinforcing layers, a second reinforcing layer, which is the reinforcing layer adjacent to the first reinforcing layer at a surface side opposite to a side of the first reinforcing layer on which the carcass is located, preferably has an end portion on an outer side in the tire radial direction in a portion located on the inner side of the carcass body portion in the tire width direction, the end portion being located more on an outer side in the tire radial direction than an end portion on an outer side in the tire radial direction in a portion of the first reinforcing layer located on the inner side in the tire width direction of the carcass body portion. An end portion on an opposite side of the second reinforcing layer is preferably located more on an inner side in the tire width direction than an end portion on an inner side in the tire width direction of the bead core bottom surface or more on an outer side in the tire width direction than an end portion on an outer side in the tire width direction of the bead core bottom surface.

In the pneumatic tire described above, preferably, the first reinforcing layer is a steel reinforcing layer including a steel cord, and the second reinforcing layer is an organic fiber reinforcing layer including an organic fiber cord.

In the pneumatic tire described above, preferably, the bead portion has an inner diameter BIC of the bead core within a range $1.01 \leq BIC/RD \leq 1.03$ with respect to a specified rim diameter RD and a maximum width CW of the bead core within a range $0.45 \leq CW/BW \leq 0.52$ with respect to a width BW in the tire width direction of a bead base portion that is an inner peripheral surface of the bead portion, and the bead base portion is formed having a plurality of tapered portions having a different inclination angle in the tire radial direction with respect to the tire width direction. When, of the plurality of tapered portions, the tapered portion located on an outermost side in the tire width direction is a first tapered portion and the tapered portion located on an inner side of the first tapered portion in the tire width direction and connected to the first tapered portion is a second tapered portion, the second tapered portion preferably has an inclination angle in the tire radial direction with respect to the tire width direction larger than an inclination angle in the tire radial direction with respect to the tire width direction of the first tapered portion.

In the pneumatic tire described above, the bead base portion preferably has a bent portion that is a connecting portion between the first tapered portion and the second tapered portion and is located more on an inner side in the tire width direction than a center position in the tire width direction of the bead core bottom surface.

In the pneumatic tire described above, the first tapered portion preferably has the inclination angle in the tire radial direction with respect to the tire width direction of 5° or more.

In the pneumatic tire described above, the first tapered portion preferably has the inclination angle in the tire radial direction with respect to the tire width direction within a range of 5° or more and 10° or less.

In the pneumatic tire described above, the second tapered portion preferably has the inclination angle in the tire radial direction with respect to the tire width direction within a range of 10° or more and 35° or less.

In the pneumatic tire described above, the bead base portion preferably has a relationship between a width T1 in the tire width direction of the first tapered portion and the width BW in the tire width direction of the bead base portion within a range $0.45 \leq T1/BW \leq 0.85$.

In the pneumatic tire described above, the bead base portion preferably has a relationship between a width T2 in the tire width direction of the second tapered portion and the width BW in the tire width direction of the bead base portion within a range $0.15 \leq T2/BW \leq 0.55$.

In the pneumatic tire described above, preferably, a compression ratio of rubber located on an inner side of the bead core in the tire radial direction when the pneumatic tire is mounted on a specified rim is preferably within a range of 40% or more and 50% or less at a center position in the tire width direction of the bead core bottom surface.

A method for manufacturing a pneumatic tire according to an embodiment of the present technology is a method for manufacturing a pneumatic tire including: a pair of bead portions disposed on both respective sides of a tire equatorial plane in a tire width direction; a bead core disposed in each of the pair of bead portions, formed by winding a bead wire in a ring shape, and having a polygonal cross-sectional shape in a tire meridian cross-section; and a carcass including a carcass body portion disposed extending between the pair of bead portions and a turned-up portion formed continuously from the carcass body portion and folded back from an inner side in the tire width direction to an outer side in the tire width direction of the bead core, the carcass being formed by coating a carcass cord with a coating rubber. The method includes: causing the bead core to have a portion located on an innermost side in the tire width direction and a portion located on an outermost side in the tire width direction in a contour in the tire meridian cross-section each formed as a vertical line extending along a tire radial direction; causing the vertical line to have a length that within a range of 20% or more and 30% or less with respect to a core height that is a height of the bead core in the tire radial direction; causing the vertical line to have a distance in the tire radial direction from a bead core bottom surface that is an inner peripheral surface of the bead core to an inner end portion in the tire radial direction of the vertical line within a range of 30% or more and 40% or less with respect to the core height; in the bead core, aligning a plurality of circumferential portions of the bead wire wound in a ring shape in the tire width direction to form a layer and layering a plurality of the layers in the tire radial direction; for a first layer that is the layer located on an innermost circumference in the tire radial direction, a second layer that is the layer layered on an outer side of and adjacent to the first layer in the tire radial direction, and a third layer that is the layer layered on an outer side of and adjacent to the second layer in the tire radial direction of the plurality of the layers, in two of the layers adjacent to each other in the tire radial direction, making the number of the bead wires in the layer located relatively on the outer side in the tire radial direction larger by two or more than the number of the bead wires in the layer located on an inner side in the tire radial direction and making a misalignment amount in the tire width direction between the bead wires each located at an end portion on one side in the tire width direction one-half of a thickness of the bead wire; and making a side on which the misalignment amount between the bead wires in the first layer and the second layer is made one-half of the thickness of the bead wire opposite in the tire width direction to a side on which the misalignment amount between the bead wires in the second layer and the third layer is made one-half of the thickness of the bead wire.

In the method for manufacturing a pneumatic tire described above, the bead wire preferably starts to be wound from an end portion on an outer side in the tire width direction in the first layer.

In the method for manufacturing a pneumatic tire described above, the bead portion is preferably made to have a ratio Db/Dc of a distance Db between the bead core and the carcass cord in the turned-up portion on a straight line drawn from a center of gravity position of the bead core to the outer side in the tire width direction in the tire meridian cross-section to a distance Dc on the straight line between the carcass cord in the turned-up portion and a bead portion outer surface that is a surface on an outer side in the tire width direction of the bead portion within a range of 10% or more and 15% or less.

In the method for manufacturing a pneumatic tire described above, the bead portion is preferably made to have, in the tire meridian cross-section, an inclination angle θp in the tire radial direction with respect to the tire width direction of a straight line connecting an intersection point between a straight line drawn in the tire width direction at a flange height and the carcass body portion to an intersection point between a straight line drawn in the tire width direction at an outermost position in the tire radial direction of the bead core and the carcass body portion within a range $60° \leq θp \leq 75°$.

In the method for manufacturing a pneumatic tire described above, the bead portion is preferably made to have an inner diameter BIC of the bead core within a range $1.01 \leq BIC/RD \leq 1.03$ with respect to a specified rim diameter RD and a maximum width CW of the bead core within a range $0.45 \leq CW/BW \leq 0.52$ with respect to a width BW in the tire width direction of a bead base portion that is an inner peripheral surface of the bead portion. The bead base portion is preferably formed having a plurality of tapered portions having a different inclination angle in the tire radial direction with respect to the tire width direction. When, of the plurality of tapered portions, the tapered portion located on an outermost side in the tire width direction is a first tapered portion and the tapered portion located on an inner side of the first tapered portion in the tire width direction and connected to the first tapered portion is a second tapered portion, the second tapered portion is preferably made to have an inclination angle in the tire radial direction with respect to the tire width direction larger than an inclination angle in the tire radial direction with respect to the tire width direction of the first tapered portion.

The pneumatic tire and the method for manufacturing a pneumatic tire according to an embodiment of the present technology have an effect that can provide improved durability of the bead portion.

BRIEF DESCRIPTION OF DRAWINGS

FIG. 18A is a table showing the results of the first performance evaluation test of pneumatic tires.

FIG. 18B is a table showing the results of the first performance evaluation test of pneumatic tires.

FIG. 19A is a table showing the results of the second performance evaluation test of pneumatic tires.

FIG. 19B is a table showing the results of the second performance evaluation test of pneumatic tires.

FIG. 20A is a table showing the results of the third performance evaluation test of pneumatic tires.

FIG. 20B is a table showing the results of the third performance evaluation test of pneumatic tires.

FIG. 21A is a table showing the results of the fourth performance evaluation test of pneumatic tires.

FIG. 21B is a table showing the results of the fourth performance evaluation test of pneumatic tires.

DETAILED DESCRIPTION

Embodiments of a pneumatic tire and a method for manufacturing a pneumatic tire according to embodiments of the present technology will be described in detail below with reference to the drawings. However, the technology is not limited to the embodiment. Constituents of the following embodiments include elements that can be substituted and easily conceived of by a person skilled in the art or that are essentially identical.

First Embodiment

In the following description, the term "tire radial direction" refers to a direction orthogonal to the tire rotation axis (not illustrated) which is a rotation axis of a pneumatic tire 1, the term "inner side in the tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. The term "tire width direction" refers to a direction parallel with the tire rotation axis, the term "inner side in the tire width direction" refers to a side toward a tire equatorial plane (tire equator line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL. In the description below, "tire meridian cross-section" refers to a cross-section of the tire taken along a plane that includes the tire rotation axis.

Figure 1:
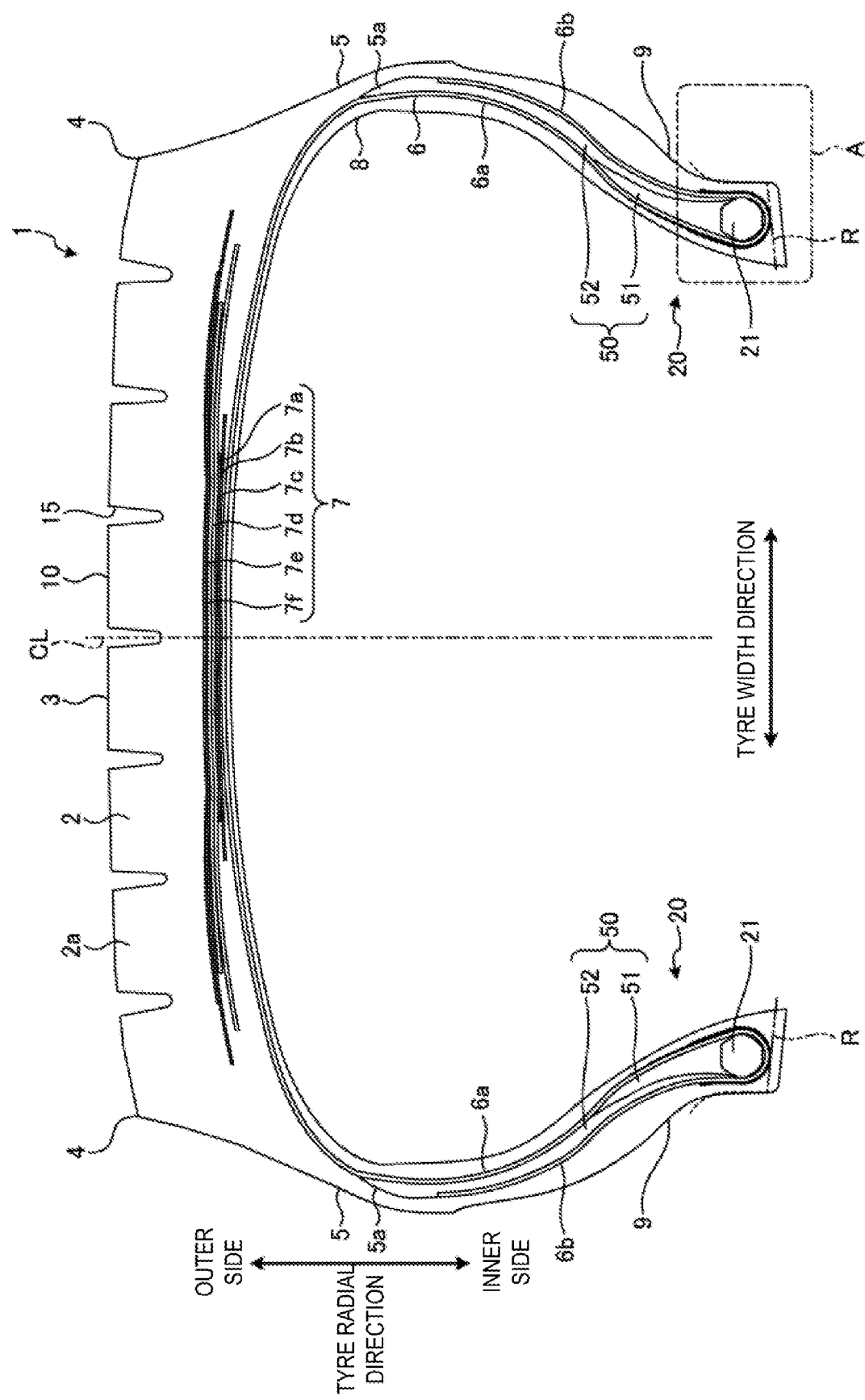
FIG. 1 is a meridian cross-sectional view illustrating a main portion of a pneumatic tire 1 according to a first embodiment.

FIG. 1 is a meridian cross-sectional view illustrating a main portion of the pneumatic tire 1 according to a first embodiment. The pneumatic tire 1 according to the first embodiment is a radial tire for a construction vehicle, which is referred to as an off-road tire (OR tire). The pneumatic tire 1 illustrated in FIG. 1 as the first embodiment is provided with a tread portion 2 on a portion on the outermost side in the tire radial direction when viewed in the tire meridian cross-section, and the tread portion 2 includes a tread rubber 2a, which is a rubber composition. The surface of the tread portion 2, that is, a portion that comes into contact with a road surface during traveling of a vehicle (not illustrated) mounted with the pneumatic tire 1, is formed as a tread contact surface 3.

A plurality of grooves (not illustrated) such as circumferential grooves 15 extending in the tire circumferential direction and lug grooves extending in the tire width direction are formed in the tread contact surface 3 of the tread portion 2, and a plurality of land portions 10 are defined and formed by the grooves in the tread portion 2.

Both ends of the tread portion 2 in the tire width direction are each formed as a shoulder portion 4, and a sidewall portion 5 is disposed from the shoulder portion 4 to a predetermined position on the inner side in the tire radial direction. In other words, the sidewall portion 5 is disposed on each of both sides of the pneumatic tire 1 in the tire width direction. The sidewall portion 5 includes a sidewall rubber 5a, which is a rubber composition. A rim check line 9 is formed at a position on a more inner side in the tire radial direction in each of the sidewall portions 5 on both sides in the tire width direction. The rim check line 9 projects from the surface of the sidewall portion 5 and is formed all around the circumference in the tire circumferential direction.

Moreover, a bead portion 20 is located on the inner side of each sidewall portion 5 in the tire radial direction, and similar to the sidewall portion 5, the bead portion 20 is disposed on each of both sides of the tire equatorial plane CL. In other words, a pair of the bead portions 20 are disposed on the both sides of the tire equatorial plane CL in the tire width direction. A bead core 21 is disposed in each of the pair of bead portions 20, and a bead filler 50 is disposed on the outer side of each bead core 21 in the tire radial direction. The bead core 21 is formed by winding a bead wire 30 (see FIG. 3), which is a steel wire, into a ring shape. The bead filler 50 is a rubber material disposed in a space formed of an end portion in the tire width direction of a carcass 6 described below folded back outward in the tire width direction at the position of the bead core 21. The bead filler 50 includes a lower filler 51 disposed in contact with an outer peripheral surface of the bead core 21, and an upper filler 52 disposed at a position closer to the outer side in the tire radial direction from the lower filler 51.

The bead portion 20 is configured to be mountable on a rim wheel including a 5°-tapered specified rim R. In other words, the pneumatic tire 1 according to the first embodiment can be mounted on the specified rim R including a portion fitted to the bead portion 20 and inclined at an inclination angle of 5°±1° with respect to the rotation axis of the rim wheel toward the outer side in the tire radial direction in a direction from the inner side toward the outer side in the tire width direction. Note that the specified rim R refers to an "applicable rim" defined by the JATMA (The Japanese Automobile Tire Manufacturers Association), a "Design Rim" defined by the TRA (The Tire and Rim Association, Inc.), or a "Measuring Rim" defined by the ETRTO (The European Tire and Rim Technical Organisation).

A belt layer 7 is provided on the inner side of the tread portion 2 in the tire radial direction. The belt layer 7 has a multilayer structure in which three or more belt plies are layered, and in a typical OR tire, four to eight belt plies are layered. In the first embodiment, the belt layer 7 includes six belt plies 7a, 7b, 7c, 7d, 7e, and 7f layered. The belt plies 7a, 7b, 7c, 7d, 7e, and 7f constituting the belt layer 7 in this manner are formed by coating a plurality of belt cords made of steel or an organic fiber material with coating rubber and rolling the coated belt cords. The belt plies 7a, 7b, 7c, 7d, 7e, and 7f have different inclination angles in the tire width direction with respect to the tire circumferential direction of the belt cords and are formed in a so-called crossply structure in which the belt cords are layered with their inclination directions intersecting one another. This increases the structural strength of the belt layer 7. The six belt plies 7a, 7b, 7c, 7d, 7e, and 7f include, for example, cross belt layers 7a, 7b, 7c, and 7d and protective belt layers 7e and 7f.

The carcass 6 that includes a cord of a radial ply is continuously provided on the inner side of the belt layer 7 in the tire radial direction and on the tire equatorial plane CL side of the sidewall portion 5. The carcass 6 has a single layer structure made of one carcass ply or a multilayer structure made of a plurality of carcass plies and extends between the bead cores 21 on the both sides in the tire width direction in a toroidal shape to form the backbone of the tire. Specifically, the carcass 6 extends between the pair of bead portions 20 and is disposed from one bead portion 20 to the other bead portion 20 of the pair of bead portions 20 located on both respective sides in the tire width direction. The carcass 6 is folded back from the inner side of the bead core 21 in the tire width direction to the outer side in the tire width direction in the bead portion 20 through the inner side of the bead core 21 in the tire radial direction while wrapping the bead core 21 and the bead filler 50. In other words, the carcass 6 is folded back from the inner side in the tire width direction of the bead core 21 to the outer side in the tire width direction of the bead core 21 around the bead core 21 in the bead portion 20.

Thus, the carcass 6 includes a carcass body portion 6a disposed to extend between the pair of bead portions 20 and turned-up portions 6b each formed continuously from the carcass body portion 6a and folded back from the inner side in the tire width direction to the outer side in the tire width direction of the bead core 21. The carcass body portion 6a referred to herein is a portion formed to extend between the inner sides in the tire width direction of the pair of bead cores 21 in the carcass 6, and the turned-up portion 6b is a portion formed on the inner side in the tire width direction of the bead core 21 continuously from the carcass body portion 6a and folded back to the outer side in the tire width direction while passing by the inner side in the tire radial direction of the bead core 21. The bead filler 50 is disposed on the inner side in the tire width direction of the turned-up portion 6b that is a portion folded back to the outer side of the bead core 21 in the tire width direction in this manner and on the outer side of the bead core 21 in the tire radial direction.

The carcass ply of the carcass 6 disposed in this manner is formed by coating a plurality of carcass cords 6c (see FIG. 2), which are cord members made of steel or an organic fiber material such as aramid, nylon, polyester, or rayon, with coating rubber 6d (see FIG. 2), which is a rubber member, and rolling the coated cords. The carcass 6 has a carcass angle, which is 85° or more and 95° or less, as an inclination angle of the carcass cords 6c with respect to the tire circumferential direction.

An innerliner 8 is formed along the carcass 6 on the inner side of the carcass 6 or on the inner side of the carcass 6 in the pneumatic tire 1.

Figure 2:
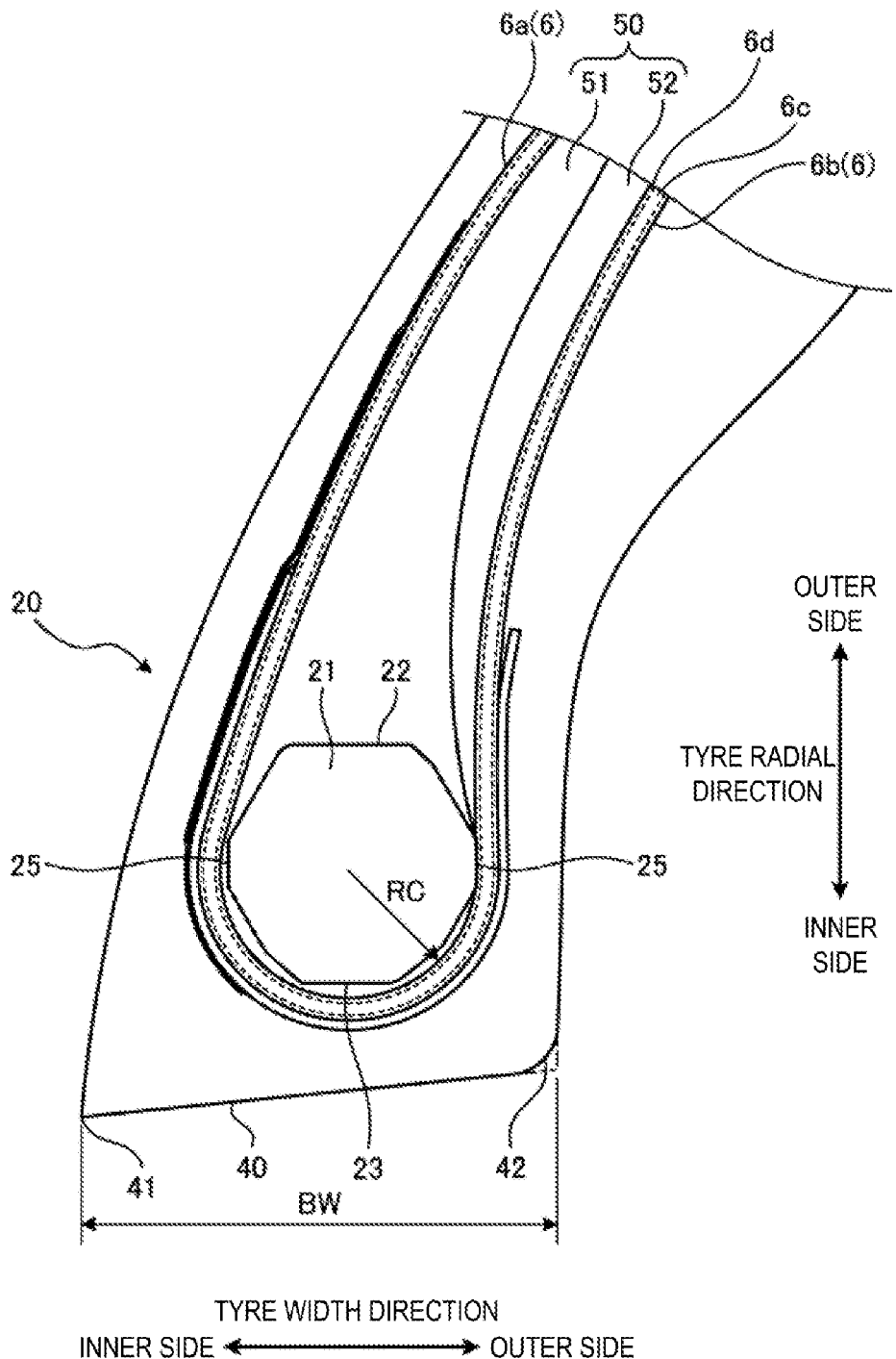
FIG. 2 is a detailed view of portion A of FIG. 1.
Figure 3:
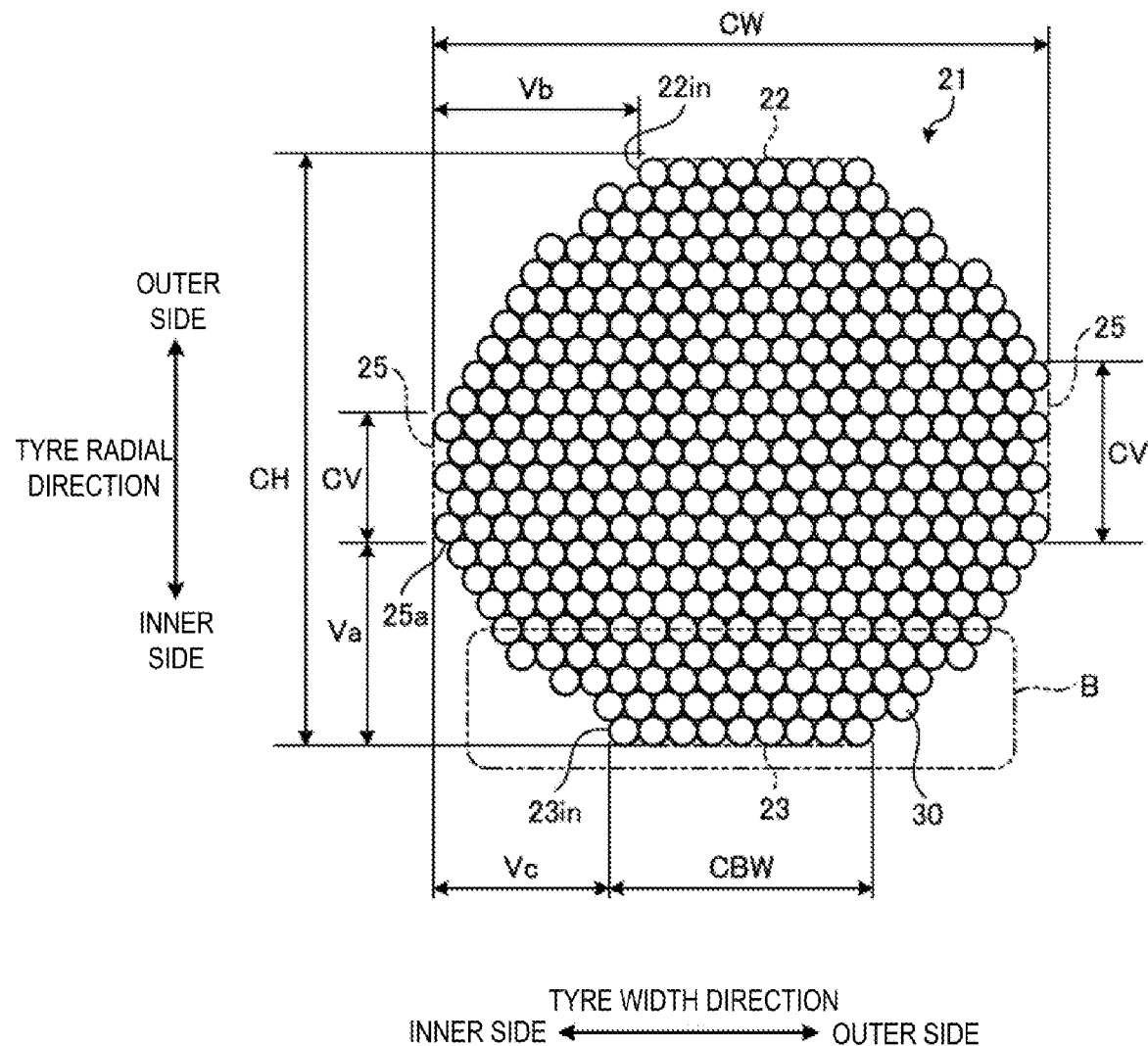
FIG. 3 is a detailed view of a bead core illustrated in FIG. 2.

FIG. 2 is a detailed view of portion A of FIG. 1. FIG. 3 is a detailed view of the bead core 21 illustrated in FIG. 2. The bead core 21 is formed to have a polygonal cross-sectional shape when viewed in the tire meridian cross-section. In the first embodiment, the bead core 21 is formed to have a cross-sectional shape close to an octagon. Specifically, the bead core 21 is formed such that a bead core bottom surface 23 corresponding to an inner peripheral surface of the bead core 21 and a bead core top surface 22 corresponding to the outer peripheral surface of the bead core 21 in the overall view of the bead core 21 are substantially parallel to each other. The bead core 21 has a portion located on the innermost side in the tire width direction and a portion located on the outermost side in the tire width direction in a contour in the tire meridian cross-section each formed as a vertical line 25 extending along the tire radial direction.

In the contour of the bead core 21 in the tire meridian cross-section, an inner portion in the tire radial direction of the vertical line 25 on the inner side in the tire width direction and an inner end portion in the tire width direction of the bead core bottom surface 23 are connected in a side shape, and an outer portion in the tire radial direction of the vertical line 25 on the inner side in the tire width direction and an inner end portion in the tire width direction of the bead core top surface 22 are connected in a side shape. Also, in the contour of the bead core 21 in the tire meridian cross-section, an inner portion in the tire radial direction of the vertical line 25 on the outer side in the tire width direction and an outer end portion in the tire width direction of the bead core bottom surface 23 are connected in a side shape, and an outer portion in the tire radial direction of the vertical line 25 on the outer side in the tire width direction and an outer end portion in the tire width direction of the bead core top surface 22 are connected in a side shape. This forms the bead core 21 in a substantially octagonal shape in a tire meridian cross-section.

The bead core bottom surface 23 of the bead core 21 in this case refers to, in the tire meridian cross-section, a surface indicated by an imaginary straight line contacting a portion exposed on the surface side of the bead core 21 of a plurality of the bead wires 30 aligned in a row at a position on the inner side of the bead core 21 in the tire radial direction to form the surface of the bead core 21. Similarly, the bead core top surface 22 of the bead core 21 refers to, when the pneumatic tire 1 is viewed in the tire meridian cross-section, a surface indicated by an imaginary straight line contacting a portion, which is exposed on the surface side of the bead core 21, of a plurality of the bead wires 30 disposed in a row at a position on the outer side of the bead core 21 in the tire radial direction to form the surface of the bead core 21.

The vertical line 25 of the bead core 21 refers to, when the tire width direction is the width direction of the bead core 21 in the tire meridian cross-section, an imaginary straight line contacting a portion, which is exposed on the outer side in the width direction of the bead core 21, of a plurality of the bead wires 30 located on the outermost side in the width direction of the bead core 21. Specifically, the vertical line 25 is formed to extend along the tire radial direction in a state where a spacing in the tire width direction between the pair of bead portions 20 located on both sides of the tire equatorial plane CL in the tire width direction is a spacing when the pneumatic tire 1 is mounted on the specified rim R.

In other words, the bead wires 30 are disposed in the bead core 21 such that an imaginary straight line contacting the plurality of bead wires 30 located on the outermost side in the width direction of the bead core 21 extends along the tire radial direction in a state where a spacing in the tire width direction between the pair of bead portions 20 located on the both sides in the tire width direction with respect to the tire equatorial plane CL is a spacing when the pneumatic tire 1 is mounted on the specified rim R.

In the first embodiment, the vertical line 25 on the inner side of the bead core 21 in the tire width direction in the tire meridian cross-section is located on the innermost side of the bead wires 30 in the tire width direction and is a tangent line in contact with the bead wires 30 at three positions aligned spaced in the tire radial direction. The vertical line 25 on the outer side of the bead core 21 in the tire width direction in the tire meridian cross-section is located on the outermost side of the bead wires 30 in the tire width direction and is a tangent line in contact with the bead wires 30 at four positions aligned spaced in the tire radial direction.

The shape around the bead portion 20 is hereinafter described in a manner as the description of the vertical line 25, and a spacing in the tire width direction of the pair of bead portions 20 located on the both sides in the tire width direction with respect to the tire equatorial plane CL is a spacing when the pneumatic tire 1 is mounted on the specified rim R. The vertical line 25 of the bead core 21 may not strictly extend in the tire radial direction. The vertical line 25 may be formed within a range of 0° or more and 15° or less with respect to the tire radial direction.

As described above, the vertical line 25 located on each side in the width direction of the bead core 21 has a length CV within a range of 20% or more and 30% or less with respect to a core height CH that is a height in the tire radial direction of the bead core 21. In other words, the vertical line 25 has a ratio CV/CH of the length CV to the core height CH within the range of 20% or more and 30% or less. The length CV of the vertical line 25 in this case is a distance between an end portion on the outer side in the tire radial direction of the bead wire 30 located on the outermost side in the tire radial direction and an end portion on the inner side in the tire radial direction of the bead wire 30 located on the innermost side in the tire radial direction among the plurality of bead wires 30 constituting the vertical line 25. The core height CH in this case is a distance between the bead core top surface 22 and the bead core bottom surface 23.

The vertical line 25 has a distance Va in the tire radial direction from the bead core bottom surface 23 to an inner end portion 25a in the tire radial direction of the vertical line 25 within a range of 30% or more and 40% or less of the core height CH. In this case, the inner end portion 25a in the tire radial direction of the vertical line 25 is an end portion on the inner side in the tire radial direction of the bead wire 30 located on the innermost side in the tire radial direction among the plurality of bead wires 30 constituting the vertical line 25.

Specifically, the bead core 21 has the vertical lines 25 on the both sides in the width direction of the bead core 21, and each of the vertical lines 25 located on the both sides in the width direction of the bead core 21 has the distance Va in the tire radial direction from the bead core bottom surface 23 to the inner end portion 25a in the tire radial direction of the vertical line 25 within the range of 30% or more and 40% or less of the core height CH. In other words, any of the vertical lines 25 located on the both sides in the width direction of the bead core 21 has a ratio Va/CH of the distance Va in the tire radial direction from the bead core bottom surface 23 to the inner end portion 25a of the vertical line 25 to the core height CH within the range of 30% or more and 40% or less.

The bead core 21 has, in the tire meridian cross-section, a distance Vb in the tire width direction between an end portion 22in on the inner side in the tire width direction of the bead core top surface 22 and the vertical line 25 on the inner side in the tire width direction of the vertical lines 25 on the both sides of the bead core 21 in the tire width direction within a range of 25% or more and 40% or less with respect to a maximum width CW of the bead core 21. In other words, the bead core 21 has a ratio Vb/CW of the distance Vb in the tire width direction between the end portion 22in on the inner side in the tire width direction of the bead core top surface 22 and the vertical line 25 on the inner side in the tire width direction to the maximum width CW of the bead core 21 within the range of 25% or more and 40% or less. The maximum width CW of the bead core 21 in this case is a distance between the vertical lines 25 located on the both sides in the width direction of the bead core 21. The end portion 22in on the inner side in the tire width direction of the bead core top surface 22 in this case is an end portion on the inner side in the tire width direction of the bead wire 30 located on the innermost side in the tire width direction among the plurality of bead wires 30 constituting the bead core top surface 22.

Similarly, the bead core 21 has a distance Vc in the tire width direction between an end portion 23in on the inner side in the tire width direction of the bead core bottom surface 23 and the vertical line 25 on the inner side in the tire width direction within a range of 25% or more and 40% or less with respect to the maximum width CW of the bead core 21. In other words, the bead core 21 has a ratio Vc/CW of the distance Vc in the tire width direction between the end portion 23in on the inner side in the tire width direction of the bead core bottom surface 23 and the vertical line 25 on the inner side in the tire width direction to the maximum width CW of the bead core 21 within the range of 25% or more and 40% or less. The end portion 23*in* on the inner side in the tire width direction of the bead core bottom surface 23 in this case is an end portion on the inner side in the tire width direction of the bead wire 30 located on the innermost side in the tire width direction among the plurality of bead wires 30 constituting the bead core bottom surface 23.

Additionally, the bead core 21 has, in the tire meridian cross-section, the maximum width CW of the bead core 21 within a range of 0.9 times or more and 1.3 times or less as large as the core height CH. Moreover, the bead core 21 has a width CBW of the bead core bottom surface 23 in the tire meridian cross-section within a range of 35% or more and 45% or less with respect to the maximum width CW of the bead core 21. In other words, the bead core 21 has a ratio CW/CH of the maximum width CW of the bead core 21 to the core height CH is within a range of 0.9 times or more and 1.3 times or less and that a ratio CBW/CW of the width CBW of the bead core bottom surface 23 to the maximum width CW of the bead core 21 within the range of 35% or more and 45% or less.

Figure 4:
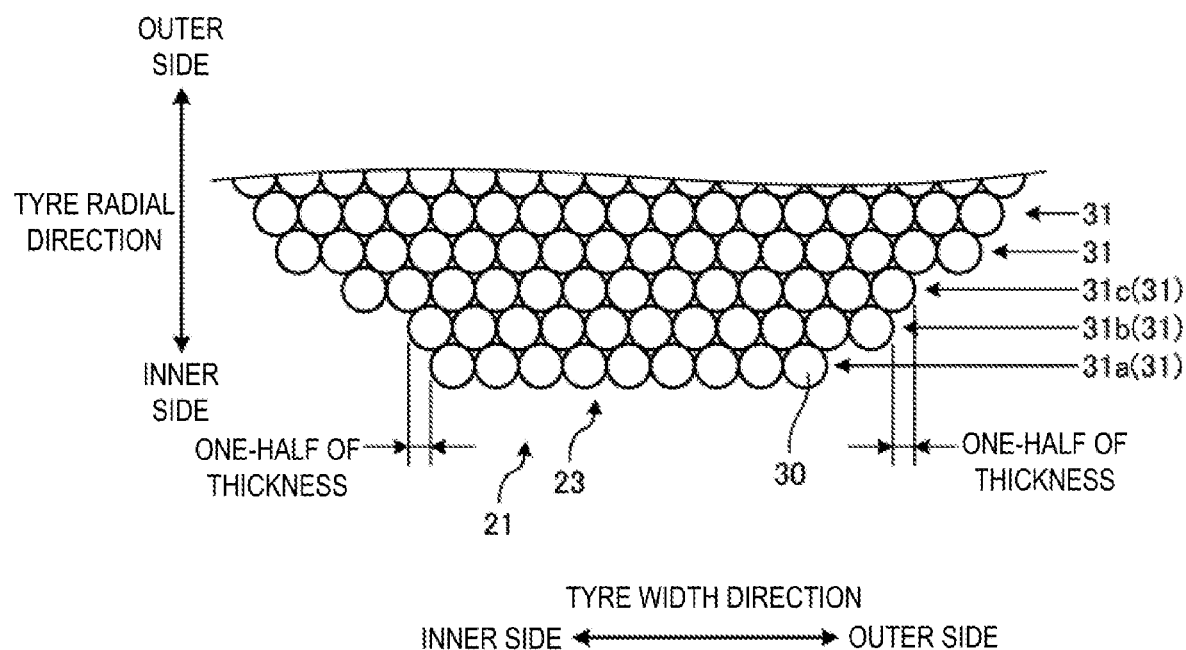
FIG. 4 is a detailed view of portion B of FIG. 3.

FIG. 4 is a detailed view of portion B of FIG. 3. The bead core 21 is formed by winding the bead wire 30 in a ring shape. Specifically, a plurality of circumferential portions of the bead wire 30 wound in a ring shape are aligned in the tire width direction to form one layer 31, and a plurality of the layers 31 are layered in the tire radial direction. In this case, in the layers 31 adjacent to each other in the tire radial direction, the bead wires 30 forming the respective layers 31 are disposed misaligned in the tire width direction by one-half of the thickness of the bead wire 30.

For a first layer 31*a*, a second layer 31*b*, and a third layer 31*c* counted from the inner side in the tire radial direction of the plurality of layers 31 included in the bead core 21, in two of the layers 31 adjacent to each other in the tire radial direction, the number of bead wires 30 in the layer 31 located relatively on the outer side in the tire radial direction is larger by two or more than the number of bead wires 30 in the layer 31 located on the inner side in the tire radial direction. The first layer 31*a* in this case is the layer 31 located on the innermost circumference in the tire radial direction among the plurality of layers 31 included in the bead core 21. The second layer 31*b* is the layer 31 layered on the outer side of and adjacent to the first layer 31*a* in the tire radial direction, and the third layer 31*c* is the layer 31 layered on the outer side of and adjacent to the second layer 31*b* in the tire radial direction. In the first embodiment, the number of bead wires 30 in the second layer 31*b* is larger by two than that in the first layer 31*a*, and the number of bead wires 30 in the third layer 31*c* is larger by two than that in the second layer 31*b*.

For the first layer 31*a*, the second layer 31*b*, and the third layer 31*c* of the bead core 21, in the two of the layers 31 adjacent to each other in the tire radial direction, the misalignment amount in the tire width direction of the bead wires 30 each located at an end portion on one side in the tire width direction is one-half of the thickness of the bead wire 30. In the first layer 31*a*, the second layer 31*b*, and the third layer 31*c*, the side on which the misalignment amount between the bead wires 30 located in the end portions in the tire width direction of the first layer 31*a* and the second layer 31*b* is one-half of the thickness of the bead wire 30 is located opposite in the tire width direction to the side on which the amount between the bead wires 30 located in the end portions in the tire width direction of the second layer 31*b* and the third layer 31*c* is one-half of the thickness of the bead wire 30.

Specifically, in the first layer 31*a* and the second layer 31*b*, the misalignment amount in the tire width direction between the bead wires 30 located in the inner end portions in the tire width direction is one-half of the thickness of the bead wire 30. In contrast, in the second layer 31*b* and the third layer 31*c*, the misalignment amount in the tire width direction between the bead wires 30 located in the outer end portions in the tire width direction is one-half of the thickness of the bead wire 30.

Figure 5:
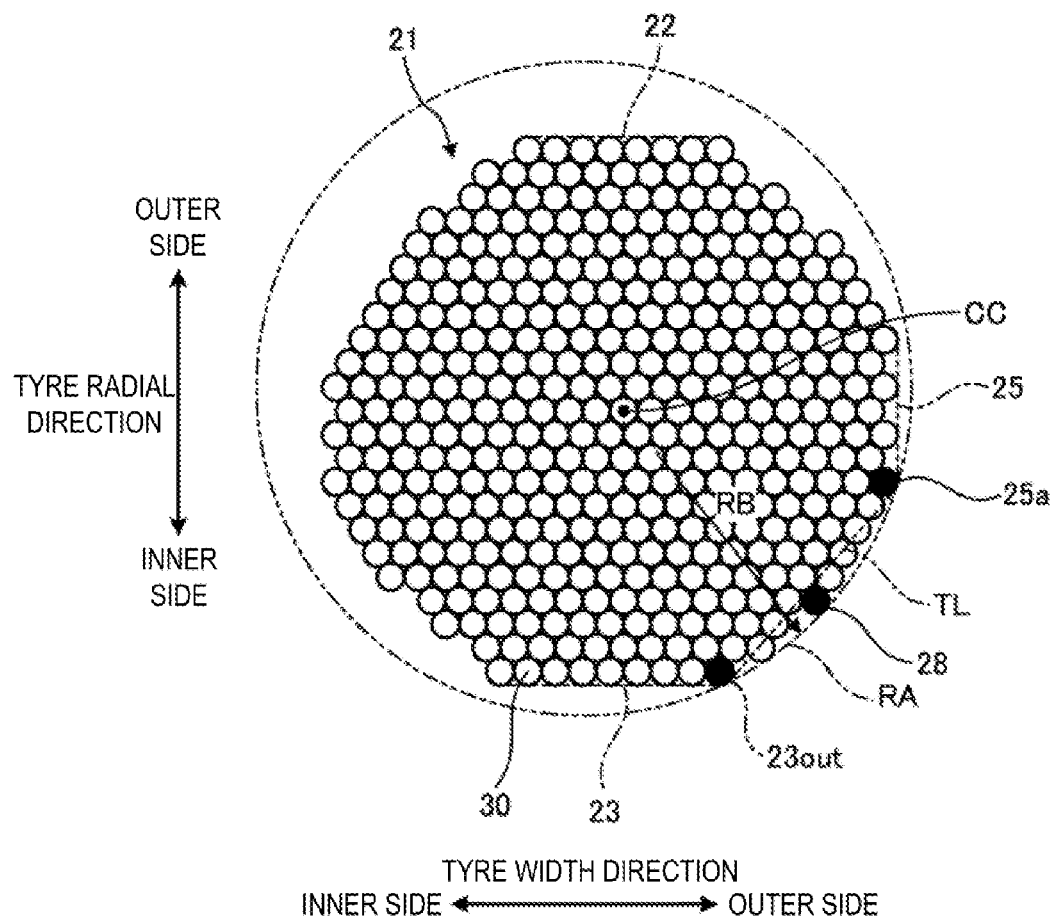
FIG. 5 is an explanatory diagram of an intermediate vertex of the bead core.

FIG. 5 is an explanatory diagram of an intermediate vertex 28 of the bead core 21. The bead core 21 further has the intermediate vertex 28 projecting in a direction toward the carcass 6 folded back around the bead core 21 between the inner end portion 25*a* in the tire radial direction of the vertical line 25 on the outer side in the tire width direction and an end portion 23*out* on the outer side in the tire width direction of the bead core bottom surface 23. In this case, when a tangent line TL is drawn that is in contact with the bead wire located in the inner end portion 25*a* of the vertical line 25 on the outer side of the bead core 21 in the tire width direction and the bead wire 30 located in the end portion 23*out* on the outer side in the tire width direction of the bead core bottom surface 23 in the tire meridian cross-section, the intermediate vertex 28 is a portion most projecting from the tangent line TL in a direction away from the center of gravity position CC of the bead core 21. The center of gravity position CC of the bead core 21 in this case is a so-called geometric center position in the cross-sectional shape of the bead core 21 in the tire meridian cross-section.

The bead core 21, which has the intermediate vertex 28 in this manner, has the shape of a portion between the inner end portion 25*a* of the vertical line 25 and the end portion 23*out* on the outer side in the tire width direction of the bead core bottom surface 23 in the tire meridian cross-section similar to the shape of the carcass 6 folded back around the bead core 21. In other words, a portion of the carcass 6, which is disposed in a range between the inner end portion 25*a* of the vertical line 25 and the end portion 23*out* on the outer side in the tire width direction of the bead core bottom surface 23 in the tire meridian cross-section is folded back around the bead core 21 in a shape similar to the bead core 21 in the tire meridian cross-section. Specifically, the carcass 6 has, in the tire meridian cross-section, a radius of curvature RC (see FIG. 2) of an arc of a carcass line in the range between the inner end portion 25*a* in the tire radial direction of the vertical line 25 and the end portion 23*out* on the outer side in the tire width direction of the bead core bottom surface 23 within a range of 1.0 times or more and 1.5 times or less as large as a radius of curvature RB of an arc RA passing through the inner end portion 25*a* of the vertical line 25 of the bead core 21, the end portion 23*out* on the outer side in the tire width direction of the bead core bottom surface 23, and the intermediate vertex 28. In other words, the carcass 6 and the bead core 21 has a relationship such that a ratio RC/RB of the radius of curvature RC of the arc of the carcass line to the radius of curvature RB of the arc RA on the bead core 21 side is within the range of 1.0 times or more and 1.5 times or less.

Figure 6:
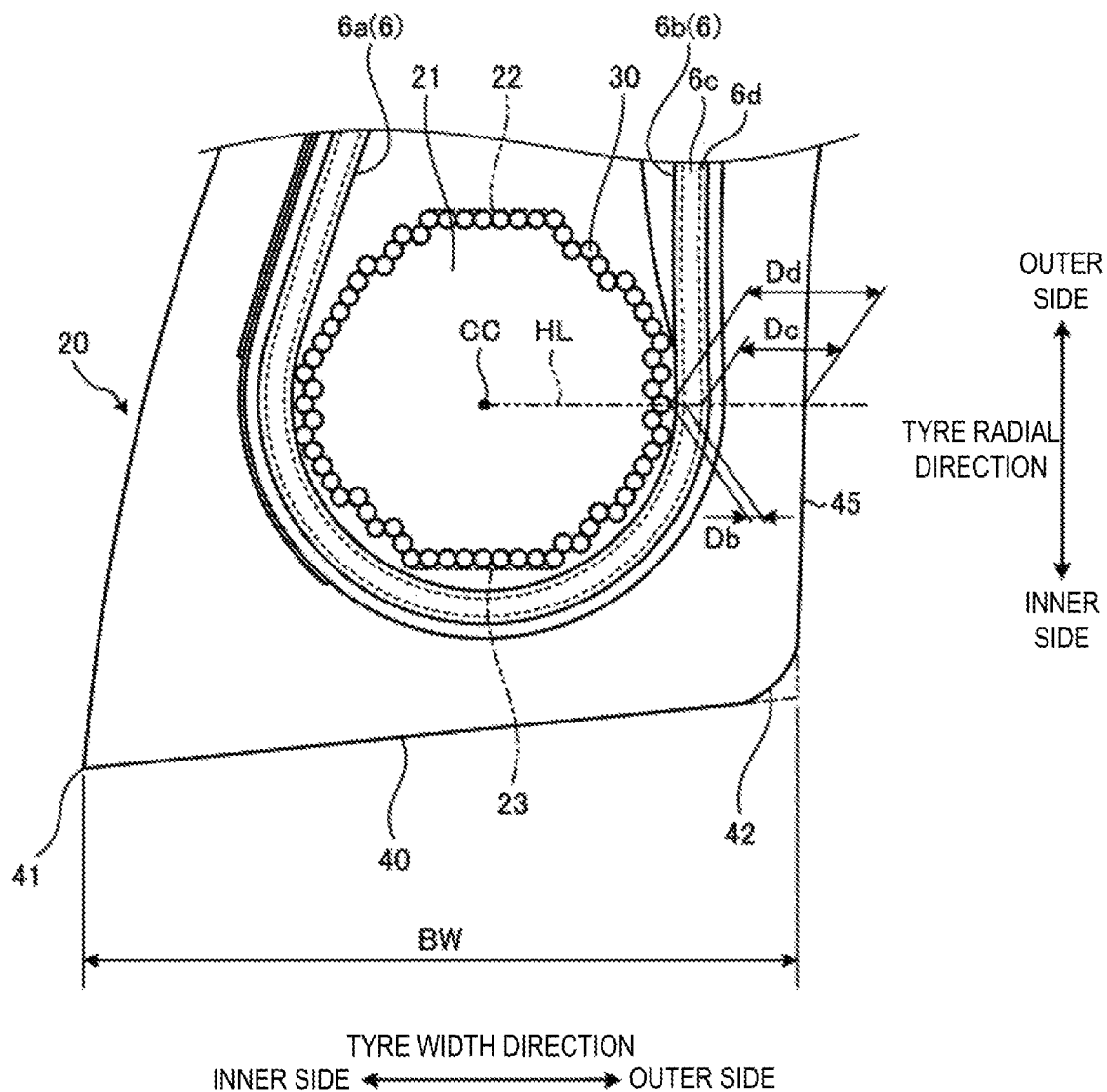
FIG. 6 is an explanatory diagram of dimensions in an outer portion in the tire width direction of the bead core in a bead portion.

FIG. 6 is an explanatory diagram of dimensions in an outer portion in the tire width direction of the bead core 21 in the bead portion 20. In the bead portion 20, a ratio Db/Dc of a distance Db between the bead core 21 and the carcass cord 6*c* of the turned-up portion 6*b* on a straight line HL drawn from the center of gravity position CC of the bead core 21 to the outer side in the tire width direction in the tire meridian cross-section to a distance Dc between the carcass cord 6c of the turned-up portion 6b and a bead portion outer surface 45 on the straight line HL is within a range of 10% or more and 15% or less. The bead portion outer surface 45 in this case is an outer surface in the tire width direction of the bead portion 20.

In the bead portion 20, a ratio Dd/BW of a distance Dd between the bead wire 30 located on the outermost side in the tire width direction in the bead core 21 and the bead portion outer surface 45 to a width BW in the tire width direction of a bead base portion 40 is within a range of 20% or more and 25% or less.

The bead base portion 40 referred to herein is an inner peripheral surface of the bead portion 20, and is a portion of the bead portion 20, which is brought into contact with the rim wheel to be fitted to the rim wheel. The bead base portion 40 includes a bead toe 41 at an inner end in the tire width direction and a bead heel 42 at an outer end in the tire width direction and is formed in a tapered shape in which the diameter increases from the bead toe 41 side toward the bead heel 42 side. The width BW in the tire width direction of the bead base portion 40 is a distance in the tire width direction between the bead toe 41 and the bead heel 42 in the bead base portion 40 including the bead toe 41 and the bead heel 42. In the first embodiment, the bead heel 42 is chamfered in an arc shape; however, the position of the bead heel 42 in the tire width direction is specified by an intersection point between an imaginary line obtained by extending a linear portion of the bead base portion 40 to the outer side in the tire width direction and an imaginary line obtained by extending the bead portion outer surface 45 to the inner side in the tire radial direction in the tire meridian cross-section.

The distance Dd between the bead wire 30 located on the outermost side in the tire width direction in the bead core 21 and the bead portion outer surface 45 is the minimum distance between the bead wire 30 and the bead portion outer surface 45.

Figure 7:
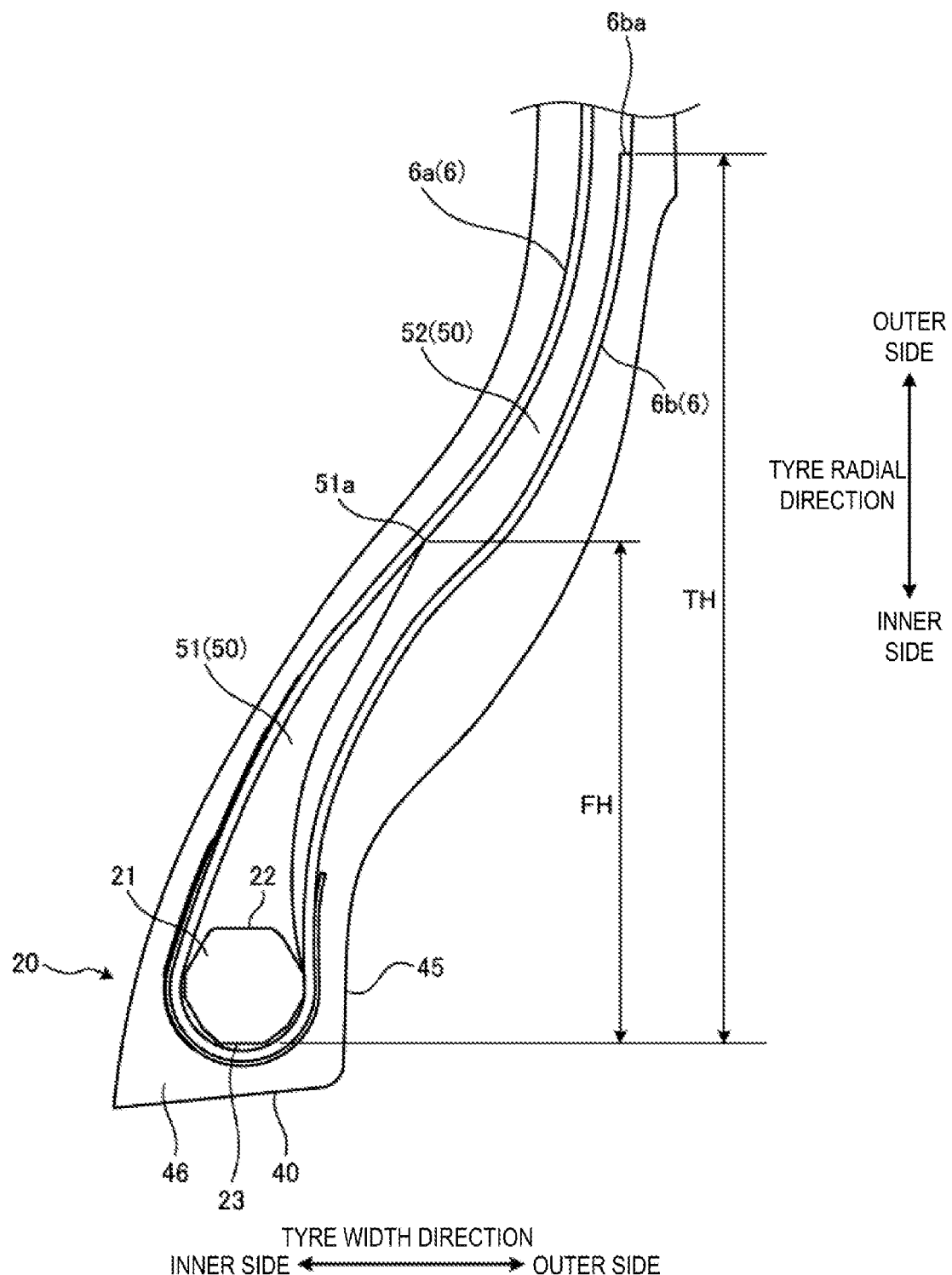
FIG. 7 is an explanatory diagram of a bead filler.

FIG. 7 is an explanatory diagram of the bead filler 50. The bead filler 50 including the lower filler 51 and the upper filler 52 is disposed on the outer side of the bead core 21 in the tire radial direction. Of these fillers, the lower filler 51 is disposed between the carcass body portion 6a and the turned-up portion 6b that are included in the carcass 6. The width in the tire width direction of the lower filler 51 is approximately the same as that of the bead core 21 in a location near the bead core 21 in the tire meridian cross-section, and the width is narrower toward the outer side in the tire radial direction.

In the lower filler 51 disposed between the carcass body portion 6a and the turned-up portion 6b, a height FH in the tire radial direction from the bead core bottom surface 23 to a lower filler outer end 51a that is an end portion on the outer side in the tire radial direction of the lower filler 51 is within a range of 50% or more and 70% or less with respect to a height TH in the tire radial direction from the bead core bottom surface 23 to a turned-up edge 6ba that is an end portion on the outer side in the tire radial direction of the turned-up portion 6b. In other words, in the lower filler 51, a ratio FH/TH of the height FH from the bead core bottom surface 23 to the lower filler outer end 51a to the height TH from the bead core bottom surface 23 to the turned-up edge 6ba is within the range of 50% or more and 70% or less.

Meanwhile, the upper filler 52 is disposed from the position where the lower filler 51 is disposed in the tire radial direction to the position on the outer side in the tire radial direction of the lower filler 51, and an inner end portion in the tire radial direction of the upper filler 52 is located near the bead core 21. Specifically, in a range in which the lower filler 51 is disposed in the tire radial direction, the upper filler 52 is located on the outer side of the lower filler 51 in the tire width direction and disposed between the turned-up portion 6b of the carcass 6 and the lower filler 51, and on the outer side of the lower filler 51 in the tire radial direction, the upper filler 52 is disposed between the carcass body portion 6a and the turned-up portion 6b of the carcass 6.

In the bead filler 50 including the lower filler 51 and the upper filler 52 that are disposed in this manner, a ratio of an area of the lower filler 51 to an area of the entire bead filler 50 in the tire meridian cross-section in a range on the inner side from the turned-up edge 6ba in the tire radial direction is within a range of 45% or more and 55% or less.

The lower filler 51 and the upper filler 52 that are included in the bead filler 50 are rubber compositions having physical properties different from each other. For example, in the first embodiment, the upper filler 52 has the modulus at 100% elongation within a range of 2.0 MPa or more and 3.0 MPa or less, whereas the lower filler 51 has the modulus at 100% elongation within a range of 7.5 MPa or more and 10.5 or less. In this case, the modulus at 100% elongation is measured by tensile testing at 23° C. compliant with JIS (Japanese Industrial Standard) K6251 (using a dumbbell No. 3) and indicates tensile stress at 100% elongation (a applies hereinafter).

The bead portion 20 includes a rim cushion rubber 46 on the inner side of the bead core 21 in the tire radial direction. The rim cushion rubber 46 also forms the bead base portion 40 that is the inner peripheral surface of the bead portion 20 and is a rubber composition that is brought into contact with the rim wheel while being elastically deformed when fitted to the rim wheel. In this manner, the rim cushion rubber 46 forming the bead base portion 40 has the modulus at 100% elongation within a range of 3.5 MPa or more and 5.5 MPa or less.

Figure 8:
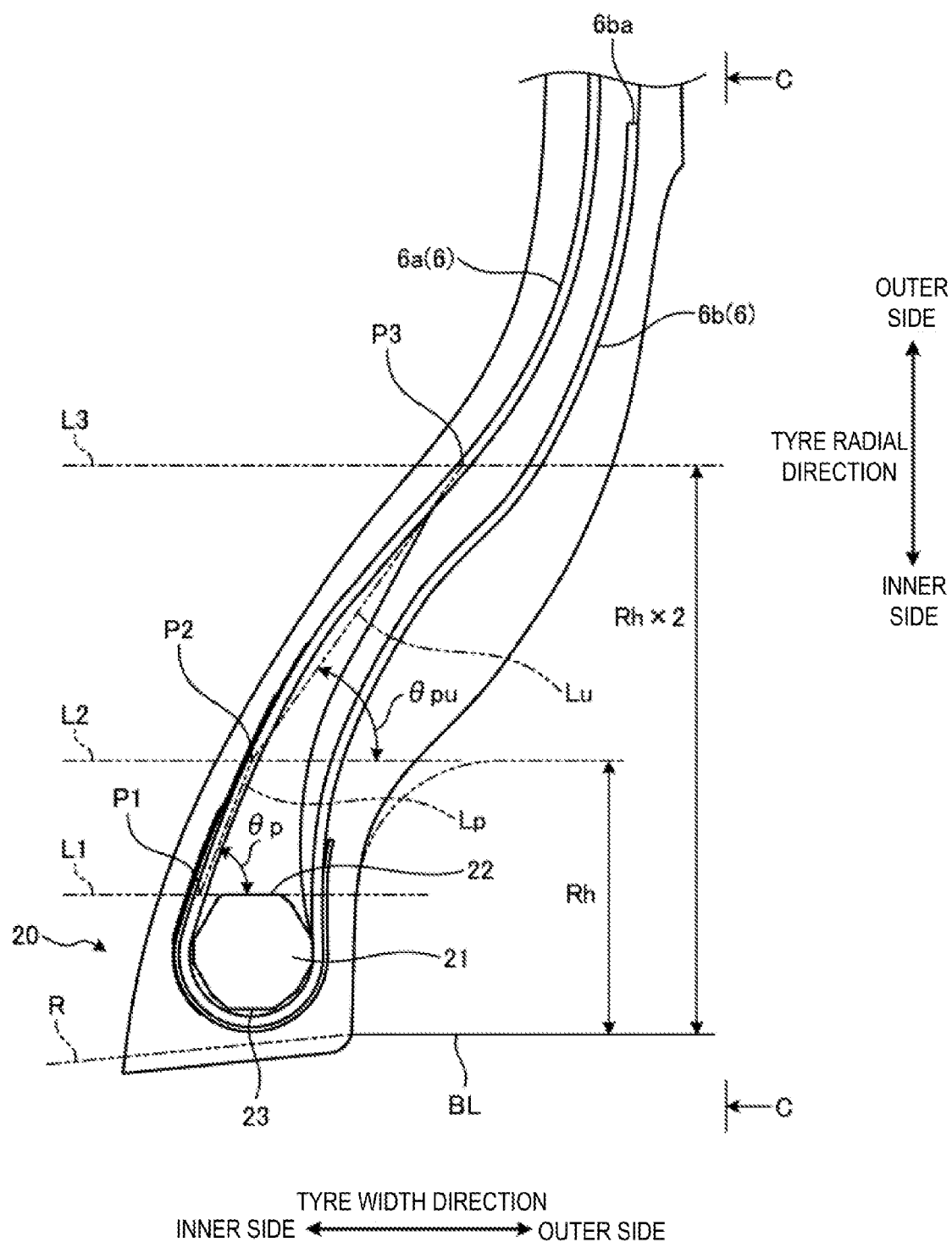
FIG. 8 is an explanatory diagram of an arrangement configuration of a carcass in the bead portion.

FIG. 8 is an explanatory diagram of the arrangement configuration of the carcass 6 in the bead portion 20. The bead portion 20 in which the carcass 6 is disposed has, in the tire meridian cross-section, an inclination angle θp in the tire radial direction with respect to the tire width direction of a straight line Lp connecting an intersection point P2 between a straight line L2 drawn in the tire width direction at a flange height Rh and the carcass body portion 6a to an intersection point P1 between a straight line L1 drawn in the tire width direction at the outermost position in the tire radial direction of the bead core 21 and the carcass body portion 6a within a range 60°≤θp≤75°.

The flange height Rh in this case is a height in the tire radial direction of a portion, which is located on the outermost side in the tire radial direction, of a rim flange of the specified rim R, that is, a rim flange height of the specified rim R compliant with the standard of JATMA, TRA, or ETRTO. The outermost portion in the tire radial direction of the bead core 21 is the bead core top surface 22 that is the outer peripheral surface of the bead core 21.

Furthermore, the bead portion 20 has, in the tire meridian cross-section, an inclination angle θpu in the tire radial direction with respect to the tire width direction of a straight line Lu connecting an intersection point P3 between a straight line L3 drawn in the tire width direction at a position twice as high as the flange height Rh in the tire radial direction and the carcass body portion 6a to the intersection point P2 within a range 50°≤θpu≤70°.

The position twice as high as the flange height Rh in this case is a position in the tire radial direction that is at a height twice on the outer side in the tire radial direction from a rim diameter reference position BL with respect to a height in the tire radial direction from the rim diameter reference position BL to a measurement point of the flange height Rh. The rim diameter reference position BL is a line of tire axial direction passing through the rim diameter defined by the standard, that is, a line of tire axial direction passing through the rim diameter defined by the standard of JATMA, TRA or ETRTO.

Figure 9:
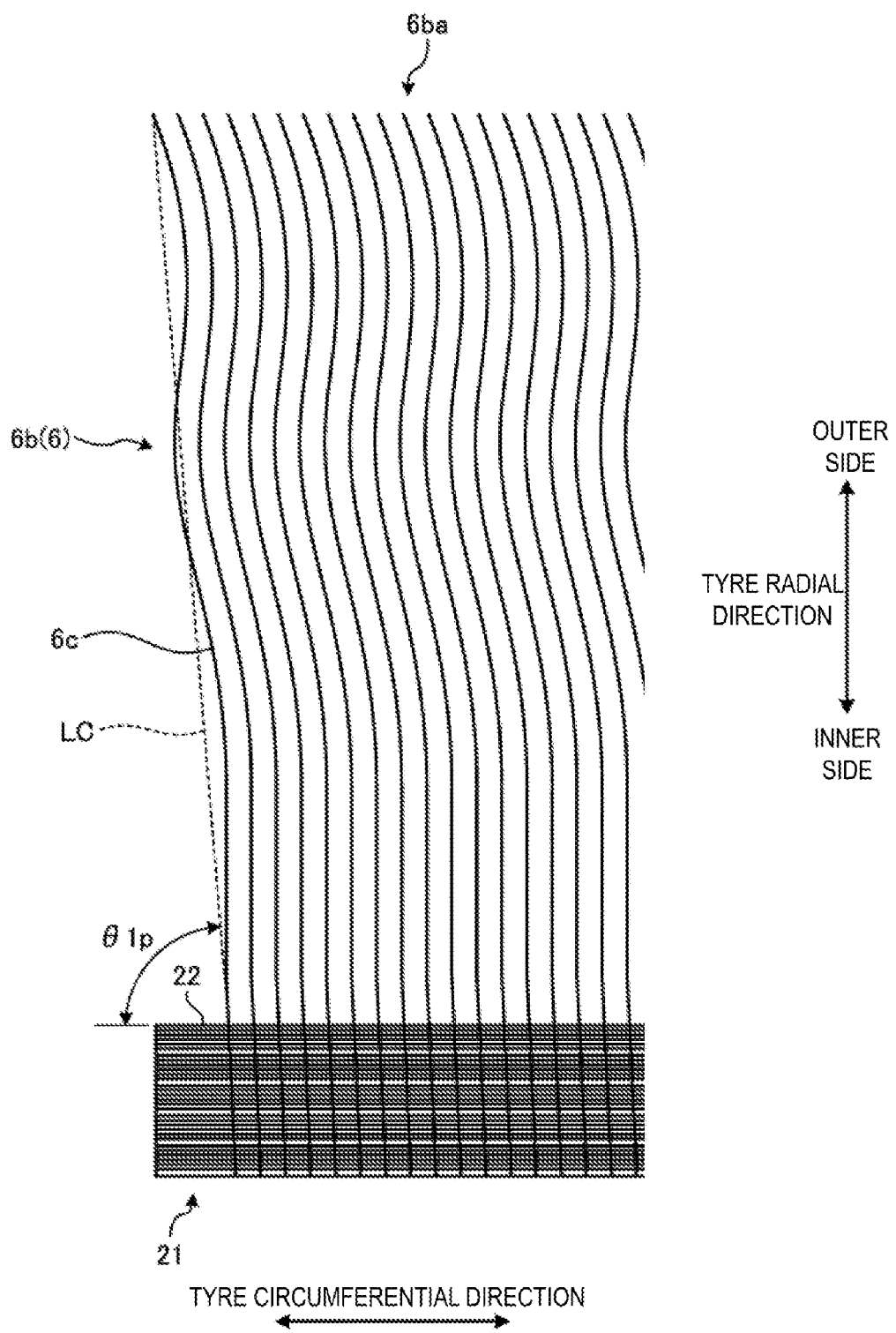
FIG. 9 is a schematic diagram of a carcass cord when viewed in the direction of the arrow C-C in FIG. 8.

FIG. 9 is a schematic diagram of the carcass cord 6c when viewed in the direction of the arrow C-C in FIG. 8. The plurality of carcass cords 6c included in the carcass 6 are disposed substantially along the direction in which the carcass 6 extends in the tire meridian cross-section, but strictly, are disposed slightly inclined in the tire circumferential direction with respect to the direction in which the carcass 6 extends.

For example, the carcass 6 has an inclination angle $\theta 1p$ of the carcass cord 6c with respect to the tire circumferential direction at a position in the tire radial direction identical to the position in the tire radial direction of the bead core top surface 22 within a range $80° \leq \theta 1p \leq 89°$. Accordingly, the carcass 6 has the angle of the carcass cord 6c disposed in the turned-up portion 6b, which is also set such that the inclination angle $f1p$ with respect to the tire circumferential direction at a position in the tire radial direction identical to the position in the tire radial direction of the bead core top surface 22 is within the range $80° \leq \theta 1p \leq 89°$.

As illustrated in FIG. 9, the carcass cords 6c disposed in the turned-up portion 6b may not be disposed linearly but may be curved. In this case, it is preferable for the inclination angle $f1p$ of the carcass cord 6c to use an angle of a straight line LC passing through a position identical to the position in the tire radial direction of the bead core top surface 22 in the carcass cord 6c of the turned-up portion 6b and the position of the turned-up edge 6ba in a carcass cord 6c. In other words, the carcass cord 6c disposed in the turned-up portion 6b preferably has the inclination angle $f1p$ of the straight line LC passing through a position identical to the position in the tire radial direction of the bead core top surface 22 in the carcass cord 6c and the position of the turned-up edge 6ba in the carcass cord 6c within the range $80° \leq \theta 1p \leq 89°$.

Figure 10:
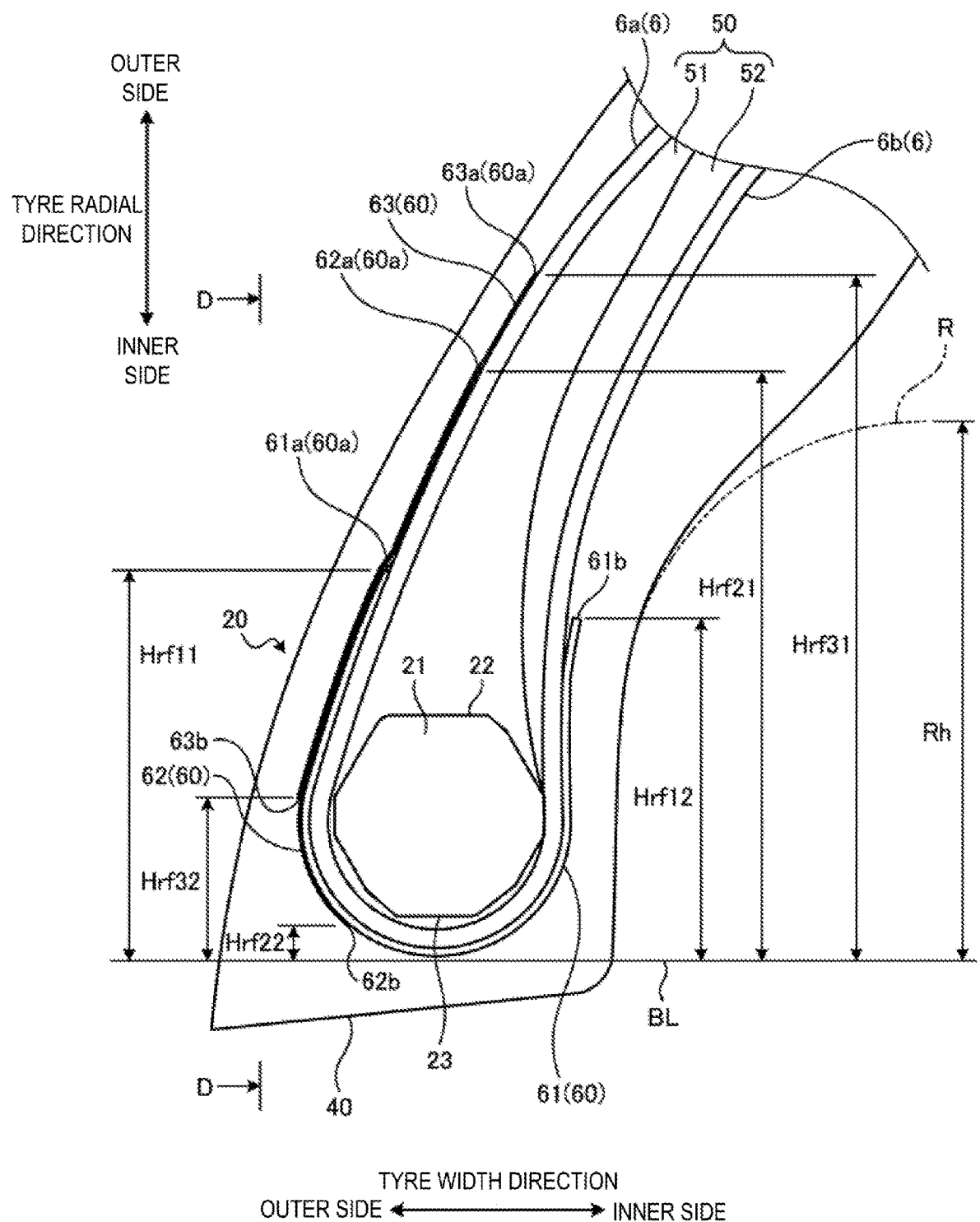
FIG. 10 is an explanatory diagram of a reinforcing layer disposed on the bead portion.

FIG. 10 is an explanatory diagram of a reinforcing layer 60 disposed in the bead portion 20. In the bead portion 20, the reinforcing layer 60 reinforcing the carcass 6 is disposed in a portion of the carcass 6, which is folded back around the bead core 21. The reinforcing layer 60 is disposed along the carcass 6 at least on the inner side in the tire width direction of the carcass body portion 6a. The reinforcing layer 60 includes three reinforcing layers, and these three reinforcing layers 60 are disposed having a different inner edge height that is a height in the tire radial direction from the rim diameter reference position BL of an inner edge 60a. The inner edge 60a in this case is an end portion on the outer side in the tire radial direction of a portion of each reinforcing layer 60 located on the inner side of the bead core 21 in the tire width direction in the tire meridian cross-section.

Specifically, of the three reinforcing layers 60, when the reinforcing layer 60 adjacent to the carcass 6 is a first reinforcing layer 61, the first reinforcing layer 61 has the relationship between an inner edge height Hrf11 of the first reinforcing layer 61 and the flange height Rh satisfying $0.55 \leq \text{Hrf11}/\text{Rh} \leq 1.10$. The inner edge height Hrf11 of the first reinforcing layer 61 in this case is a height in the tire radial direction from the rim diameter reference position BL of an inner edge 61a of the first reinforcing layer 61.

When, of the three reinforcing layers 60, the reinforcing layer 60 adjacent to the first reinforcing layer 61 on the surface side opposite to the side of the first reinforcing layer 61 on which the carcass 6 is located is a second reinforcing layer 62, the second reinforcing layer 62 has the relationship between an inner edge height Hrf21 of the second reinforcing layer 62 and the flange height Rh satisfying $1.05 \leq \text{Hrf21}/\text{Rh} \leq 1.40$. The inner edge height Hrf21 of the second reinforcing layer 62 in this case is a height in the tire radial direction from the rim diameter reference position BL of an inner edge 62a of the second reinforcing layer 62.

Of the three reinforcing layers 60, when the reinforcing layer 60 adjacent to the second reinforcing layer 62 on the surface side opposite to the side of the second reinforcing layer 62 on which the first reinforcing layer 61 is located is a third reinforcing layer 63, the third reinforcing layer 63 has the relationship between an inner edge height Hrf31 of the third reinforcing layer 63 and the flange height Rh satisfying $1.25 \leq \text{Hrf31}/\text{Rh} \leq 1.60$. The inner edge height Hrf31 of the third reinforcing layer 63 in this case is a height in the tire radial direction from the rim diameter reference position BL of an inner edge 63a of the third reinforcing layer 63.

In other words, in the first reinforcing layer 61, the second reinforcing layer 62, and the third reinforcing layer 63, the relationship among the inner edge height Hrf11 of the first reinforcing layer 61, the inner edge height Hrf21 of the second reinforcing layer 62, and the inner edge height Hrf31 of the third reinforcing layer 63 satisfies a relationship Hrf11<Hrf21<Hrf31.

The first reinforcing layer 61 of the three reinforcing layers 60 is disposed folded back along the carcass 6 from the inner side in the tire width direction to the outer side in the tire width direction of the bead core 21. In other words, the first reinforcing layer 61 is disposed along the carcass 6 from the position of the carcass body portion 6a to the position of the turned-up portion 6b. The first reinforcing layer 61 disposed folded back along the carcass 6 in this manner has the relationship between an outer edge height Hrf12 of the first reinforcing layer 61 and the flange height Rh satisfying $0.40 \leq \text{Hrf12}/\text{Rh} \leq 0.95$. The outer edge height Hrf12 of the first reinforcing layer 61 in this case is a height in the tire radial direction from the rim diameter reference position BL of an outer edge 61b that is an end portion of the first reinforcing layer 61, which is on the side located on the outer side of the bead core 21 in the tire width direction.

The first reinforcing layer 61 is folded back along the carcass 6 from the inner side in the tire width direction to the outer side in the tire width direction of the bead core 21, whereas the second reinforcing layer 62 and the third reinforcing layer 63 are not disposed on the outer side of the bead core 21 in the tire width direction. In other words, the second reinforcing layer 62 and the third reinforcing layer 63 are not disposed on the turned-up portion 6b side but are disposed along the carcass 6 only in a range where the carcass body portion 6a is located.

In the second reinforcing layer 62 and the third reinforcing layer 63 disposed in this manner, in the tire meridian cross-section, an inner edge 62b in the radial direction, which is an end portion on the side opposite to the inner edge 62a of the second reinforcing layer 62 is located more on the inner side in the tire radial direction than an inner edge 63b in the radial direction, which is an end portion on the side opposite to the inner edge 63a of the third reinforcing layer 63.

Specifically, the second reinforcing layer 62 has the relationship between the flange height Rh and a height Hrf22 in the tire radial direction from the rim diameter reference position BL of the inner edge 62b in the radial direction corresponding to the end portion of the second reinforcing layer 62 on the inner side in the tire radial direction satisfying $0.05 \leq \text{Hrf22}/\text{Rh} \leq 0.35$. The third reinforcing layer 63 has a relationship between the flange height Rh and a height Hrf32 in the tire radial direction from the rim diameter reference position BL of the inner edge 63b in the radial direction, which is the end portion on the inner side in the tire radial direction of the third reinforcing layer 63, satisfying $0.20 \leq \text{Hrf32}/\text{Rh} \leq 0.50$.

The plurality of reinforcing layers 60 disposed as described above are each formed by coating a plurality of cords 65 (see FIG. 11) with coating rubber and rolling the coated cords. Of these reinforcing layers 60, the first reinforcing layer 61 is a steel reinforcing layer 61 in which the cords 65 are formed of steel cords 66 (see FIG. 11). Meanwhile, the second reinforcing layer 62 is an organic fiber reinforcing layer 62 in which the cords 65 are formed of organic fiber cords 67 (see FIG. 11). Similarly, the third reinforcing layer 63 is an organic fiber reinforcing layer 63 in which the cords 65 are formed of organic fiber cords 68 (see FIG. 11). In the following description, the first reinforcing layer 61 is also referred to as a steel reinforcing layer 61, the second reinforcing layer 62 is also referred to as an organic fiber reinforcing layer 62, and the third reinforcing layer 63 is also referred to as an organic fiber reinforcing layer 63.

Accordingly, the steel reinforcing layer 61 disposed as the first reinforcing layer 61 is disposed folded back along the carcass 6 from the inner side in the tire width direction to the outer side in the tire width direction of the bead core 21. The steel reinforcing layer 61 has the inner edge 61a, which is the end portion located on the inner side of the bead core 21 in the tire width direction, and the outer edge 61b, which is the end portion located on the outer side of the bead core 21 in the tire width direction, both located more on the outer side in the tire radial direction than the bead core top surface 22 of the bead core 21.

Figure 11:
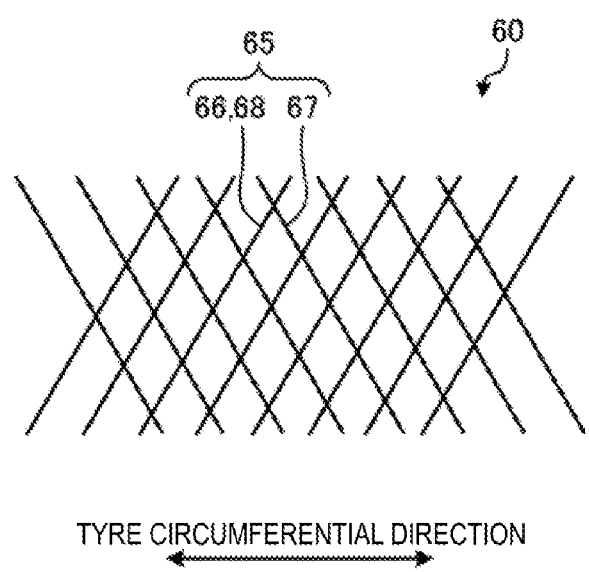
FIG. 11 is a schematic diagram of cords of the reinforcing layer when viewed in the direction of the arrow D-D in FIG. 10 and is an explanatory diagram of inclination directions of the cords.

FIG. 11 is a schematic diagram of the cords 65 of the reinforcing layer when viewed in the direction of the arrow D-D in FIG. 10 and is an explanatory diagram of inclination directions of the cords 65. Although the reinforcing layer 60 disposed along the carcass 6 in the bead portion 20 includes a plurality of reinforcing layers 60 including the plurality of cords 65 disposed layered, the reinforcing layers 60 adjacent to each other of the plurality of reinforcing layers 60 have the inclination directions of the cords in the tire circumferential direction with respect to the tire radial direction opposite to each other.

For example, the steel cords 66 that are the cords 66 included in the first reinforcing layer 61 and the organic fiber cords 67 that are the cords included in the second reinforcing layer 62 layered adjacent to the first reinforcing layer 61 have the inclination directions in the tire circumferential direction with respect to the tire radial direction opposite to each other. Similarly, the organic fiber cords 67 that are the cords included in the second reinforcing layer 62 and the organic fiber cords 68 that are the cords 68 included in the third reinforcing layer 63 layered adjacent to the second reinforcing layer 62 have the inclination directions in the tire circumferential direction with respect to the tire radial direction opposite to each other.

Figure 12:
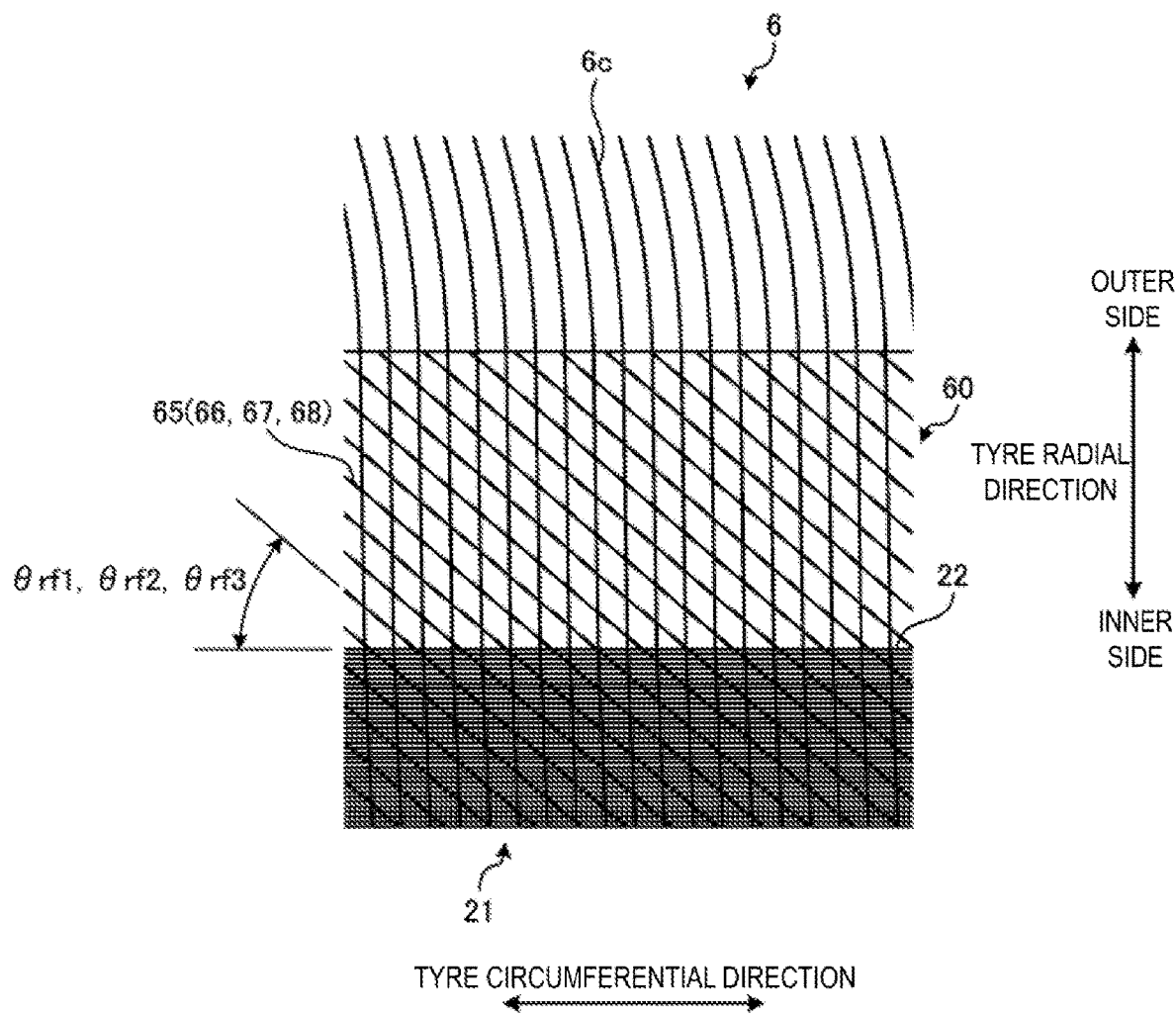
FIG. 12 is a schematic diagram of the cords of the reinforcing layer when viewed in the direction of the arrow D-D in FIG. 10.

FIG. 12 is a schematic diagram of the cords 65 of the reinforcing layer 60 when viewed in the direction of the arrow D-D in FIG. 10. FIG. 12 is an explanatory diagram of the position in which the angle of the cords 65 included in the reinforcing layer 60 is measured, and for convenience sake, the inclination directions of the cords 65 are one direction. However, in actuality, the inclination directions of the cords 65 are mutually opposite directions in the first reinforcing layer 61 and the second reinforcing layer 62 and are mutually opposite directions in the second reinforcing layer 62 and the third reinforcing layer 63.

The steel cord 66 included in the first reinforcing layer 61 has an inclination angle θrf1 with respect to the tire circumferential direction at a position in the tire radial direction identical to the position in the tire radial direction of the bead core top surface 22 that is the outermost portion in the tire radial direction of the bead core 21 within a range $20° \leq \theta\text{rf1} \leq 65°$.

In contrast, the organic fiber cord 67 included in the second reinforcing layer 62 in which the inclination direction of the cord 65 is opposite to that of the first reinforcing layer 61 has an inclination angle θrf2 with respect to the tire circumferential direction at a position in the tire radial direction identical to the position in the tire radial direction of the bead core top surface 22 within a range $-65° \leq \theta\text{rf2} \leq -20°$. In this case, when the tire circumferential direction is 0°, the inclination angle when inclined in any one direction in the tire radial direction is +, and the inclination angle when inclined in the other direction in the tire radial direction is −.

The organic fiber cord 68 included in the third reinforcing layer 63 in which the inclination direction of the cord 65 is opposite to that of the second reinforcing layer 62 has an inclination angle θrf3 with respect to the tire circumferential direction at a position in the tire radial direction identical to the position in the tire radial direction of the bead core top surface 22 within a range $20° \leq \theta\text{rf3} \leq 65°$.

Method for Manufacturing Pneumatic Tire

Next, a method for manufacturing the pneumatic tire 1 according to the first embodiment will be described. To manufacture the pneumatic tire 1, first, processing is performed on each of the members constituting the pneumatic tire 1, and the processed members are assembled. In other words, the rubber members such as the tread rubber 2a and each of the members such as the carcass 6, the belt layer 7, and the bead core 21 are processed, and the processed members are assembled.

For example, the bead core 21 is formed by winding the bead wire 30 into a ring shape. In this time, the bead core 21 is formed such that a portion located on the innermost side in the tire width direction and a portion located on the outermost side in the tire width direction in the contour in the tire meridian cross-section form the vertical lines 25 each extending along the tire radial direction. Further, the bead core 21 is made to have the length CV of the vertical line 25 within a range of 20% or more and 30% or less of the core height CH with respect to the bead core 21, and the vertical line 25 is made to have the distance Va in the tire radial direction from the bead core bottom surface 23 to the inner end portion 25a in the tire radial direction of the vertical line 25 within a range of 30% or more and 40% or less with respect to the core height CH.

The bead core 21 is formed by aligning a plurality of circumferential portions of the bead wire 30 in the tire width direction to form one layer 31 and layering a plurality of layers 31 in the tire radial direction. In this case, in two of the layers 31 adjacent to each other in the tire radial direction of the three layers 31 of the first layer 31a, the second layer 31b, and the third layer 31c counted from the innermost circumference of the bead core 21 in the tire radial direction, the number of bead wires 30 in the layer 31 located relatively on the outer side in the tire radial direction is made larger by two or more than the number of bead wires 30 in the layer 31 located on the inner side in the tire radial direction, and the misalignment amount in the tire width direction between the bead wires 30 each located at the end portion on one side in the tire width direction is made one-half of the thickness of the bead wire 30. In addition, in the three layers 31, the side on which the misalignment amount between the bead wires 30 in the first layer 31a and the second layer 31b is made one-half of the thickness of the bead wire 30 is made opposite in the tire width direction to the side on which the misalignment amount between the bead wires 30 in the second layer 31b and the third layer 31c is made one-half of the thickness of the bead wire 30.

In this manner, the bead wire 30 to be wound into a ring shape when forming the bead core 21 starts to be wound from the outer end portion in the tire width direction in the first layer 31a at the time of manufacturing the pneumatic tire 1. In other words, when the bead wire 30 is wound into a ring shape to form the bead core 21, the bead wire 30 is wound such that the end portion of the bead wire 30 located on the bead core bottom surface 23 is located in the end portion on the outer side in the tire width direction of the bead core bottom surface 23.

The bead wire 30 starting to be wound from the end portion on the outer side in the tire width direction of the bead core bottom surface 23 is spirally wound by a predetermined number of turns determined for each layer 31 to be arranged in the tire width direction, thereby forming the layer 31. When the number of times of winding the bead wire 30 reaches a predetermined number of turns determined for each layer 31, the bead wire 30 is folded back to the upper side in the tire radial direction and spirally wound by the number of turns determined to be the number of turns of the layers 31 adjacent on the outer side in the tire radial direction, thereby forming the layer 31.

In other words, the bead wire 30 starts to be wound from the outer end portion in the tire width direction in the first layer 31a, and when winding of the first layer 31a is completed, the second layer 31b to be located adjacent on the outer side in the tire radial direction to the first layer 31a starts to be wound. As a result, the side on which the misalignment amount between the bead wires 30 in the first layer 31a and the second layer 31b is made one-half of the thickness of the bead wire 30 is naturally located on the end side on the inner side in the tire width direction in the first layer 31a and the second layer 31b. By repeating such winding, the layers 31 formed by aligning a plurality of circumferential portions of the bead wire 30 in the tire width direction are layered in the tire radial direction, and thus the bead core 21 is formed to have a polygonal cross-sectional shape in the tire meridian cross-section.

In the bead portion 20 in which the bead core 21 formed in this manner is disposed, the carcass 6 is disposed folded back from the inner side in the tire width direction to the outer side in the tire width direction of the bead core 21. The bead portion 20 is formed such that the ratio Db/Dc of the distance Db between the bead core 21 and the carcass cord 6c of the turned-up portion 6b on the straight line HL drawn from the center of gravity position CC of the bead core 21 to the outer side in the tire width direction in the tire meridian cross-section to the distance Dc between the carcass cord 6c of the turned-up portion 6b and the bead portion outer surface 45 on the straight line HL is within a range of 10% or more and 15% or less.

The bead portion 20 is formed such that in tire meridian cross-section, the inclination angle θp in the tire radial direction with respect to the tire width direction of the straight line Lp connecting the intersection point P2 between the straight line L2 drawn in the tire width direction at the flange height Rh on the specified rim R and the carcass body portion 6a to the intersection point P1 between the straight line L1 drawn in the tire width direction at the outermost position in the tire radial direction of the bead core 21 and the carcass body portion 6a is within a range 60°≤θp≤75°. Manufacturing the pneumatic tire 1 in this manner allows the pneumatic tire 1 according to the first embodiment to be manufactured.

Functions and Effects

At the time of mounting the pneumatic tire 1 according to the first embodiment on a vehicle, the bead base portion 40 is first fitted to the specified rim R of the rim wheel to mount the pneumatic tire 1 on the specified rim R, and the pneumatic tire 1 is mounted on the rim wheel. Once mounted on the rim, the pneumatic tire 1 is inflated, and the pneumatic tire 1 inflated is mounted on the vehicle. The pneumatic tire 1 according to the first embodiment is mounted on a large vehicle such as a vehicle, for example, used in a mine and is used under a large load condition.

When the vehicle on which the pneumatic tires 1 are mounted is driven, the pneumatic tires 1 rotate while the tread contact surface 3 located at the bottom of the tread contact surface 3 comes into contact with the road surface. The vehicle is driven by transferring a driving force or a braking force to the road surface by a frictional force between the tread contact surface 3 and the road surface or by generating a turning force.

During traveling of the vehicle on which the pneumatic tires 1 are mounted, the vehicle can travel by the frictional force generated between the tread contact surface 3 of the pneumatic tire 1 and the road surface in this manner; however, loads in various directions act on portions of the pneumatic tire 1 during traveling of the vehicle. The loads acting on the pneumatic tire 1 are received by the pressure of the air filled inside, the carcass 6 disposed as the framework of the pneumatic tire 1, and the like.

For example, due to the weight of the vehicle and the recesses and protrusions of the road surface, the load acting in the tire radial direction between the tread portion 2 and the bead portion 20 is mainly received by the pressure of the air filled into the pneumatic tire 1 or by deflection of the sidewall portions 5 or the like. In particular, since the pneumatic tire 1 according to the first embodiment is mounted on a large vehicle and used under a large load condition, the sidewall portions 5 and the carcass 6 receive a very large load. Accordingly, a large tension acts on the carcass 6.

The carcass 6 is folded back around the bead core 21 in the bead portion 20 and thus held by the bead portion 20, and thus, when a large tension acts on the carcass 6, the tension of the carcass 6 is transmitted to the bead core 21, 20, and a large force acts between the carcass 6 and the bead core 21. In other words, the carcass 6 is folded back around the bead core 21 in the bead portion and thus a tension in a direction from the bead portion 20 side toward the outer side in the tire radial direction acts on the carcass body portion 6a when the tension acts on the carcass 6. As a result, a large force also acts between the bead core 21 and the carcass 6.

Here, the sidewall portion 5 is inclined with respect to the tire radial direction in a direction toward the outer side in the tire width direction from the position of the bead portion 20 toward the outer side in the tire radial direction. Accordingly, when large tension acts on the carcass body portion 6a, the carcass body portion 6a generates a force in a direction toward the outer side in the tire width direction at a location near the bead portion 20 while being pulled in the tire radial direction.

On the other hand, in a pneumatic tire mounted on a large vehicle such as a vehicle and used under a large load condition, a bead core formed to have a substantially hexagonal cross-sectional shape in a tire meridian cross-section is often used, and in this case, the bead core has a corner portion that projects toward the inner side in the tire width direction. Accordingly, when a large tension acts on a carcass and a carcass body portion is about to move in the tire radial direction due to the tension while generating a force toward the outer side in the tire width direction at a location near a bead portion, the carcass body portion rubs against the corner portion that projects toward the inner side in the tire width direction in the bead core while applying a large load on the corner portion. This causes, in the carcass body portion, the coating rubber to be worn and the carcass cord to be directly rubbed, and a failure such as breakage of the carcass cord may occur.

The carcass is folded back around the bead core, and thus, when a large tension acts on the carcass, rubbing occurs between the carcass and the bead core even at a position other than the corner portion that projects toward the inner side in the tire width direction in the bead core, and a failure such as breakage of the carcass cord may occur in the carcass due to such rubbing.

In contrast, in the pneumatic tire 1 according to the first embodiment, the bead core 21 has a portion located on the innermost side in the tire width direction and a portion located on the outermost side in the tire width direction in the contour in the tire meridian cross-section each formed as the vertical line extending along the tire radial direction. In other words, the bead core 21, which has a position of the maximum width of the bead core 21 in the tire width direction formed in a shape forming the vertical line 25 extending along the tire radial direction, is formed without a corner portion that projects with respect to the tire width direction. This allows, even when a large force acts between the carcass 6 and the bead core 21 due to the large tension acting on the carcass 6, the occurrence of stress concentration to be reduced and the stress acting between the carcass 6 and the bead core 21 to be distributed. Accordingly, the wear of the coating rubber 6d of the carcass body portion 6a due to the stress concentration generated between the carcass 6 and the bead core 21 can be suppressed, and the occurrence of a failure such as breakage of the carcass cord 6c due to direct rubbing of the carcass cord 6c caused by the wear of the coating rubber 6d can be reduced.

The length CV of the vertical lines 25 located on the both sides of the bead core 21 in the tire width direction is within the range of 20% or more and 30% or less with respect to the core height CH, and thus the stress generated between the carcass 6 and the bead core 21 can be more reliably dispersed. In other words, when the length CV of the vertical line 25 is less than 20% with respect to the core height CH, the length CV of the vertical line 25 is too short, and thus even forming the vertical lines 25 on the both sides of the bead core 21 in the tire width direction may make it difficult to effectively suppress the stress concentration generated between the carcass 6 and the bead core 21. When the length CV of the vertical line 25 is larger than 30% with respect to the core height CH, the length CV of the vertical line 25 is too long, and thus even forming the vertical lines 25 on the both sides of the bead core 21 in the tire width direction may cause stress concentration to occur between the carcass 6 and the bead core 21 at both end positions in the length direction of the vertical line 25.

In contrast, when the length CV of the vertical line 25 is within the range of 20% or more and 30% or less with respect to the core height CH, the stress generated between the carcass 6 and the bead core 21 can be more reliably dispersed by the vertical lines 25 formed on the both sides of the bead core 21 in the tire width direction. This can more reliably reduce the occurrence of a failure such as breakage of the carcass cord 6c due to the stress concentration generated between the carcass 6 and the bead core 21.

The vertical line 25 of the bead core 21 has the distance Va in the tire radial direction from the bead core bottom surface 23 to the inner end portion in the tire radial direction of the vertical line 25 within the range of 30% or more and 40% or less with respect to the core height CH, allowing the occurrence of stress concentration generated between the carcass 6 and the bead core 21 to be more reliably reduced. In other words, when the distance Va in the tire radial direction from the bead core bottom surface 23 to the inner end portion 25a in the tire radial direction of the vertical line 25 is less than 30% with respect to the core height CH, the position of the vertical line 25 may be too close to the inner side in the tire radial direction.

When the distance Va in the tire radial direction from the bead core bottom surface 23 to the inner end portion 25a in the tire radial direction of the vertical line 25 is larger than 40% with respect to the core height CH, the position of the vertical line 25 may be too close to the outer side in the tire radial direction. In these cases, the shape of the bead core 21 in which the vertical lines 25 are formed on the both sides in the tire width direction is unlikely to be a shape along the shape of the carcass 6 folded back at the bead portion 20. This causes stress concentration between the carcass 6 and the bead core 21, and a failure such as breakage of the carcass cord 6c may easily occur.

In contrast, when the distance Va in the tire radial direction from the bead core bottom surface 23 to the inner end portion 25a in the tire radial direction of the vertical line 25 is within the range of 30% or more and 40% or less with respect to the core height CH, the shape of the bead core 21 in which the vertical lines 25 are formed on the both sides in the tire width direction can be brought close to a shape along the shape of the carcass 6 folded back at the bead portion 20. This can more reliably reduce the occurrence of stress concentration between the carcass 6 and the bead core 21 and the occurrence of a failure such as breakage of the carcass cord 6c due to the stress concentration generated between the carcass 6 and the bead core 21.

For the first layer 31a, the second layer 31b, and the third layer 31c counted from the inner side in the tire radial direction of the plurality of layers 31 formed by the bead wire 30 in the bead core 21, in two of the layers 31 adjacent to each other in the tire radial direction, the number of bead wires 30 in the layer 31 located relatively on the outer side in the tire radial direction is larger by two or more than the number of bead wires 30 in the layer 31 located on the inner side in the tire radial direction. This can make the contour shape of the bead core 21 from the first layer 31a to the third layer 31c in the tire meridian cross-section a shape having a small inclination angle in the tire radial direction with respect to the tire width direction. Accordingly, the cross-sectional shape of the bead core 21 at a position close to the bead core bottom surface 23 can be brought closer to a shape along the shape of the carcass 6 folded back at the bead portion 20.

For the first layer 31a, the second layer 31b, and the third layer 31c of the plurality of layers 31 formed by the bead wire 30, in two of the layers 31 adjacent to each other in the tire radial direction, the misalignment amount in the tire width direction between the bead wires 30 each located at an end portion on one side in the tire width direction is one-half of the thickness of the bead wire 30. This can suppress the excessively increasing misalignment amount in the tire width direction between the bead wires 30 at a portion straddling two of the layers 31 adjacent to each other in the tire radial direction and can suppress the loss of shape of the bead core 21 due to the excessively increasing misalignment amount between the bead wires 30 at the portion straddling two of the layers 31 adjacent to each other in the tire radial direction.

In addition, the side on which the misalignment amount between the bead wires 30 in the first layer 31a and the second layer 31b is one-half of the thickness of the bead wire 30 is located opposite in the tire width direction to the side on which the misalignment amount between the bead wires 30 located in the second layer 31b and the third layer 31c is one-half of the thickness of the bead wire 30. This can bring the contour shape of the bead core 21 from the first layer 31a to the third layer 31c of the bead core 21 in the tire meridian cross-section close to a shape along the shape of the carcass 6 folded back at the bead portion 20 in a well-balanced manner on the both sides in the tire width direction. Accordingly, the stresses generated between the carcass 6 and the bead cores 21 can be more reliably dispersed, and the occurrence of a failure such as breakage of the carcass cord 6c due to the stress concentration generated between the carcass 6 and the bead cores 21 can be more reliably reduced. As a result, the durability of the bead portion 20 can be improved.

The bead core 21 is formed in a shape in which the vertical line 25 is formed on the outer side in the tire width direction, allowing contact pressure between the rim wheel and the bead portion outer surface 45 to be made nearly uniform compared to a bead core having a substantially hexagonal cross-sectional shape. In other words, when the bead core has a substantially hexagonal cross-sectional shape, the bead core is formed having a portion on the outer side in the tire width direction having a corner portion that projects toward the outer side in the tire width direction, and thus the contact pressure between the rim wheel and the bead portion outer surface is high at the corner portion, whereas the contact pressure between the rim wheel and the bead portion outer surface is likely to be low at portions other than the corner portion. In this case, it may be difficult to have air-sealing properties at a portion between the rim wheel and the bead portion outer surface in mounting the pneumatic tire on the rim wheel and inflating the pneumatic tire.

In contrast, in the first embodiment, the bead core 21 is formed in a shape in which the vertical line 25 is formed on the outer side in the tire width direction, allowing a change in the distance between the bead core 21 and the bead portion outer surface 45 to be reduced. In other words, the area of a portion where contact pressure on the rim wheel from the bead core 21 can be increased can be made larger. This allows for substantially uniform contact pressure between the rim wheel and the bead portion outer surface 45. As a result, air-sealing properties at the bead portion 20 can be improved.

The width CBW of the bead core bottom surface 23 in the tire meridian cross-section is within the range of 35% or more and 45% or less with respect to the maximum width CW of the bead core 21, allowing the occurrence of stress concentration between the bead core bottom surface 23 and the carcass 6 to be reduced. In other words, when the width CBW of the bead core bottom surface 23 is less than 35% with respect to the maximum width CW of the bead core 21, the width CBW of the bead core bottom surface 23 is too narrow, and thus the shape of the bead core 21 in the tire meridian cross-section may excessively project toward the lower side in the tire radial direction. In this case, stress concentration is likely to occur between the carcass 6 and the bead core 21 at a location near the bead core bottom surface 23 of the bead core 21. When the width CBW of the bead core bottom surface 23 is larger than 45% with respect to the maximum width CW of the bead core 21, the width CBW of the bead core bottom surface 23 is too wide, and thus stress concentration is likely to occur between the carcass 6 and the bead core 21 at both end positions of the bead core bottom surface 23 in the width direction.

In contrast, when the width CBW of the bead core bottom surface 23 is within the range of 35% or more and 45% or less with respect to the maximum width CW of the bead core 21, the occurrence of stress concentration between the bead core bottom surface 23 and the carcass 6 can be effectively reduced. This can more reliably reduce the occurrence of a failure such as breakage of the carcass cord 6c due to the stress concentration generated between the carcass 6 and the bead core 21. Resultantly, the durability of the bead portion 20 can be more reliably improved.

The bead core 21 has the distance Vb in the tire width direction between the end portion 22in in the tire width direction of the bead core top surface 22 and the vertical line 25 on the inner side in the tire width direction within the range of 25% or more and 40% or less with respect to the maximum width CW of the bead core 21 and the distance Vc in the tire width direction between the end portion 23in on the inner side in the tire width direction of the bead core bottom surface 23 and the vertical line 25 on the inner side in the tire width direction within the range of 25% or more and 40% or less with respect to the maximum width CW of the bead core 21, allowing the stress concentration generated between the carcass 6 and the bead core 21 to be more reliably suppressed. In other words, when the distance Vb between the end portion 22in on the inner side in the tire width direction of the bead core top surface 22 and the vertical line 25 on the inner side in the tire width direction or the distance Vc between the end portion 23in on the inner side in the tire width direction of the bead core bottom surface 23 and the vertical line 25 on the inner side in the tire width direction is less than 25% with respect to the maximum width CW of the bead core 21, the projection amount of the bead core 21 from the position of the bead core top surface 22 or the bead core bottom surface 23 toward the inner side in the tire width direction may excessively decrease. In this case, the shape of a surface located on the inner side in the tire width direction of the bead core 21 in the tire meridian cross-section is less likely to be a shape along the curved shape of a portion located on the inner side in the tire width direction of the bead core 21 in the carcass 6, and this may cause stress concentration to easily occur between the carcass 6 and the bead core 21.

When the distance Vb between the end portion 22in on the inner side in the tire width direction of the bead core top surface 22 and the vertical line 25 on the inner side in the tire width direction or the distance Vc between the end portion 23*in* on the inner side in the tire width direction of the bead core bottom surface 23 and the vertical line 25 on the inner side in the tire width direction is larger than 40% with respect to the maximum width CW of the bead core 21, the projection amount of the bead core 21 from the position of the bead core top surface 22 or the bead core bottom surface 23 toward the inner side in the tire width direction may excessively increase. Also in this case, the shape of the surface located on the inner side in the tire width direction of the bead core 21 in the tire meridian cross-section is less likely to be a shape along the curved shape of a portion located on the inner side in the tire width direction of the bead core 21 in the carcass 6, and thus stress concentration may be likely to occur between the carcass 6 and the bead core 21.

In contrast, the distance Vb between the end portion 22*in* on the inner side in the tire width direction of the bead core top surface 22 and the vertical line 25 on the inner side in the tire width direction or the distance Vc between the end portion 23*in* on the inner side in the tire width direction of the bead core bottom surface 23 and the vertical line 25 on the inner side in the tire width direction is within the range of 25% or more and 40% or less with respect to the maximum width CW of the bead core 21. Accordingly, the shape of the surface located on the inner side in the tire width direction of the bead core 21 in the tire meridian cross-section can be a shape along the curved shape of a portion located on the inner side in the tire width direction of the bead core 21 in the carcass 6. This can more reliably reduce the occurrence of stress concentration between the carcass 6 and the bead core 21. Resultantly, the durability of the bead portion 20 can be more reliably improved.

The bead core 21 has the maximum width CW of the bead core 21 within the range of 0.9 times or more and 1.3 times or less as large as the core height CH, and thus the occurrence of stress concentration between the carcass 6 and the bead core 21 can be more reliably reduced. In other words, when the maximum width CW of the bead core 21 is less than 0.9 times as large as the core height CH, the maximum width CW of the bead core 21 is too narrow. Accordingly, it is difficult to bring the shape of the bead core 21 in the tire meridian cross-section into a shape along the shape of the carcass 6 folded back around the bead core 21, and thus stress concentration may be likely to occur between the carcass 6 and the bead core 21. Specifically, when the maximum width CW of the bead core 21 is too narrow, stress concentration may be likely to occur between the bead core 21 and a portion located near the bead core bottom surface 23 in the carcass 6 folded back around the bead core 21.

When the maximum width CW of the bead core 21 is 1.3 times larger than the core height CH, the maximum width CW of the bead core 21 is too wide, also in this case, it is difficult to bring the shape of the bead core 21 in the tire meridian cross-section into a shape along the shape of the carcass 6, and thus stress concentration may be likely to occur between the carcass 6 and the bead core 21. Specifically, the maximum width CW of the bead core 21 is too wide or too narrow, and thus stress concentration may be likely to occur between the bead core 21 and a portion located near either side in the tire width direction of the bead core 21 in the carcass 6 folded back around the bead core 21.

In contrast, when the maximum width CW of the bead core 21 is within the range of 0.9 times or more and 1.3 times or less as large as the core height CH, the shape of the bead core 21 in the tire meridian cross-section can be brought close to a shape along the shape of the carcass 6 folded back around the bead core 21. This can more reliably reduce the occurrence of stress concentration between the carcass 6 and the bead core 21. Resultantly, the durability of the bead portion 20 can be more reliably improved.

The carcass 6 has the inclination angle $\theta 1p$ of the carcass cord 6*c* with respect to the tire circumferential direction at a position in the tire radial direction identical to the position in the tire radial direction of the bead core top surface 22 within the range $80° \leq \theta 1p \leq 89°$, allowing the rigidity of the carcass 6 to be appropriately ensured. In other words, when the inclination angle $\theta 1p$ of the carcass cord 6*c* with respect to the tire circumferential direction is $\theta 1p \leq 80°$, the inclination angle $\theta 1p$ of the carcass cord 6*c* with respect to the tire circumferential direction is too small, and thus it may be difficult to have the rigidity of the carcass 6 with respect to the tire radial direction. In this case, for example, when the turned-up portion 6*b* of the carcass 6 receives a large force from the rim flange due to the receipt of a large load at the pneumatic tire 1, the turned-up portion 6*b* is less likely to receive this force in a wide range, and thus compressive stresses due to this force may be more likely to occur locally. This may cause the carcass cord 6*c* of the turned-up portion 6*b* to be easily damaged.

When the inclination angle $\theta 1p$ of the carcass cord 6*c* with respect to the tire circumferential direction is $\theta 1p > 89°$, the inclination angle $\theta 1p$ of the carcass cord 6*c* with respect to the tire circumferential direction is too large, and thus the rigidity of the carcass 6 with respect to the tire radial direction may excessively increase. In this case, the difference in rigidity between the turned-up edge 6*ba* of the turned-up portion 6*b* and the surrounding member may be too large, and separation may be likely to occur at a location near the turned-up edge 6*ba*.

In contrast, when the inclination angle $\theta 1p$ of the carcass cord 6*c* at a position in the tire radial direction identical to the position in the tire radial direction of the bead core top surface 22 is within the range $80° \leq \theta 1p \leq 89°$, the rigidity of the carcass 6 can be appropriately ensured, and in particular, the rigidity of the turned-up portion 6*b* can be appropriately ensured. This can reduce the likelihood of local generation of a compressive stress in the turned-up portion 6*b*, thus can reduce the likelihood of damage in the carcass cord 6*c* and can reduce the occurrence of separation at or near the turned-up edge 6*ba* due to the difference in rigidity between the turned-up edge 6*ba* and the surrounding member. Resultantly, the durability of the bead portion 20 can be more reliably improved.

The lower filler 51 included in the bead filler 50 has the modulus at 100% elongation within the range of 7.5 MPa or more and 10.5 MPa or less, allowing the rigidity of the bead portion 20 to be ensured while suppressing the excessively increasing difference in rigidity between the lower filler 51 and the surrounding member. In other words, the force in a direction in which the bead toe 41 side of the bead base portion 40 is lifted from the rim wheel is easily applied to the bead portion 20 by the tension from the carcass 6. When the bead toe 41 side is lifted from the rim wheel, a large force is applied to a portion of the bead base portion 40 other than the bead toe 41. In particular, when the modulus of the lower filler 51 at 100% elongation is less than 7.5 MPa, the modulus of the lower filler 51 is low, and thus the bead toe 41 side of the bead base portion 40 is easily lifted from the rim wheel by the tension from the carcass 6. In this case, since a large force acts on a portion of the bead base portion 40 other than the bead toe 41, a large load is applied to the portion other than the bead toe 41, and the durability of the bead base portion 40 may easily decrease due to this load.

Meanwhile, when the modulus of the lower filler 51 at 100% elongation is larger than the 10.5 MPa, the rigidity of the lower filler 51 is too high, and the difference in rigidity between the lower filler 51 and the surrounding member may excessively increase. In this case, separation may be likely to occur between the lower filler 51 and the surrounding member due to the difference in rigidity.

In contrast, when the modulus of the lower filler 51 at 100% elongation is within the range of 7.5 MPa or more and 10.5 MPa or less, the rigidity of the bead portion 20 can be more reliably ensured by the lower filler 51, and the lifting of the bead toe 41 side of the bead base portion 40 due to the tension from the carcass 6 can be suppressed. This can reduce a large load to be applied to a portion of the bead base portion 40 other than the bead toe 41 and can suppress the decrease of durability of the bead base portion 40. When the modulus at 100% elongation of the lower filler 51 is within the range of 7.5 MPa or more and 10.5 MPa or less, excessively increasing rigidity of the lower filler 51 can be suppressed, allowing the occurrence of separation between the lower filler 51 and the surrounding member to be reduced. As a result, the durability of the bead portion 20 can be more reliably improved.

The lower filler 51 has the height FH from the bead core bottom surface 23 to the lower filler outer end 51*a* in the tire radial direction within the range of 50% or more and 70% or less with respect to the height TH from the bead core bottom surface 23 to the turned-up edge 6*ba* in the tire radial direction. This can suppress stress concentration generated at a location near the lower filler outer end 51*a* in the turned-up portion 6*b* and improve the durability of the bead base portion 40. In other words, when the height FH from the bead core bottom surface 23 to the lower filler outer end 51*a* is less than 50% with respect to the height TH from the bead core bottom surface 23 to the turned-up edge 6*ba*, the height of the lower filler 51 in the tire radial direction is too low, and thus it may be difficult to effectively improve the rigidity of the bead portion 20 even when the lower filler 51 is disposed. In this case, even when the lower filler 51 is disposed, it may be difficult to effectively improve the durability of the bead base portion 40.

When the height FH from the bead core bottom surface 23 to the lower filler outer end 51*a* is 70% greater than the height TH from the bead core bottom surface 23 to the turned-up edge 6*ba*, the height of the lower filler 51 in the tire radial direction is too high, and thus strain may be likely to occur in the turned-up portion 6*b* of the carcass 6. Specifically, a position away from the bead core bottom surface 23 toward the outer side in the tire radial direction is close to the sidewall portion 5. However, the sidewall portion 5 is a portion where deflection is likely to occur depending on a load acting on the pneumatic tire 1. Accordingly, when the height of the lower filler 51 is high, the lower filler outer end 51*a* of the lower filler 51 comes close to the sidewall portion 5, and the lower filler 51 enters a portion where deflection is likely to occur. Meanwhile, the lower filler 51 is a rubber member having relatively high rigidity, and thus, when a large load is applied to the pneumatic tire 1, a large difference may occur in the way of deflection between a portion where the lower filler 51 is disposed and a portion where the lower filler 51 is not disposed. Due to such a difference in the way of deflection, in the turned-up portion 6*b* disposed on the outer side of the lower filler 51 in the tire width direction in the carcass 6, strain is generated at a location near the lower filler outer end 51*a* and stress concentration may be likely to occur.

In contrast, when the height FH from the bead core bottom surface 23 to the lower filler outer end 51*a* is within the range of 50% or more and 70% or less with respect to the height TH from the bead core bottom surface 23 to the turned-up edge 6*ba*, the rigidity of the bead portion 20 can be effectively improved by the lower filler 51 while the occurrence of a large difference in the way of deflection at a location near the lower filler outer end 51*a* is reduced. This can reduce the occurrence of stress concentration at or near the lower filler outer end 51*a* in the turned-up portion 6*b* and improve the durability of the bead base portion 40. Resultantly, the durability of the bead portion 20 can be more reliably improved.

In the bead filler 50, the ratio of the area of the lower filler 51 to the area of the bead filler 50 in the tire meridian cross-section in the range on the inner side in the tire radial direction from the turned-up edge 6*ba* is within the range of 45% or more and 55% or less, allowing stress concentration generated at a location near the lower filler outer end 51*a* in the turned-up portion 6*b* to be suppressed and the durability of the bead base portion 40 to be improved. In other words, when the ratio of the area of the lower filler 51 to the area of the bead filler 50 in the range on the inner side in the tire radial direction from the turned-up edge 6*ba* is less than 45%, the ratio of the lower filler 51 in the bead filler 50 is too small, and thus it may be difficult to effectively have the rigidity of the bead portion 20. In this case, it may be difficult to effectively improve the durability of the bead base portion 40 by the lower filler 51.

When the ratio of the area of the lower filler 51 to the area of the bead filler 50 in the range on the inner side in the tire radial direction from the turned-up edge 6*ba* is greater than 55%, the ratio of the lower filler 51 in the bead filler 50 is too large, and thus the rigidity of a portion where the lower filler 51 is disposed may excessively increase. In this case, a large difference may be likely to occur in the way of deflection between a portion where the lower filler 51 is disposed and a portion where the lower filler 51 is not disposed. Accordingly, due to such a difference in the way of deflection, stress concentration may be likely to occur at a location near a portion of the turned-up portion 6*b* where the lower filler outer end 51*a* is located.

In contrast, when the ratio of the area of the lower filler 51 to the area of the bead filler 50 in the range on the inner side in the tire radial direction from the turned-up edge 6*ba* is within the range of 45% or more and 55% or less, the rigidity of the bead portion 20 can be effectively improved by the lower filler 51 while the occurrence of a large difference in the way of deflection between a portion where the lower filler 51 is disposed and a portion where the lower filler 51 is not disposed. This can reduce the occurrence of stress concentration at or near the lower filler outer end 51*a* in the turned-up portion 6*b* and improve the durability of the bead base portion 40. Resultantly, the durability of the bead portion 20 can be more reliably improved.

The bead portion 20 has the ratio Db/Dc of the distance Db between the bead core 21 and the carcass cord 6*c* of the turned-up portion 6*b* on the straight line HL drawn from the center of gravity position CC of the bead core 21 to the outer side in the tire width direction to the distance Dc between the carcass cord 6*c* of the turned-up portion 6*b* and the bead portion outer surface 45 on the straight line HL within the range of 10% or more and 15% or less. This can effectively increase the contact pressure between the rim wheel and the bead portion outer surface 45 while suppressing an excessively increasing load on the carcass cord 6*c*. In other words, when the ratio Db/Dc of the distance Db between the bead core 21 and the carcass cord 6c of the turned-up portion 6b to the distance Dc between the carcass cord 6c of the turned-up portion 6b and the bead portion outer surface 45 is less than 10%, the distance Db between the bead core 21 and the carcass cord 6c of the turned-up portion 6b is too small, and thus a load on the carcass cord 6c may excessively increase, and a failure or the like such as breakage of the carcass cord 6c may be likely to occur.

When the ratio Db/Dc of the distance Db between the bead core 21 and the carcass cord 6c of the turned-up portion 6b to the distance Dc between the carcass cord 6c of the turned-up portion 6b and the bead portion outer surface 45 is greater than 15%, the distance Db between the bead core 21 and the carcass cord 6c of the turned-up portion 6b is too large, and thus it may be difficult to effectively increase contact pressure between the rim wheel and the bead portion outer surface 45. In other words, when the distance Db between the bead core 21 and the carcass cord 6c of the turned-up portion 6b is too large, the amount of rubber member located therebetween is large, and the amount of buffer material is large. In this case, pressing force applied from the bead core 21 to a portion of the rim wheel, which is in contact with the bead portion outer surface 45 is reduced by the rubber member serving as a cushioning material. Accordingly, the contact pressure between the rim wheel and the bead portion outer surface 45 may be unlikely to increase.

In contrast, when the ratio Db/Dc of the distance Db between the bead core 21 and the carcass cord 6c of the turned-up portion 6b to the distance Dc between the carcass cord 6c of the turned-up portion 6b and the bead portion outer surface 45 is within the range of 10% or more and 15% or less, the contact pressure between the rim wheel and the bead portion outer surface 45 can be effectively increased while the excessively increasing load on the carcass cord 6c suppressed. As a result, the durability of the bead portion 20 can be improved, and air-sealing properties at the bead portion 20 can be improved.

The bead portion 20 has the ratio Dd/BW of the distance Dd between the bead wire 30 located on the outermost side in the tire width direction in the bead core 21 and the bead portion outer surface 45 to the width BW in the tire width direction of the bead base portion 40 within the range of 20% or more and 25% or less, and thus contact pressure on the rim wheel can be appropriately increased at any position of the bead base portion 40 and the bead portion outer surface 45. In other words, when the ratio Dd/BW of the distance Dd between the bead wire 30 located on the outermost side in the tire width direction of the bead core 21 and the bead portion outer surface 45 to the width BW of the bead base portion 40 is less than 20%, the position of the bead core 21 in the tire width direction may be too close to the outer side in the tire width direction. In this case, it may be difficult to ensure contact pressure on the rim wheel at the position of the bead base portion 40 close to the bead toe 41 in mounting the pneumatic tire on the rim wheel, and it may be difficult to have air-sealing properties.

When the ratio Dd/BW of the distance Dd between the bead wire 30 located on the outermost side in the tire width direction of the bead core 21 and the bead portion outer surface 45 to the width BW of the bead base portion 40 is greater than 25%, the position of the bead core 21 in the tire width direction may be too close to the inner side in the tire width direction. In this case, it may be difficult to ensure contact pressure between the bead portion outer surface 45 and the rim wheel and contact pressure on the rim wheel at the position of the bead base portion 40 close to the bead heel 42 in mounting the pneumatic tire on the rim wheel, and it may be difficult to have air-sealing properties.

In contrast, when the ratio Dd/BW of the distance Dd between the bead wire 30 located on the outermost side in the tire width direction of the bead core 21 and the bead portion outer surface 45 to the width BW of the bead base portion 40 is within the range of 20% or more and 25% or less, the position of the bead core 21 in the tire width direction can be disposed at a more appropriate position. This can appropriately increase contact pressure on the rim wheel at any position of the bead base portion 40 and the bead portion outer surface 45. As a result, air-sealing properties at the bead portion 20 can be more reliably improved.

The radius of curvature RC of the arc of the carcass line of the carcass 6 is 1.0 times or more and 1.5 times or less as large as the radius of curvature RB of the arc RA passing through the inner end portion 25a of the vertical line 25 of the bead core 21, the end portion 23out on the outer side in the tire width direction of the bead core bottom surface 23, and the intermediate vertex 28, and thus uneven contact pressure between the bead portion 20 and the rim wheel can be suppressed. In other words, when the radius of curvature RC of the arc of the carcass line of the carcass 6 is less than 1.0 times or more than 1.5 times as large as the radius of curvature RB of the arc RA on the bead core 21 side, the cross-sectional shape of the bead core 21 in the tire meridian cross-section may be likely to deviate significantly from the carcass line. In this case, the amount of rubber member interposed between the bead core 21 and the carcass 6 is large, which causes contact pressure between the bead portion 20 and the rim wheel to be uneven, and air-sealing properties may be likely to degrade.

In contrast, when the ratio RC/RB between the radius of curvature RC of the arc of the carcass line and the radius of curvature RB of the arc RA on the bead core 21 side is within the range of 1.0 times or more and 1.5 times or less, the cross-sectional shape of the bead core 21 in the tire meridian cross-section can be made a shape along the carcass line. This can reduce the amount of rubber member interposed between the bead core 21 and the carcass 6 and can suppress uneven contact pressure between the bead portion 20 and the rim wheel. As a result, air-sealing properties at the bead portion 20 can be more reliably improved.

The rim cushion rubber 46 having the modulus at 100% elongation within the range of 3.5 MPa or more and 5.5 MPa or less can reduce the occurrence of chipping in the rim cushion rubber 46 and suppress the likelihood of deformation of the rim cushion rubber 46. In other words, when the modulus of the rim cushion rubber 46 is less than 3.5 MPa, the rim cushion rubber 46 is too soft, and thus the rim cushion rubber 46 may be likely to be deformed when traveling is repeated after the pneumatic tire 1 is mounted on the rim wheel. In this case, a portion where contact pressure with the rim wheel is decreased may be generated, and air may be likely to leak from the portion where the contact pressure is decreased. When the modulus of the rim cushion rubber 46 is greater than 5 MPa, the rim cushion rubber 46 is too hard, and thus chipping may be likely to occur in the rim cushion rubber 46 when a large force is applied to the rim cushion rubber 46 in, for example, mounting of the pneumatic tire 1.

In contrast, the rim cushion rubber 46 having the modulus at 100% elongation within the range of 3.5 MPa or more and 5.5 MPa or less can make the hardness of the rim cushion rubber 46 to which the rim wheel is fitted appropriate hardness. This can reduce the occurrence of chipping in the rim cushion rubber 46, suppress the likelihood of deformation of the rim cushion rubber 46, and reduce the occurrence of a portion where contact pressure with the rim wheel is decreased. As a result, air-sealing properties at the bead portion 20 can be more reliably improved.

The bead portion 20 has, in the tire meridian cross-section, the inclination angle θp in the tire radial direction with respect to the tire width direction of the straight line Lp connecting the intersection point P2 corresponding to the flange height Rh on the carcass body portion 6a to the intersection point P1 corresponding to the bead core top surface 22 within the range 60°≤θp≤75°, allowing the occurrence of separation between the carcass body portion 6a and the surrounding member to be reduced. In other words, when the inclination angle θp of the straight line Lp is θp≤60°, the inclination angle θp of the straight line Lp is too small, and thus the carcass body portion 6a may excessively fall over in a direction toward the bead core 21. In this case, pressures acting between the carcass body portion 6a and the bead filler 50 may excessively increase, and separation may be likely to occur between the carcass body portion 6a and the bead filler 50. When the inclination angle θp of the straight line Lp is θp>75°, the inclination angle θp of the straight line Lp is too large, and thus, when a load in the tire radial direction acts on the pneumatic tire 1, force in a direction along the extension direction of the carcass body portion 6a in the tire meridian cross-section may be likely to act on the carcass body portion 6a. In this case, the carcass body portion 6a is likely to be deformed in a buckled shape, which may cause separation to easily occur between the carcass body portion 6a and the rubber member located on the inner side of the carcass body portion 6a in the tire width direction.

In contrast, when the inclination angle θp of the straight line Lp is within the range 60°≤θp≤75°, the carcass body portion 6a excessively falling over in the direction toward the bead core 21 or being deformed in a buckled shape can be suppressed. As a result, the occurrence of separation between the carcass body portion 6a included in the carcass 6 and the surrounding member can be reduced, and carcass separation resistance, which is separation resistance of the carcass 6, can be improved.

The bead portion 20 has, in the tire meridian cross-section, the inclination angle θpu in the tire radial direction with respect to the tire width direction of the straight line Lu connecting the intersection point P2 corresponding to the flange height Rh on the carcass body portion 6a to the intersection point P3 corresponding to the position twice as high as the flange height Rh within the range 50°≤θpu≤70°, allowing the occurrence of separation between the carcass body portion 6a and the surrounding member to be reduced. In other words, when the inclination angle θpu of the straight line Lu is θpu<50°, the inclination angle θpu of the straight line Lu is too small, and thus the carcass body portion 6a may excessively fall over in a direction toward the rim flange. In this case, pressures acting between the carcass body portion 6a and the bead filler 50 may excessively increase, and separation may be likely to occur between the carcass body portion 6a and the bead filler 50. When the inclination angle θpu of the straight line Lu is θpu>70°, the inclination angle θpu of the straight line Lu is too large, and thus, when a load in the tire radial direction acts on the pneumatic tire 1, force in the direction along the extension direction of the carcass body portion 6a in the tire meridian cross-section may be likely to act on the carcass body portion 6a. In this case, the carcass body portion 6a is likely to be deformed in a buckled shape, which may cause separation to easily occur between the carcass body portion 6a and the rubber member located on the inner side of the carcass body portion 6a in the tire width direction.

In contrast, when the inclination angle θpu of the straight line Lu is within the range 50°≤θpu≤70°, the carcass body portion 6a excessively falling over in the direction toward the rim flange or being deformed in a buckled shape can be suppressed. As a result, carcass separation resistance can be more reliably improved.

The reinforcing layer 60 is disposed in the bead portion 20 along the carcass 6 at least on the inner side of the carcass body portion 6a in the tire width direction, and thus the rigidity of the bead portion 20 can be enhanced by the reinforcing layer 60. This allows the reinforcing layer 60 to suppress movement of the bead portion 20 when a load is applied to the pneumatic tire 1 and allows movement of the carcass 6 to be suppressed. Therefore, the occurrence of separation between the carcass 6 and the rubber member located around the carcass 6 can be more reliably reduced. As a result, carcass separation resistance can be more reliably improved.

The reinforcing layer 60 includes the plurality of reinforcing layers 60 including the plurality of cords 65 disposed layered, and the reinforcing layers 60 adjacent to each other of the plurality of reinforcing layers 60 have the inclination directions of the cords 65 in the tire circumferential direction with respect to the tire radial direction opposite to each other, allowing the rigidity of the entire reinforcing layer 60 to be more reliably increased. This allows the reinforcing layer 60 to more reliably increase the rigidity of the bead portion 20 by and allows the reinforcing layer 60 to more reliably suppress the movement of the bead portion 20 including the movement of the carcass 6. Therefore, the occurrence of separation between the carcass 6 and the rubber member located around the carcass 6 can be more reliably reduced. As a result, carcass separation resistance can be more reliably improved.

The reinforcing layer 60 includes three reinforcing layers of the first reinforcing layer 61, the second reinforcing layer 62, and the third reinforcing layer 63 counted from the carcass 6 side. The three reinforcing layers 60 have the relationships between the inner edge height Hrf11 of the first reinforcing layer 61, the inner edge height Hrf21 of the second reinforcing layer 62, and the inner edge height Hrf31 of the third reinforcing layer 63, and the flange height Rh with respect to the rim diameter reference position BL respectively satisfying 0.55≤Hrf11/Rh≤1.10, 1.05≤Hrf21/Rh≤1.40, and 1.25≤Hrf31/Rh≤1.60. This can reduce the occurrence of separation between the carcass 6 and the reinforcing layer 60. In other words, when the inner edge height Hrf11 of the first reinforcing layer 61 satisfies Hrf11/Rh<0.55, the inner edge height Hrf21 of the second reinforcing layer 62 satisfies Hrf21/Rh<1.05, or the inner edge height Hrf31 of the third reinforcing layer 63 satisfies Hrf31/Rh<1.25, the inner edge 60a of each reinforcing layer 60 may be located excessively on the inner side in the tire radial direction. In this case, stress concentration is likely to occur at a location near the inner edge 60a due to a large force acting around the bead core 21, which may cause separation to easily occur between the carcass 6 and the reinforcing layer 60.

When the inner edge height Hrf11 of the first reinforcing layer 61 satisfies Hrf11/Rh>1.10, the inner edge height Hrf21 of the second reinforcing layer 62 satisfies Hrf21/Rh>1.40, or the inner edge height Hrf31 of the third reinforcing layer 63 satisfies Hrf31/Rh>1.60, the inner edge 60a of each reinforcing layer 60 may be located excessively on the outer side in the tire radial direction. In this case, the difference in rigidity between the reinforcing layer 60 and the surrounding rubber member is likely to be large. Accordingly, the difference in rigidity is likely to cause stress concentration at a location near the inner edge 60a, which may cause separation to easily occur between the carcass 6 and the reinforcing layer 60.

In contrast, when the relationships between the inner edge height Hrf11 of the first reinforcing layer 61, the inner edge height Hrf21 of the second reinforcing layer 62, and the inner edge height Hrf31 of the third reinforcing layer 63, and the flange height Rh with respect to the rim diameter reference position BL respectively satisfy 0.55≤Hrf11/Rh≤1.10, 1.05≤Hrf21/Rh≤1.40, and 1.25≤Hrf31/Rh≤1.60, the inner edge 60a of each reinforcing layer 60 can be disposed at an appropriate position in the tire radial direction. This can reduce the occurrence of stress concentration at or near the inner edge 60a of each reinforcing layer 60 and can reduce the occurrence of separation between the carcass 6 and the reinforcing layer 60. As a result, carcass separation resistance can be more reliably improved.

The first reinforcing layer 61 is disposed folded back along the carcass 6 from the inner side in the tire width direction to the outer side in the tire width direction of the bead core 21, and the first reinforcing layer 61 has the relationship between the outer edge height Hrf12 and the flange height Rh with respect to the rim diameter reference position BL, satisfying 0.40≤Hrf12/Rh≤0.95, allowing the occurrence of separation between the carcass 6 and the first reinforcing layer 61 to be reduced. In other words, when the outer edge height Hrf12 of the first reinforcing layer 61 satisfies Hrf12/Rh<0.40, the outer edge 61b of the first reinforcing layer 61 may be located excessively on the inner side in the tire radial direction. In this case, stress concentration is likely to occur at a location near the outer edge 61b of the first reinforcing layer 61 due to a large force acting around the bead core 21, which may cause separation to easily occur between the carcass 6 and the first reinforcing layer 61. When the outer edge height Hrf12 of the first reinforcing layer 61 satisfies Hrf12/Rh>0.95, the outer edge 61b of the first reinforcing layer 61 may be located excessively on the outer side in the tire radial direction. In this case, the difference in rigidity between the first reinforcing layer 61 and the surrounding rubber member is likely to be large. Accordingly, the difference in rigidity is likely to cause stress concentration at a location near the outer edge 61b, which may cause separation to easily occur between the carcass 6 and the first reinforcing layer 61.

In contrast, when the relationship between the outer edge height Hrf12 of the first reinforcing layer 61 and the flange height Rh with respect to the rim diameter reference position BL satisfies 0.40≤Hrf12/Rh≤0.95, the outer edge 61b of the first reinforcing layer 61 can be disposed at an appropriate position in the tire radial direction. This can reduce the occurrence of stress concentration at or near the outer edge 61b of the first reinforcing layer 61 and can reduce the occurrence of separation between the carcass 6 and the first reinforcing layer 61 can be reduced. As a result, carcass separation resistance can be more reliably improved.

The relationship between the height Hrf22 of the inner edge 62b in the radial direction of the second reinforcing layer 62 and the flange height Rh with respect to the rim diameter reference position BL satisfies 0.05≤Hrf22/Rh≤0.35, Also, the relationship between the height Hrf32 of the inner edge 63b in the radial direction of the third reinforcing layer 63 and the flange height Rh with respect to the rim diameter reference position BL satisfies 0.20≤Hrf32/Rh≤0.50. Consequently, the occurrence of separation between the second reinforcing layer 62 or the third reinforcing layer 63 and the surrounding member can be reduced. In other words, when the height Hrf22 of the inner edge 62b in the radial direction of the second reinforcing layer 62 satisfies Hrf22/Rh<0.05 or the height Hrf32 of the inner edge 63b in the radial direction of the third reinforcing layer 63 satisfies Hrf32/Rh<0.20, the inner edge 62b in the radial direction of the second reinforcing layer 62 or the inner edge 63b in the radial direction of the third reinforcing layer 63 may be located excessively on the inner side in the tire radial direction. In this case, stress concentration is likely to occur at the inner edge 62b of the second reinforcing layer 62 or the inner edge 63b in the radial direction of the third reinforcing layer 63 due to a large force acting on a location near the bead base portion 40, which may cause separation to easily occur between the second reinforcing layer 62 and the surrounding member or between the third reinforcing layer 63 and the surrounding member.

When the height Hrf22 of the inner edge 62b in the radial direction of the second reinforcing layer 62 satisfies Hrf22/Rh>0.35 or the height Hrf32 of the inner edge 63b in the radial direction of the third reinforcing layer 63 satisfies Hrf32/Rh>0.50, the inner edge 62b of the second reinforcing layer 62 or the inner edge 63b in the radial direction of the third reinforcing layer 63 may be located excessively on the outer side in the tire radial direction. In this case, the difference in rigidity between the second reinforcing layer 62 or the third reinforcing layer 63 and the surrounding rubber member is likely to be large. Accordingly, the difference in rigidity is likely to cause stress concentration at a location near the inner edge 62b of the second reinforcing layer 62 or near the inner edge 63b in the radial direction of the third reinforcing layer 63, which may cause separation to easily occur between the second reinforcing layer 62 or the third reinforcing layer 63 and the surrounding member.

In contrast, when the relationships between the height Hrf22 of the inner edge 62b in the radial direction of the second reinforcing layer 62 and the flange height Rh with respect to the rim diameter reference position BL and between the height Hrf32 of the inner edge 63b in the radial direction of the third reinforcing layer 63 and the flange height Rh with respect to the rim diameter reference position BL respectively satisfy 0.05≤Hrf22/Rh≤0.35 and 0.20≤Hrf32/Rh≤0.50, the inner edge 62b in the radial direction of the second reinforcing layer 62 and the inner edge 63b in the radial direction of the third reinforcing layer 63 can be disposed at appropriate positions in the tire radial direction. This can reduce the occurrence of stress concentration at or near the inner edge 62b in the radial direction of the second reinforcing layer 62 and the inner edge 63b in the radial direction of the third reinforcing layer 63 and can reduce the occurrence of separation between the second reinforcing layer 62 and the surrounding member and between the third reinforcing layer 63 and the surrounding member. As a result, the occurrence of separation around the reinforcing layer 60 can be reduced.

The cords 66 included in the first reinforcing layer 61 have the inclination angle θrf1 within the range 20°≤θrf1≤65° with respect to the tire circumferential direction. The cords 67 included in the second reinforcing layer 62 have the inclination angle θrf2 within the range −65°≤θrf2≤20° with respect to the tire circumferential direction. The cords 68 included in the third reinforcing layer 63 have the inclination angle θrf3 within the range 20°≤θrf3≤65° with respect to the tire circumferential direction, allowing the occurrence of separation around the carcass 6 and the reinforcing layer 60 to be more reliably reduced. In other words, when the inclination angle θrf1 of the cords 66 included in the first reinforcing layer 61 is θrf1<20°, the inclination angle of the cords 67 included in the second reinforcing layer 62 is θrf2>−20°, or the inclination angle θrf3 of the cords 68 included in the third reinforcing layer 63 is θrf3<20°, the extension direction of the cords 65 of each reinforcing layer 60 is too close to the tire circumferential direction, and thus it may be difficult to have the rigidity of the reinforcing layer 60 with respect to the tire radial direction. In this case, even when the reinforcing layer 60 is disposed in the bead portion 20, it is difficult to effectively increase the rigidity of the bead portion 20 by the reinforcing layer 60, and it may be difficult to reduce the occurrence of separation between the carcass 6 and the rubber member located around the carcass 6.

When the inclination angle θrf1 of the cords 66 included in the first reinforcing layer 61 is θrf1>65°, the inclination angle θrf2 of the cords 67 included in the second reinforcing layer 62 is θrf2<−65°, or the inclination angle θrf3 of the cords 68 included in the third reinforcing layer 63 is θrf3>65°, the extension direction of the cords 65 of each reinforcing layer 60 is too close to the tire radial direction, and thus the rigidity of the reinforcing layer 60 with respect to the tire radial direction may excessively increase. In this case, the difference in rigidity between the inner edge 60a or the inner edges 62b in the radial direction, 63b of the reinforcing layer 60 and the surrounding member is too large, and separation may be likely to occur between the reinforcing layer 60 and the surrounding member at a location near these edges of the reinforcing layer 60.

In contrast, when the inclination angle θrf1 of the cords 66 included in the first reinforcing layer 61 is within the range 20°≤θrf1≤65°, the inclination angle θrf2 of the cords 67 included in the second reinforcing layer 62 is within the range −65°≤θrf2≤20°, and the inclination angle θrf3 of the cords 68 included in the third reinforcing layer 63 is within the range 20°≤θrf3≤65°, the rigidity of the reinforcing layer 60 with respect to the tire radial direction can be appropriately ensured. This allows the rigidity of the bead portion 20 can be effectively increased by the reinforcing layer 60 while suppressing the excessively increasing difference in rigidity between the inner edge 60a or the inner edges 62b, 63b in the radial direction of the reinforcing layer 60 and the surrounding member. As a result, the occurrence of separation around the carcass 6 and the reinforcing layer 60 can be more reliably reduced.

The first reinforcing layer 61 is the steel reinforcing layer 61 including the steel cords 66, and the inclination angle θrf1 of the steel cords 66 included in the steel reinforcing layer 61 is within the range 20°≤θrf1≤65°, allowing the rigidity of the bead portion 20 to be more effectively increased by the steel reinforcing layer 61 having high rigidity while suppressing the excessively increasing difference in rigidity between the inner edge 61a of the steel reinforcing layer 61 and the surrounding member. As a result, the occurrence of separation around the carcass 6 and the first reinforcing layer 61 can be more reliably reduced.

The height Hrf11 in the tire radial direction from the rim diameter reference position BL of the inner edge 61a of the steel reinforcing layer 61 is within the range 0.55≤Hrf11/Rh≤1.10 with respect to the flange height Rh, allowing the inner edge 61a of the steel reinforcing layer 61 to be disposed at an appropriate position in the tire radial direction. This can more reliably reduce the occurrence of stress concentration at or near the inner edge 61a of the steel reinforcing layer 61 having high rigidity and can reduce the occurrence of separation between the carcass 6 and the steel reinforcing layer 61. As a result, carcass separation resistance can be more reliably improved.

The height Hrf12 in the tire radial direction from the rim diameter reference position BL of the outer edge 61b of the steel reinforcing layer 61 is within the range 0.40≤Hrf12/Rh≤0.95 with respect to the flange height Rh, allowing the outer edge 61b of the steel reinforcing layer 61 to be disposed at an appropriate position in the tire radial direction. This can reduce the occurrence of stress concentration at or near the outer edge 61b of the steel reinforcing layer 61 having high rigidity and can reduce the occurrence of separation between the carcass 6 and the steel reinforcing layer 61. As a result, carcass separation resistance can be more reliably improved.

The second reinforcing layer 62 is the organic fiber reinforcing layer 62 including the organic fiber cords 67, and the third reinforcing layer 63 is also the organic fiber reinforcing layer 63 including the organic fiber cords 68. Accordingly, the rigidity of the bead portion 20 can be appropriately increased by the second reinforcing layer 62 and the third reinforcing layer 63, which are the organic fiber reinforcing layers 62 and 63, while the occurrence of separation between the second reinforcing layer 62 and the surrounding member and between the third reinforcing layer 63 and the surrounding member. As a result, the occurrence of separation around the carcass 6 and the reinforcing layer 60 can be more reliably reduced.

In a method for manufacturing the pneumatic tire 1 according to the first embodiment, the bead core 21 is formed such that a portion located on the innermost side in the tire width direction and a portion located on the outermost side in the tire width direction of the bead core 21 are the vertical lines 25, allowing, even when a large force acts between the carcass 6 and the bead core 21 due to a large tension acting on the carcass 6, the occurrence of stress concentration to be reduced. As a result, the occurrence of a failure such as breakage of the carcass cord 6c due to the stress concentration generated between the carcass 6 and the bead core 21 can be reduced.

In the method for manufacturing the pneumatic tire 1 according to the first embodiment, the length CV of the vertical line 25 is made within the range of 20% or more and 30% or less with respect to the core height CH, allowing the stress generated between the carcass 6 and the bead core 21 to be more reliably dispersed by the vertical lines 25 formed on the both sides of the bead core 21 in the tire width direction. This can more reliably reduce the occurrence of a failure such as breakage of the carcass cord 6c due to the stress concentration generated between the carcass 6 and the bead core 21.

In the method for manufacturing the pneumatic tire 1 according to the first embodiment, the distance Va in the tire radial direction from the bead core bottom surface 23 to the inner end portion 25a in the tire radial direction of the vertical line 25 is made within the range of 30% or more and 40% or less with respect to the core height CH, allowing the shape of the bead core 21 to be brought close to a shape along the shape of the carcass 6 folded back at the bead portion 20. This can more reliably reduce the occurrence of stress concentration between the carcass 6 and the bead core 21.

In the method for manufacturing the pneumatic tire 1 according to the first embodiment, for the first layer 31a, the second layer 31b, and the third layer 31c of the plurality of layers 31 formed by the bead wire 30, in two of the layers 31 adjacent to each other, the misalignment amount in the tire width direction between the bead wires 30 each located at the end portion on one side in the tire width direction is made one-half of the thickness of the bead wire 30. This can suppress the excessively increasing misalignment amount in the tire width direction between the bead wires 30 at a portion straddling the two layers 31 adjacent to each other in the tire radial direction and can suppress the loss of shape of the bead core 21.

In the method for manufacturing the pneumatic tire 1 according to the first embodiment, the side on which the misalignment amount between the bead wires 30 in the first layer 31a and the second layer 31b is made one-half of the thickness of the bead wire 30 is made opposite in the tire width direction to the side on which the misalignment amount between the bead wires 30 in the second layer 31b and the third layer 31c is made one-half of the thickness of the bead wire 30. This can bring the shape of the bead core 21 in the tire meridian cross-section close to a shape along the shape of the carcass 6 in a well-balanced manner on the both sides in the tire width direction, can suppress the stress concentration generated between the carcass 6 and the bead core 21, and thus can more reliably reduce the occurrence of a failure such as breakage of the carcass cord 6c. As a result, the durability of the bead portion 20 can be improved.

In the method for manufacturing the pneumatic tire 1 according to the first embodiment, the bead wire 30 starts to be wound from the outer end portion in the tire width direction in the first layer 31a, and thus the durability of the bead core 21 can be ensured. In other words, when the pneumatic tire 1 is inflated, the bead core 21 is required to have the highest strength at the position of the end portion 23in on the inner side in the tire width direction on the bead core bottom surface 23. Thus, the end portion of the bead wire 30 located at the position of the end portion 23in on the inner side in the tire width direction on the bead core bottom surface 23 decreases the durability of the bead core 21, and the bead core 21 may easily lose its shape.

In response to this, when the bead wire 30 starts to be wound from the outer end portion in the tire width direction in the first layer 31a, the strength at the position of the end portion 23in on the inner side in the tire width direction on the bead core bottom surface 23 where the highest strength is required can be ensured, allowing the likelihood of loss of shape of the bead core 21 to be reduced. As a result, the durability of the bead core 21 can be ensured.

In the method for manufacturing the pneumatic tire 1 according to the first embodiment, the ratio Db/Dc of the distance Db between the bead core 21 and the carcass cord 6c of the turned-up portion 6b to the distance Dc between the carcass cord 6c of the turned-up portion 6b and the bead portion outer surface 45 is made within the range of 10% or more and 15% or less, allowing the contact pressure between the rim wheel and the bead portion outer surface 45 to be effectively increased while the excessively increasing load on the carcass cord 6c is suppressed. As a result, the durability of the bead portion 20 can be improved, and air-sealing properties at the bead portion 20 can be improved.

In the method for manufacturing the pneumatic tire 1 according to the first embodiment, in the tire meridian cross-section, the inclination angle θp in the tire radial direction with respect to the tire width direction of the straight line Lp connecting the intersection point P2 corresponding to the flange height Rh on the carcass body portion 6a to the intersection point P1 corresponding to the bead core top surface 22 is made within the range $60° \leq \theta p \leq 75°$, allowing the carcass body portion 6a excessively falling over in the direction toward the bead core 21 or being deformed in a buckled shape to be suppressed. As a result, the occurrence of separation between the carcass body portion 6a included in the carcass 6 and the surrounding member can be reduced, and carcass separation resistance can be improved.

Second Embodiment

The pneumatic tire 1 according to a second embodiment has a configuration substantially similar to that of the pneumatic tire 1 according to the first embodiment but has a feature that the bead base portion 40 of the bead portion 20 includes a plurality of tapered portions 43. Because the other configurations are identical to those of the first embodiment, descriptions thereof will be omitted, and the identical reference numerals are used.

Figure 13:
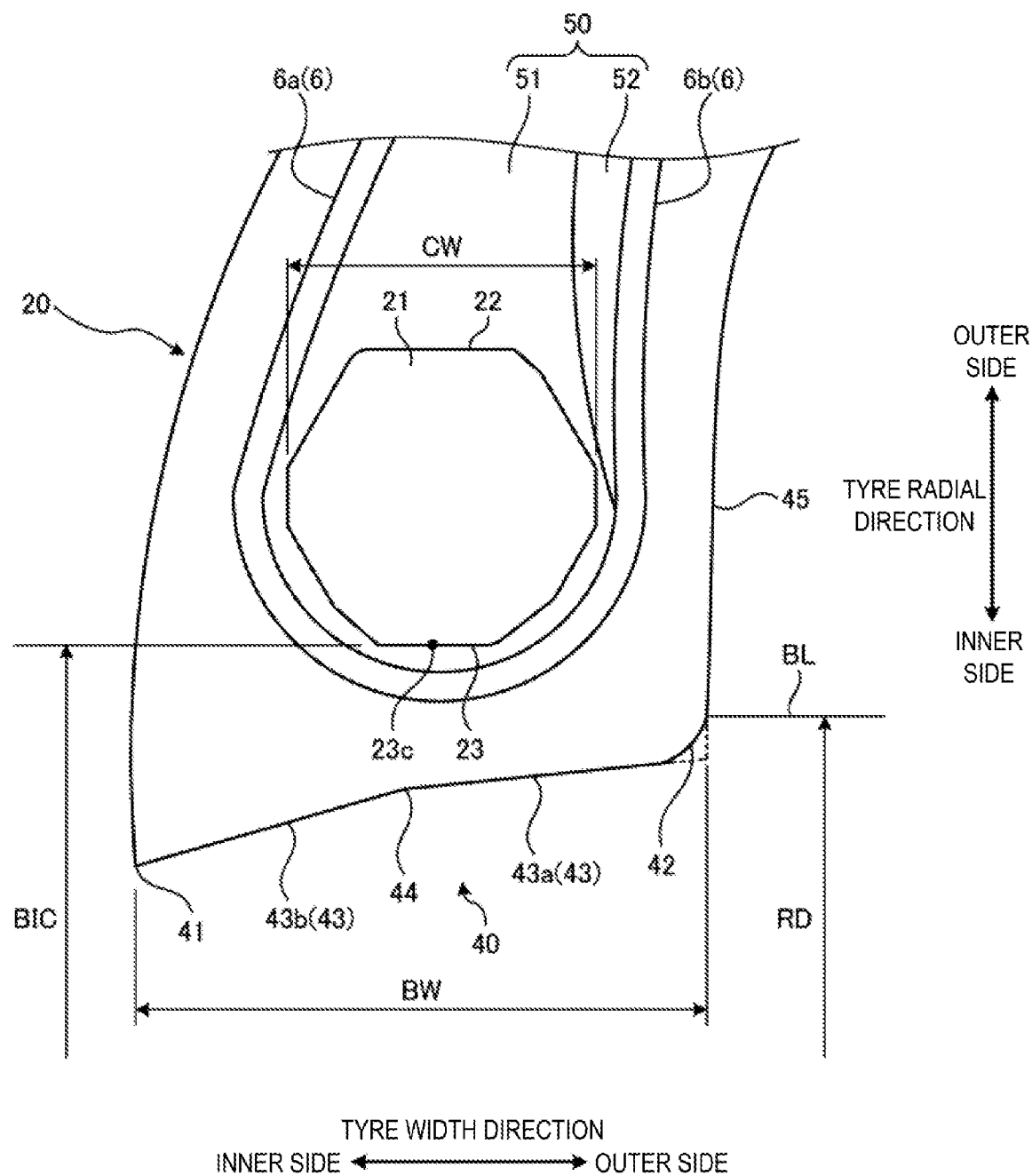
FIG. 13 is a detailed view of a bead portion of a pneumatic tire according to a second embodiment.

FIG. 13 is a detailed view of the bead portion 20 of the pneumatic tire 1 according to the second embodiment. In the bead portion 20 of the pneumatic tire 1 according to the second embodiment, the bead core 21 configured in a manner as the bead core 21 disposed in the bead portion 20 of the pneumatic tire 1 according to the first embodiment is disposed. The bead core 21 disposed in the bead portion 20 has an inner diameter BIC within a range $1.01 \leq BIC/RD \leq 1.03$ with respect to a specified rim diameter RD. The specified rim diameter RD in this case is a rim diameter defined by the standard and is a diameter of the rim diameter reference position BL about the tire rotation axis. In other words, the specified rim diameter RD is a rim diameter defined by the standard of JATMA, TRA, or ETRTO. The inner diameter BIC of the bead core 21 is a diameter of the bead core bottom surface 23 about the tire rotation axis.

The bead core 21 has the maximum width CW within a range $0.45 \leq CW/BW \leq 0.52$ with respect to a bead base width BW which is a width of the bead base portion 40 in the tire width direction. The maximum width CW of the bead core 21 in this case is a maximum width of the bead core 21 in the tire width direction, that is, a distance in the tire width direction between the vertical lines 25 located on the both sides of the bead core 21 in the tire width direction in the tire meridian cross-section.

In the pneumatic tire 1 according to the second embodiment, the bead base portion 40, which is the inner peripheral surface of the bead portion 20, is formed having the plurality of tapered portions 43 having a different inclination angle in the tire radial direction with respect to the tire width direction. Specifically, the bead base portion 40 is formed to be inclined with respect to the tire width direction in a direction in which the inner diameter increases from the inner side toward the outer side in the tire width direction. The bead base portion 40 includes a portion at which the inclination angle changes when inclined with respect to the tire width direction in this manner, and the respective portions having different inclination angles with respect to the tire width direction are the tapered portions 43.

The tapered portions 43 included in the bead base portion 40 include a first tapered portion 43a and a second tapered portion 43b. Of the plurality of tapered portions 43, the first tapered portion 43a is a tapered portion 43 located on the outermost side in the tire width direction and the second tapered portion 43b is a tapered portion 43 located on the inner side of the first tapered portion 43a in the tire width direction and connected to the first tapered portion 43a. The second tapered portion 43b of the first tapered portion 43a and the second tapered portion 43b has the inclination angle in the tire radial direction with respect to the tire width direction larger than the inclination angle in the tire radial direction with respect to the tire width direction of the first tapered portion 43a. Accordingly, the inner diameter of the second tapered portion 43b increases largely from the inner side toward the outer side in the tire width direction compared with that of the first tapered portion 43a.

In the bead base portion 40, a bent portion 44, which is a connecting portion between the first tapered portion 43a and the second tapered portion 43b having different inclination angles in this manner, is located more on the inner side in the tire width direction than a center position 23c of the bead core bottom surface 23 in the tire width direction. In other words, the bent portion 44 is disposed at a position closer to the bead toe 41 in the tire width direction than the center position 23c of the bead core bottom surface 23 in the tire width direction. The first tapered portion 43a and the second tapered portion 43b are connected to each other at the bent portion 44, and thus, in other words, the first tapered portion 43a is disposed between the bent portion 44 and the bead heel 42, and the second tapered portion 43b is disposed between the bead toe 41 and the bent portion 44.

The first tapered portion 43a and the second tapered portion 43b are both inclined with respect to the tire width direction in a direction in which the inner diameter increases from the inner side toward the outer side in the tire width direction. Consequently, the bent portion 44, which is a connecting portion between the first tapered portion 43a and the second tapered portion 43b, is a portion in which the first tapered portion 43a has the smallest inner diameter and is a portion in which the second tapered portion 43b has the largest inner diameter.

Figure 14:
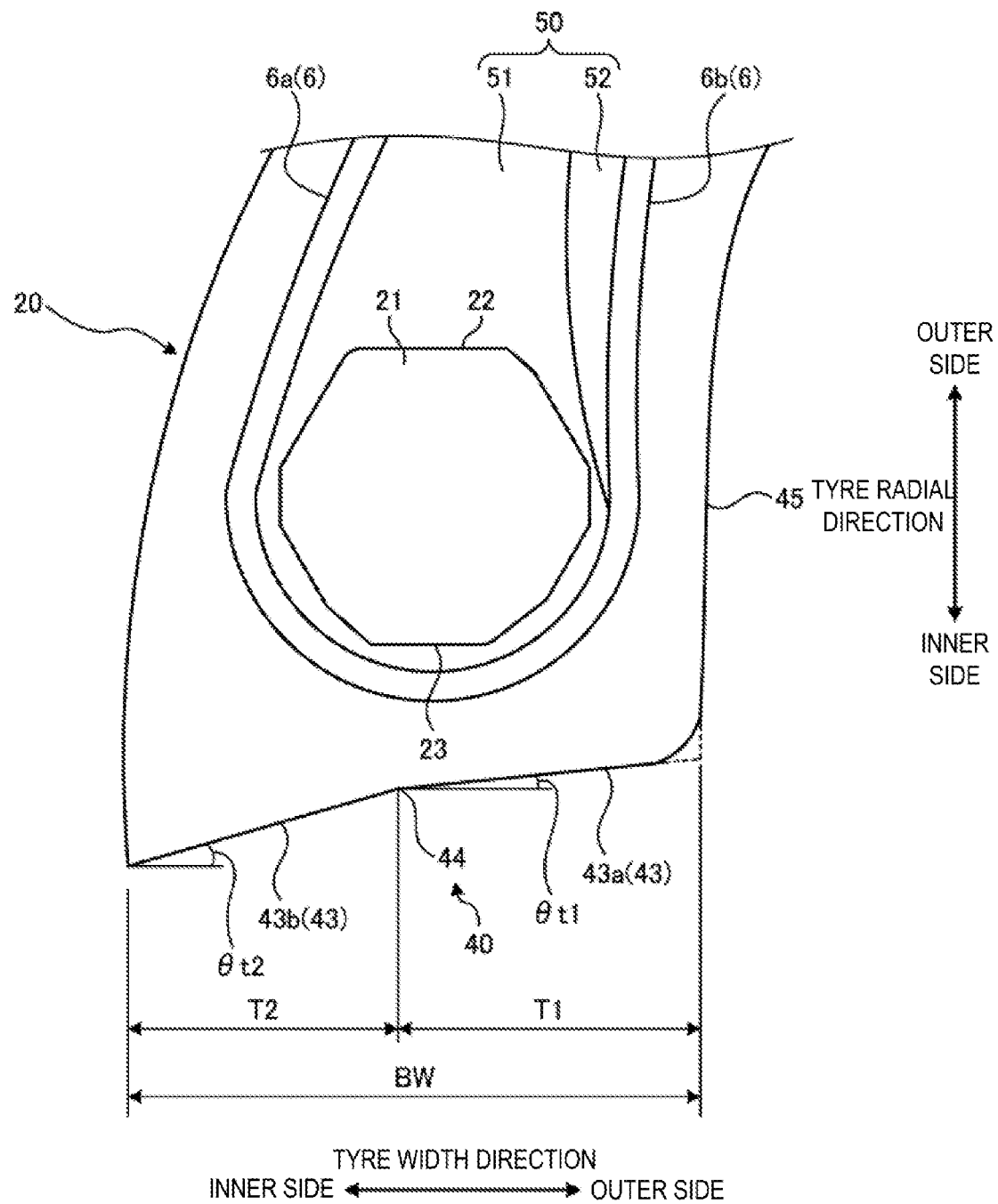
FIG. 14 is a detailed explanatory diagram of a tapered portion illustrated in FIG. 13.

FIG. 14 is a detailed explanatory diagram of the tapered portions 43 illustrated in FIG. 13. Of the first tapered portion 43a and the second tapered portion 43b included in the bead base portion 40, the first tapered portion 43a, which is a tapered portion 43 having a relatively smaller inclination angle, has an inclination angle θt1 in the tire radial direction with respect to the tire width direction of 5° or more. Specifically, the first tapered portion 43a has the inclination angle ƒt1 in the tire radial direction with respect to the tire width direction within a range of 5° or more and 10° or less. The second tapered portion 43b has an inclination angle θt2 in the tire radial direction with respect to the tire width direction within a range of 10° or more and 35° or less.

The bead base portion 40 has the relationship between a width T1 of the first tapered portion 43a in the tire width direction and the width BW of the bead base portion 40 in the tire width direction within a range $0.45 \leq T1/BW \leq 0.85$. The width T1 of the first tapered portion 43a in the tire width direction in this case is a distance in the tire width direction between the bent portion 44 and the bead heel 42 in the second embodiment.

The bead base portion 40 has the relationship between a width T2 of the second tapered portion 43b in the tire width direction and the width BW of the bead base portion 40 in the tire width direction within a range $0.15 \leq T2/BW \leq 0.55$. The width T2 of the second tapered portion 43b in the tire width direction in this case is a distance in the tire width direction between the bent portion 44 and the bead toe 41 in the second embodiment.

Figure 15:
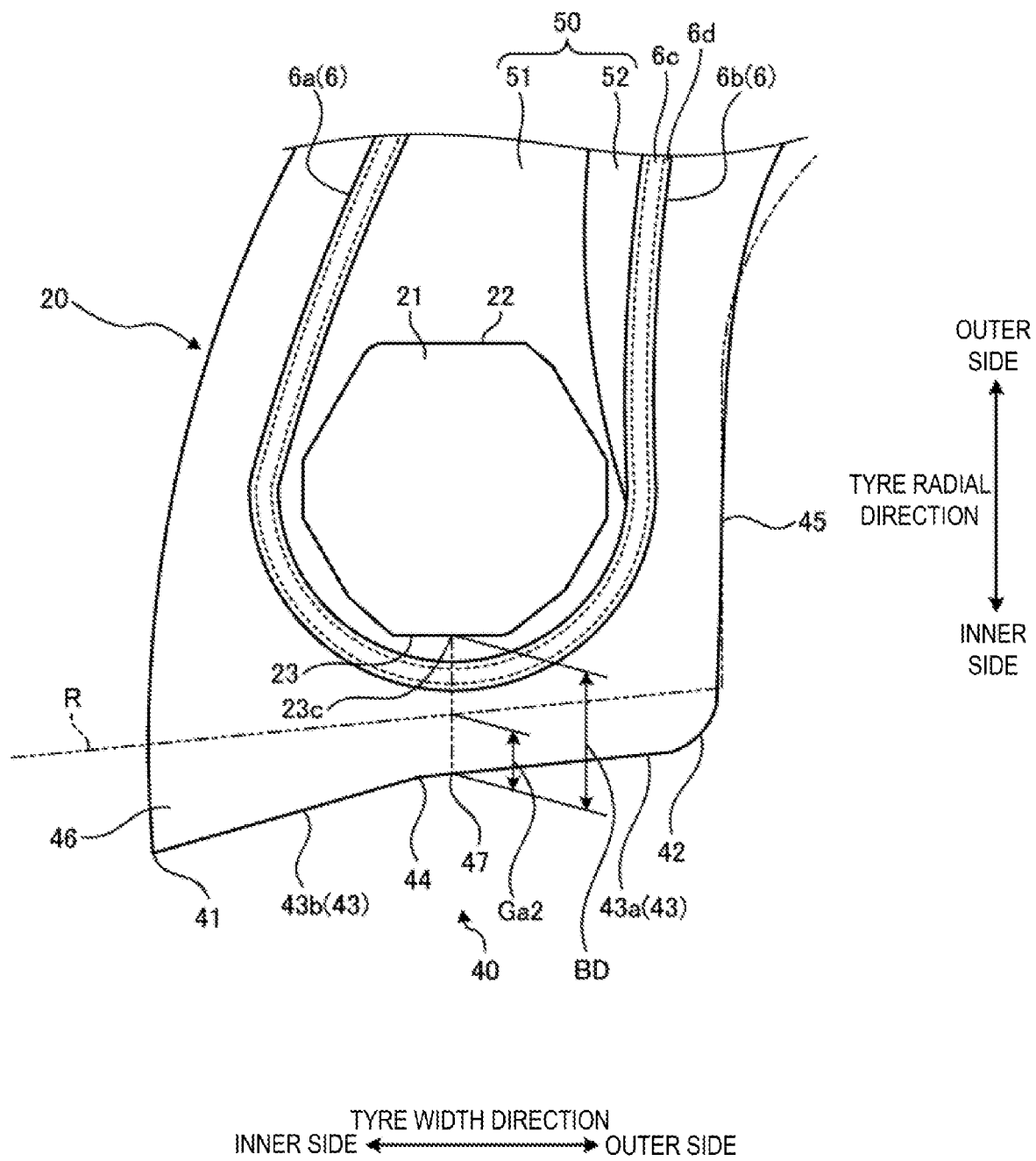
FIG. 15 is an explanatory diagram of a compression ratio of rubber when the pneumatic tire is mounted on a specified rim.

FIG. 15 is an explanatory diagram of a compression ratio of rubber when the pneumatic tire 1 is mounted on the specified rim R. At the time of mounting the pneumatic tire 1 on the specified rim R, the bead portion 20 is fitted to the specified rim R, and the diameter of the inner peripheral surface of the bead portion 20 is smaller than the diameter of the fitting surface of the specified rim R with respect to the bead portion 20. Accordingly, at the time of mounting the pneumatic tire 1 on the specified rim R, the rubber member such as the rim cushion rubber 46 located on the inner side of the bead core 21 in the tire radial direction is elastically deformed and compressed, and thus the diameter of the inner peripheral surface of the bead portion 20 is increased. This fits the bead portion 20 into the specified rim R.

At the time of mounting the pneumatic tire 1 on the specified rim R, the rubber located on the inner side of the bead core 21 in the tire radial direction is elastically deformed and compressed in this manner, and thus the bead portion 20 can apply, on the specified rim R, a pressing force from the outer side to the inner side in the tire radial direction. This allows the bead portion 20 to generate a fastening force on the specified rim R. As described above, the compression ratio of the rubber located on the inner side of the bead core 21 in the tire radial direction when the pneumatic tire 1 is mounted on the specified rim R is within a range of 40% or more and 50% or less at a position on the inner side in the tire radial direction of the center position 23c in the tire width direction of the bead core bottom surface 23.

The compression ratio of the rubber in this case corresponds to a ratio of a thickness Ga2 of the rubber member compressed in the tire radial direction in a case where the pneumatic tire 1 is mounted on the specified rim R to a thickness Ga1 obtained by subtracting a thickness of the members other than the rubber member such as the carcass cord 6c of the carcass 6 from a distance BD in the tire radial direction between the center position 23c in the tire width direction of the bead core bottom surface 23 and the bead base portion 40 in the tire meridian cross-section before mounting the pneumatic tire 1 on the specified rim R. In other words, in a case where the pneumatic tire 1 is mounted on the specified rim R, a compression ratio Z of the rubber located on the inner side of the bead core 21 in the tire radial direction has a value calculated by Formula (1) below. In the pneumatic tire 1 according to the second embodiment, a compression ratio Z calculated by the following formula (1) is within the range of 40% or more and 50% or less.

$$\text{Compression ratio } Z = (Ga2/Ga1) \times 100 \quad (1)$$

The thickness Ga2 used in Formula (1), of the rubber member compressed in the tire radial direction at the time of mounting the pneumatic tire 1 on the specified rim R is specifically defined as an amount of displacement in the tire radial direction between before and after mounting the pneumatic tire 1 on the specified rim R at a reference position 47 corresponding to a portion of the bead base portion 40, which is a position in the tire width direction identical to the center position 23c in the tire width direction of the bead core bottom surface 23. The bead portion 20 is preferably formed such that the compression ratio Z is within the range of 40% or more and 50% or less in consideration of not only the thickness of the rim cushion rubber 46 located on the inner side of the bead core 21 in the tire radial direction but also the thickness of the rubber member such as the coating rubber 6d included in the carcass 6 and a thickness of a member other than the rubber member such as the carcass cord 6c of the carcass 6.

Method for Manufacturing Pneumatic Tire

Next, a method for manufacturing the pneumatic tire 1 according to the second embodiment will be described. At the time of manufacturing the pneumatic tire 1 according to the second embodiment, processing is performed on each of the members constituting the pneumatic tire 1 in a manner as in manufacturing of the pneumatic tire 1 according to the first embodiment, and the processed members are assembled. In this case, the bead core 21 is manufactured by a method as that of the first embodiment.

In the method for manufacturing the pneumatic tire 1 according to the second embodiment, the inner diameter BIC of the bead core 21 is made within the range 1.01≤BIC/RD≤1.03 with respect to the specified rim diameter RD, and the maximum width CW of the bead core 21 is made within the range 0.45≤CW/BW≤0.52 with respect to the width BW in the tire width direction of the bead base portion 40.

The bead base portion 40 forms the plurality of tapered portions 43 having a different inclination angle in the tire radial direction with respect to the tire width direction, and the plurality of tapered portions 43 forms the first tapered portion 43a located on the outermost side in the tire width direction and the second tapered portion 43b located on the inner side of the first tapered portion 43a in the tire width direction and connected to the first tapered portion 43a. Of these tapered portions, the second tapered portion 43b is made to have the inclination angle θt2 in the tire radial direction with respect to the tire width direction larger than the inclination angle θt1 in the tire radial direction with respect to the tire width direction of the first tapered portion 43a. The manufacturing of the pneumatic tire 1 is performed in this manner, and thus the pneumatic tire 1 according to the second embodiment is manufactured.

Functions and Effects

At the time of mounting the pneumatic tire 1 according to the second embodiment on a vehicle, the bead base portion 40 is fitted to the specified rim R of the rim wheel in a manner as in the first embodiment to mount the pneumatic tire 1 on the specified rim R, and the pneumatic tire 1 is mounted on the rim wheel. Here, in fitting the bead portion 20 into the specified rim R, fastening force on the specified rim R generated by the bead core 21 is important. However, too large fastening force of the bead core 21 makes it difficult to fit the bead portion 20 into the specified rim R, and mounting on the rim may become difficult. On the other hand, when the fastening force of the bead core 21 is too small, fitting when the bead portion 20 is fitted to the specified rim R is weak, which may easily generate rim slippage that is slippage in the tire circumferential direction between the bead portion 20 and the specified rim R after fitting.

In contrast, in the pneumatic tire 1 according to the second embodiment, the inner diameter BIC of the bead core 21 is within the range 1.01≤BIC/RD≤1.03 with respect to the specified rim diameter RD, allowing for easy mounting on the rim while suppressing rim slippage. In other words, when the relationship between the inner diameter BIC of the bead core 21 and the specified rim diameter RD is BIC/RD<1.01, the inner diameter BIC of the bead core 21 is too small, and thus the fastening force on the specified rim R generated by the bead core 21 may be too large, making mounting on the rim. When the relationship between the inner diameter BIC of the bead core 21 and the specified rim diameter RD is BIC/RD>1.03, the inner diameter BIC of the bead core 21 is too large. Accordingly, the fastening force on the specified rim R generated by the bead core 21 is too small, which may make it difficult to have the fastening force when the bead portion 20 is fitted to the specified rim R. In this case, rim slippage may be likely to occur due to a lack of the fastening force.

In contrast, when the relationship between the inner diameter BIC of the bead core 21 and the specified rim diameter RD is within the range 1.01≤BIC/RD≤1.03, the fastening force on the specified rim R generated by the bead core 21 can be made an appropriate magnitude to the extent that the occurrence of rim slippage can be reduced and mounting on the rim is not difficult. As a result, easy mounting on the rim is allowed while rim slippage is suppressed.

The maximum width CW of the bead core 21 is within the range 0.45≤CW/BW≤0.52 with respect to the width BW in the tire width direction of the bead base portion 40, and thus the durability of the bead portion 20 can be improved while rim slippage is suppressed. In other words, when the relationship between the maximum width CW of the bead core 21 and the width BW in the tire width direction of the bead base portion 40 is CW/BW<0.45, the maximum width CW of the bead core 21 is too small with respect to the width BW of the bead base portion 40, and thus the range in which the fastening force generated by the bead core 21 effectively acts on the specified rim R may be too narrow. In this case, it may be difficult to have the fastening force when the bead portion 20 is fitted to the specified rim R, causing rim slippage to easily occur.

When the relationship between the maximum width CW of the bead core 21 and the width BW in the tire width direction of the bead base portion 40 is CW/BW>0.52, the maximum width CW of the bead core 21 is too large with respect to the width BW of the bead base portion 40, and thus the range in which the fastening force generated by the bead core 21 acts on the specified rim R may be too wide. In this case, when the bead portion 20 is fitted to the specified rim R, an excessive force may act on the rim cushion rubber 46 constituting the bead base portion 40, and an excessive compressive stress may be generated. Thus, the bead base portion 40 may be easily damaged due to the excessive compressive stress.

In contrast, when the relationship between the maximum width CW of the bead core 21 and the width BW in the tire width direction of the bead base portion 40 is within the range 0.45≤CW/BW≤0.52, the range in which the fastening force generated by the bead core 21 acts on the specified rim R can be made an appropriate magnitude to the extent that the fastening force of the bead portion 20 can be ensured and an excessive force does not act on the rim cushion rubber 46. As a result, the durability of the bead portion 20 can be improved while rim slippage is suppressed.

The bead base portion 40 includes the first tapered portion 43a and the second tapered portion 43b located on the inner side of the first tapered portion 43a in the tire width direction, and the inclination angle θt2 of the second tapered portion 43b is larger than the inclination angle θt1 of the first tapered portion 43a. Thus, air-sealing properties can be ensured. In other words, when the pneumatic tire 1 is mounted on the rim and inflated, tension toward the outer side in the tire radial direction acts on the carcass body portion 6a; however, the tension acts on the bead base portion 40 as the force in a direction that allows a position closer to the bead toe 41 to move toward the outer side in the tire radial direction. In this case, the fastening force at a position closer to the bead toe 41 in the bead base portion 40 decreases and air-sealing properties may be likely to degrade.

In particular, in the second embodiment, a portion of the bead core 21 located on the innermost side in the tire width direction in the tire meridian cross-section is formed as the vertical line 25, and the bead core 21 has no corner portion that is caught by the carcass body portion 6a. Accordingly, the tension of the carcass body portion 6a toward the outer side in the tire radial direction is easily transmitted to the bead portion 20. Consequently, the force in a direction that allows for moving toward the outer side in the tire radial direction is likely to act on the position closer to the bead toe 41 in the bead base portion 40, and the fastening force at the position closer to the bead toe 41 is likely to decrease.

In contrast, the bead base portion 40 of the second embodiment has the inclination angle θt2 of the second tapered portion 43b located on the inner side of the first tapered portion 43a in the tire width direction larger than the inclination angle θt1 of the first tapered portion 43a. This can suppress, even when the force acts in a direction that allows the position closer to the bead toe 41 to move toward the outer side in the tire radial direction acts, the decrease of fastening force at the position closer to the bead toe 41. As a result, air-sealing properties can be ensured.

The bead base portion 40 has the bent portion 44, which is the connecting portion between the first tapered portion 43a and the second tapered portion 43b, located more on the inner side in the tire width direction than the center position 23c in the tire width direction of the bead core bottom surface 23, and thus the second tapered portion 43b having a larger inclination angle than that of the first tapered portion 43a can be formed while an increase in the volume of the rim cushion rubber 46 is suppressed. This can reduce, when the bead portion 20 is fitted into the specified rim R, the likelihood of damage of the bead base portion 40 due to the excessive compressive stress generated in the rim cushion rubber 46 while having the fastening force at the position closer to the bead toe 41. As a result, air-sealing properties can be ensured without degrading the durability of the bead portion 20.

The first tapered portion 43a, which has the inclination angle θt1 in the tire radial direction with respect to the tire width direction of 5° or more, can appropriately exert the fastening force on the specified rim R having a 5° taper. As a result, air-sealing properties can be more reliably improved.

The first tapered portion 43a, which has the inclination angle θt1 in the tire radial direction with respect to the tire width direction within the range of 5° or more and 10° or less, can improve air-sealing properties without degrading mountability on rims. In other words, when the inclination angle θt1 of the first tapered portion 43a is less than 5°, the inclination angle θt1 of the first tapered portion 43a is too small. Consequently, it may be difficult to exert an appropriate fastening force on the specified rim R having a 5° taper, and it may be difficult to improve air-sealing properties. When the inclination angle θt1 of the first tapered portion 43a is larger than 10°, the inclination angle θt1 of the first tapered portion 43a is too large. Consequently, the fastening force of the first tapered portion 43a with respect to the specified rim R is too large, and thus mounting on the rim may be difficult.

In contrast, when the inclination angle θt1 of the first tapered portion 43a is within the range of 5° or more and 10° or less, the fastening force can be appropriately exerted on the specified rim R at the position of the first tapered portion 43a while the excessively increasing fastening force on the specified rim R at the first tapered portion 43a is suppressed. As a result, air-sealing properties can be more reliably improved without degrading mountability on rims.

The second tapered portion 43b, which has the inclination angle θt2 in the tire radial direction with respect to the tire width direction within the range of 10° or more and 35° or less, can improve air-sealing properties without degrading mountability on rims. In other words, when the inclination angle θt2 of the second tapered portion 43b is less than 10°, the inclination angle θt2 of the second tapered portion 43b is too small, and thus even forming the second tapered portion 43b on the bead base portion 40 may make it difficult to effectively have the fastening force at the position closer to the bead toe 41. In this case, even forming the second tapered portion 43b on the bead base portion 40 may make it difficult to effectively improve air-sealing properties. When the inclination angle θt2 of the second tapered portion 43b is larger than 35°, the inclination angle θt2 of the second tapered portion 43b is too large. Consequently, the fastening force on the specified rim R at the second tapered portion 43b to is too large, and thus mounting on the rim may be difficult.

In contrast, when the inclination angle θt2 of the second tapered portion 43b is within the range of 10° or more and 35° or less, the fastening force at the position closer to the bead toe 41 can be effectively ensured by the second tapered portion 43b while the excessively increasing fastening force at the second tapered portion 43b is suppressed. As a result, air-sealing properties can be more reliably improved without degrading mountability on rims.

The bead base portion 40 has the relationship between the width T1 of the first tapered portion 43a in the tire width direction and the width BW of the bead base portion 40 in the tire width direction within the range $0.45 \leq T1/BW \leq 0.85$, and thus air-sealing properties can be improved without degrading mountability on rims. In other words, when the relationship between the width T1 of the first tapered portion 43a and the width BW of the bead base portion 40 is T1/BW<045, the width T1 of the first tapered portion 43a is too small, and thus a ratio of the second tapered portion 43b in the bead base portion 40 may excessively increase. In this case, the proportion of a portion in which the fastening force on the specified rim R is large to the bead base portion 40 increases. Consequently, the fastening force of the bead portion 20 with respect to the specified rim R is excessively large in the entire bead base portion 40, and mountability on rims may be likely to degrade.

When the relationship between the width T1 of the first tapered portion 43a and the width BW of the bead base portion 40 is T1/BW>0.85, the width T1 of the first tapered portion 43a is too large, and thus a ratio of the second tapered portion 43b in the bead base portion 40 may excessively decrease. In this case, the proportion of the second tapered portion 43b that ensures the fastening force at the position closer to the bead toe 41 to the bead base portion decreases, and thus even forming the second tapered portion 43b on the bead base portion 40 may make it difficult to effectively ensure the fastening force at the position closer to the bead toe 41.

In contrast, when the relationship between the width T1 of the first tapered portion 43a and the width BW of the bead base portion 40 is within the range $0.45 \leq T1/BW \leq 0.85$, the fastening force at the position closer to the bead toe 41 can be effectively ensured while the excessively increasing fastening force on the specified rim R is suppressed in the entire bead base portion 40. As a result, air-sealing properties can be more reliably improved without degrading mountability on rims.

The bead base portion 40 has the relationship between the width T2 of the second tapered portion 43b in the tire width direction and the width BW of the bead base portion 40 in the tire width direction within the range $0.15 \leq T2/BW \leq 0.55$, and thus air-sealing properties can be improved without degrading mountability on rims. In other words, when the relationship between the width T2 of the second tapered portion 43b and the width BW of the bead base portion 40 is T2/BW<0.15, the width T2 of the second tapered portion 43b is too small, and thus the proportion of the second tapered portion 43b that ensures the fastening force at the position closer to the bead toe 41 to the bead base portion 40 may excessively decrease. In this case, even forming the second tapered portion 43b on the bead base portion 40 may make it difficult to effectively ensure the fastening force at the position closer to the bead toe 41 and make it difficult to effectively improve air-sealing properties. When the relationship between the width T2 of the second tapered portion 43b and the width BW of the bead base portion 40 is T2/BW>0.55, the width T2 of the second tapered portion 43b is too large, and thus the proportion of a portion in which the fastening force on the specified rim R is large to the bead base portion 40 increases, and mountability on rims may be likely to degrade.

In contrast, when the relationship between the width T2 of the second tapered portion 43b and the width BW of the bead base portion 40 is within the range 0.15≤T2/BW≤0.55, the fastening force at the position closer to the bead toe 41 can be effectively ensured while the excessively increasing proportion of a portion in which the fastening force on the specified rim R is large is suppressed in the bead base portion 40 and the excessively increasing fastening force on the specified rim R is suppressed. As a result, air-sealing properties can be more reliably improved without degrading mountability on rims.

The bead portion 20 has the compression ratio Z of the rubber located on the inner side of the bead core 21 in the tire radial direction when the pneumatic tire 1 is mounted on the specified rim R within the range of 40% or more and 50% or less at the center position 23c in the tire width direction of the bead core bottom surface 23, and thus rim slippage can be suppressed while mountability on rims is ensured. In other words, when the compression ratio Z is less than 40%, the compression ratio Z is too low, and thus it may be difficult to ensure the fastening force of the bead portion 20. In this case, is may be difficult to effectively suppress slippage between the bead portion 20 and the specified rim R. When the compression ratio Z exceeds 50%, the compression ratio Z is too high, thus the rim cushion rubber 46 located on the inner side of the bead core 21 in the tire radial direction may have excessive elastic deformation, causing the excessively increasing fastening force of the bead portion 20. In this case, mountability on rims may be likely to degrade due to the excessively increasing fastening force of the bead portion 20.

In contrast, when the compression ratio Z is within the range of 40% or more and 50% or less, the excessively increasing fastening force of the bead portion 20 on the specified rim R can be suppressed, and an appropriate magnitude of fastening force of the bead portion 20 can be ensured. As a result, rim slippage can be suppressed with mountability on rims more reliably ensured.

In the method for manufacturing the pneumatic tire 1 according to the second embodiment, the inner diameter BIC of the bead core 21 is made within the range 1.01≤BIC/RD≤1.03 with respect to the specified rim diameter RD, and thus the fastening force on the specified rim R generated by the bead core 21 can be made an appropriate magnitude to the extent that the occurrence of rim slippage can be reduced and mounting on the rim is not difficult. As a result, easy mounting on the rim is allowed while rim slippage is suppressed.

In the method for manufacturing the pneumatic tire 1 according to the second embodiment, the maximum width CW of the bead core 21 is made within the range 0.45≤CW/BW≤0.52 with respect to the width BW of the bead base portion 40, and thus the range in which the fastening force generated by the bead core 21 acts on the specified rim R can be made an appropriate magnitude to the extent that the fastening force of the bead portion 20 can be ensured and an excessive force does not act on the rim cushion rubber 46. As a result, the durability of the bead portion 20 can be improved while rim slippage is suppressed.

In the method for manufacturing the pneumatic tire 1 according to the second embodiment, the first tapered portion 43a and the second tapered portion 43b located on the inner side of the first tapered portion 43a in the tire width direction are formed on the bead base portion 40, and the inclination angle θt2 of the second tapered portion 43b is larger than the inclination angle θt1 of the first tapered portion 43a. This can suppress, even when the force in a direction that allows the position closer to the bead toe 41 to move toward the outer side in the tire radial direction acts on the bead base portion 40 due to the tension acting on the carcass body portion 6a, the decrease of fastening force at the position closer to the bead toe 41. As a result, air-sealing properties can be ensured.

MODIFIED EXAMPLES

In the pneumatic tire 1 according to the first embodiment described above, both the inner edge 61a and the outer edge 61b of the first reinforcing layer 61 are located more on the outer side in the tire radial direction than the bead core top surface 22. However, the inner edge 61a and the outer edge 61b of the first reinforcing layer 61 may not necessarily be located more on the outer side in the tire radial direction than the bead core top surface 22. In the pneumatic tire 1 according to the first embodiment, three of the reinforcing layers 60 is disposed but, the reinforcing layers 60 with the number of layers other than three may be disposed.

Figure 16:
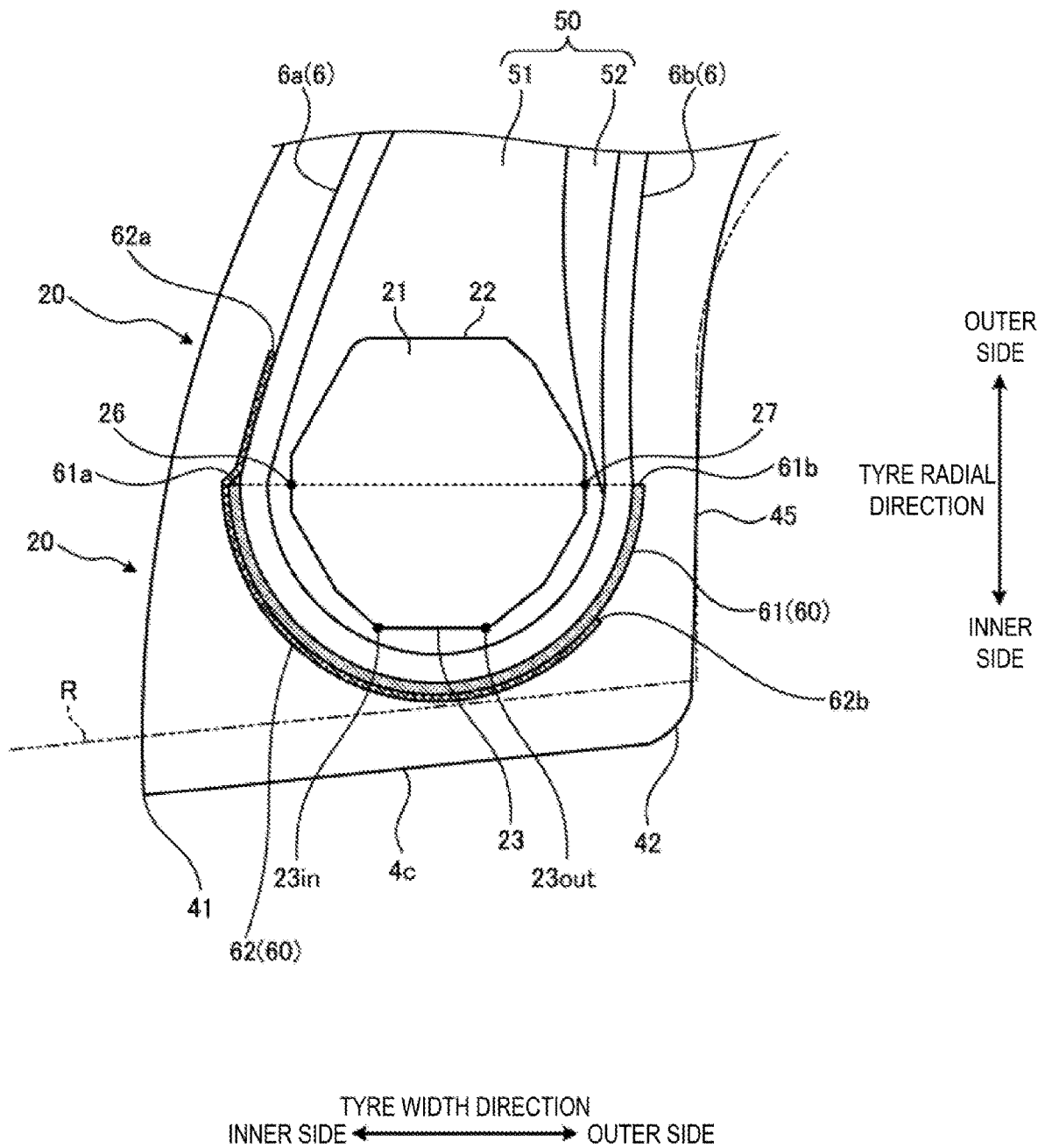
FIG. 16 is an explanatory diagram of a modified example of the pneumatic tire according to the first embodiment in which the reinforcing layer is disposed in an arrangement configuration different from the first embodiment.

FIG. 16 is an explanatory diagram of a modified example of the pneumatic tire 1 according to the first embodiment in which the reinforcing layer 60 is disposed in an arrangement configuration different from the first embodiment. For example, as illustrated in FIG. 16, two of the reinforcing layers 60 may be disposed. In this case, of the two reinforcing layers 60, the first reinforcing layer 61 that is the reinforcing layer 60 adjacent to the carcass 6 is preferably disposed folded back along the carcass 6 from the inner side in the tire width direction to the outer side in the tire width direction of the bead core 21. In this case, the first reinforcing layer 61 is preferably disposed to extend at least between a position identical to the position in the tire radial direction of a bead core innermost portion 26 which is the innermost portion in the tire width direction of the bead core 21 and a position identical to the position in the tire radial direction of a bead core outermost portion 27 which is the outermost portion in the tire width direction of the bead core 21. In other words, the first reinforcing layer 61 preferably has the position in the tire radial direction of the inner edge 61a located more on the outer side in the tire radial direction than the position in the tire radial direction of the bead core innermost portion 26 and the position in the tire radial direction of the outer edge 61b located more on the outer side in the tire radial direction than the position in the tire radial direction of the bead core outermost portion 27.

Of the two reinforcing layers 60, the inner edge 62a of the second reinforcing layer 62 that is the reinforcing layer 60 adjacent to the first reinforcing layer 61 on the surface side opposite to the side of the reinforcing layer 61 on which the carcass 6 is located, is preferably located more on the outer side in the tire radial direction than the inner edge 61a of the first reinforcing layer 61. In other words, when the first reinforcing layer 61 and the second reinforcing layer 62 are compared with each other in end portions on the outer side in the tire radial direction of the respective reinforcing layers 60 in a portion located on the inner side in the tire width direction of the carcass body portion 6a, the inner edge 62a of the second reinforcing layer 62 is preferably located more on the outer side in the tire radial direction than the inner edge 61a of the first reinforcing layer 61.

The inner edge 62b in the radial direction that is the end portion of the second reinforcing layer 62 on the opposite side of the inner edge 62a is preferably located more on the inner side in the tire width direction than the end portion 23in on the inner side in the tire width direction of the bead core bottom surface 23 or more on the outer side in the tire width direction than the end portion 23out on the outer side in the tire width direction of the bead core bottom surface 23. FIG. 16 illustrates a mode in which the inner edge 62b in the radial direction of the second reinforcing layer 62 is located more on the outer side in the tire width direction than the end portion 23out on the outer side in the tire width direction of the bead core bottom surface 23.

Of the plurality of reinforcing layers 60 to be layered, the first reinforcing layer 61 is preferably the steel reinforcing layer 61, and the second reinforcing layer 62 is preferably the organic fiber reinforcing layer 62. By disposing the steel reinforcing layer 61 to extend at least between a position identical to the position of the bead core innermost portion 26 in the tire radial direction and a position identical to the position of the bead core outermost portion 27 in the tire radial direction, the rigidity of the bead portion 20 can be increased by the steel reinforcing layer 61. This allows the steel reinforcing layer 61 to suppress the movement of the carcass 6 when a load acts on the pneumatic tire 1 and thus can more reliably reduce the occurrence of separation between the carcass 6 and the rubber member located around the carcass 6.

Layering the organic fiber reinforcing layer 62 ton the steel reinforcing layer 61 allows the fastening force of the bead portion 20 with respect to the specified rim R to be adjusted and rim slippage to be suppressed. Shifting the inner edge 62b in the radial direction of the organic fiber reinforcing layer 62 from the position on the inner side in the tire radial direction of the bead core bottom surface 23 allows sudden change of the fastening force of the bead portion 20 on the specified rim R to be suppressed at the position where the inner edge 62b in the radial direction is disposed in the tire width direction. This can more reliably suppress rim slippage.

Figure 17:
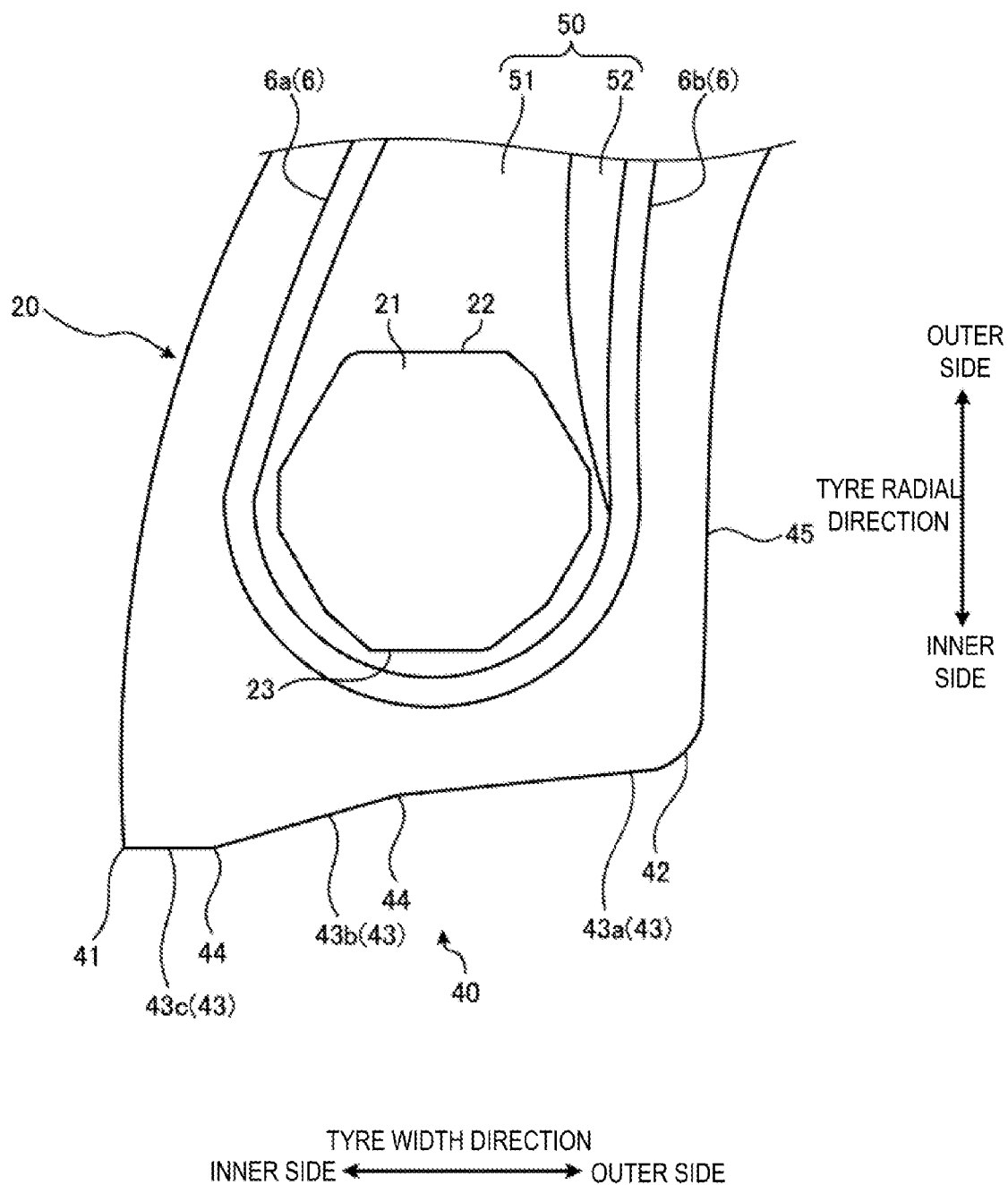
FIG. 17 is an explanatory diagram of a modified example of the pneumatic tire according to the second embodiment in which the tapered portion is formed in three sections.

In the pneumatic tire 1 according to the second embodiment described above, the tapered portion 43 formed on the bead base portion 40 has two sections, but the tapered portion 43 does not need to have two sections. FIG. 17 is an explanatory diagram of a modified example of the pneumatic tire 1 according to the second embodiment in a case where the tapered portion 43 is formed in three sections. The tapered portion 43 formed on the bead base portion 40 may be formed in, for example, three sections as illustrated in FIG. 17. In other words, the tapered portion 43 may be formed in three sections of the first tapered portion 43a located on the outermost side in the tire width direction, the second tapered portion 43b located on the inner side of the first tapered portion 43a in the tire width direction and connected to the first tapered portion 43a, and a third tapered portion 43c located on the inner side of the second tapered portion 43b in the tire width direction and connected to the second tapered portion 43b. In the modified example illustrated in FIG. 17, the inclination angle in the tire radial direction with respect to the tire width direction of the second tapered portion 43b is larger than the inclination angle in the tire radial direction with respect to the tire width direction of the first tapered portion 43a, and the inclination angle in the tire radial direction with respect to the tire width direction of the third tapered portion 43c is smaller than the inclination angle in the tire radial direction with respect to the tire width direction of the second tapered portion 43b. As a result, the bending direction of the bent portion 44 located between the second tapered portion 43b and the third tapered portion 43c, which is the connecting portion between the second tapered portion 43b and the third tapered portion 43c, is opposite to that of the bent portion 44 located between the first tapered portion 43a and the second tapered portion 43b.

The tapered portion 43 formed on the bead base portion 40 has, regardless of the number of sections of the tapered portion 43, the inclination angle in the tire radial direction with respect to the tire width direction of the second tapered portion 43b larger than the inclination angle in the tire radial direction with respect to the tire width direction of the first tapered portion 43a, allowing the decrease of the fastening force to be suppressed at the position closer to the bead toe 41 and air-sealing properties can be ensured.

The aforementioned first and second embodiments and modified example may be combined as appropriate. In the bead portion 20, regardless of the configuration of the reinforcing layer 60 and the form of the bead base portion 40, the durability of the bead portion 20 can be improved by using at least the bead core 21 equivalent to the bead core 21 used in the first embodiment.

EXAMPLES

FIGS. 18A and 18B are tables showing the results of the first performance evaluation tests of pneumatic tires. FIGS. 19A and 19B are tables showing the results of the second performance evaluation tests of pneumatic tires. FIGS. 20A and 20B are tables showing the results of the third performance evaluation tests of pneumatic tires. FIGS. 21A and 21B are tables showing the results of the fourth performance evaluation tests of pneumatic tires. Hereinafter, regarding the pneumatic tire 1 described above, the first to fourth performance evaluation tests performed on the pneumatic tire of Conventional Example, the pneumatic tire 1 according to the present technology, and the pneumatic tire of Comparative Example compared with the pneumatic tire 1 according to the present technology will be described. In the first to fourth performance evaluation tests, durability tests were performed to evaluate durability, air-sealing properties, and rim slip resistance of the pneumatic tire 1. As used in the tables, "o" indicates "yes" and "x" indicates "no" so as to indicate whether a feature is included in a particular example tire.

The first to fourth performance evaluation tests were conducted under conditions of using the pneumatic tires 1 having a tire nominal of 46/90R57 size as test tires, mounting each test tire on a rim wheel conforming to the TRA standard, and adjusting air pressure to the air pressure defined in the TRA standard, and applying a load specified by the TRA standard.

In the first performance evaluation test of the first to fourth performance evaluation tests, durability was evaluated. In the evaluation method for durability, a running test was conducted by using an indoor drum testing machine with a load set to 85% of the maximum load specified by TRA and a speed set to 15 km/h, the pneumatic tire was run for 30 days set as a target running time, then an endurance test running was stopped, and the durability was evaluated on the basis of the degree of damage of the carcass in the bead portion and the presence or absence of breakage of the carcass cord in the bead portion. As for the presence or absence of breakage of the carcass cord in the bead portion, was checked by peeling the carcass and the bead core was peeled in the bead portion from the pneumatic tire after the running test in the indoor drum testing machine, the degree of damage and breakage of the carcass cord was confirmed, and the presence or absence of breakage of the carcass cord was confirmed. The degree of damage of the carcass in the bead portion, which indicates the durability of the bead portion, was evaluated by expressing the degree of damage and breakage of the carcass cord as an index value and expressing the reciprocal of the index value as an index with Comparative Example 1-1 described below being assigned 100. The larger value indicates less damage to the carcass cord in the bead portion and superior durability. In Conventional Example 1 in the first performance evaluation test shows no index because a bead burst due to carcass breakage in the bead portion occurred to make running impossible.

In the second performance evaluation test, the durability was evaluated in a manner as in the first performance evaluation test and air-sealing properties was evaluated. The degree of damage and breakage of the carcass cord of the pneumatic tire in the second performance evaluation test was evaluated by expressing the degree of damage and breakage of the carcass cord as an index value and expressing the reciprocal of the index value as an index value with Comparative Example 1-1 in the first performance evaluation test being assigned 100. The larger value indicates less damage to the carcass cord in the bead portion and superior durability. In Conventional Example 2 in the second performance evaluation test shows no index because a bead burst due to carcass breakage in the bead portion occurred to make running impossible. The air-sealing properties was evaluated in a test similar to the test for the durability by running for 72 hours in a running test using an indoor drum testing machine and then measuring air pressure after 24 hours. The air-sealing properties are expressed as an index value of the reciprocal of the measured air pressure with Conventional Example 2 described below being assigned 100. The larger value indicates smaller decrease in air pressure and superior air-sealing properties.

In the third performance evaluation test, the durability was evaluated in a manner as in the first performance evaluation test and carcass separation resistance was evaluated. The degree of damage and breakage of the carcass cord of the pneumatic tire in the third performance evaluation test was evaluated by expressing the degree of damage and breakage of the carcass cord as an index value and expressing the reciprocal of the index value as an index value with Comparative Example 1-1 in the first performance evaluation test being assigned 100. The larger value indicates less damage to the carcass cord in the bead portion and superior durability. In Conventional Example 3 and Comparative Example 3 in the third performance evaluation test show no index because a bead burst due to carcass breakage in the bead portion occurred to make running impossible. The carcass separation resistance was evaluated by measuring the occurrence of separations of the carcass in the bead portion of the pneumatic tire after a running test using an indoor drum testing machine. Carcass separation resistance was expressed as an index value of the reciprocal of the occurrence of separations of the carcass with Conventional Example 3 described below being assigned 100. The larger value indicates less occurrence of separations and superior carcass separation resistance.

In the fourth performance evaluation test, the durability was evaluated in a manner as in the first performance evaluation test, and air-sealing properties and rim slip resistance were evaluated. The degree of damage and breakage of the carcass cord of the pneumatic tire in the fourth performance evaluation test was evaluated by expressing the degree of damage and breakage of the carcass cord as an index value and expressing the reciprocal of the index value as an index value with Comparative Example 1-1 in the first performance evaluation test being assigned 100. The larger value indicates less damage to the carcass cord in the bead portion and superior durability. In Conventional Example 4 in the fourth performance evaluation test shows no index because a bead burst due to carcass breakage in the bead portion occurred to make running impossible. The air-sealing properties was evaluated in a test similar to the test for the durability by running for 72 hours in a running test using an indoor drum testing machine and then measuring air pressure after 24 hours. The air-sealing properties are expressed as an index value of the reciprocal of the measured air pressure with Example 4-1 described below being assigned 100. The larger value indicates a smaller decrease in air pressure and superior air-sealing properties. Rim slip resistance was evaluated by rim slip torque test. In the rim slip torque test, a relative torque in the tire circumferential direction was applied to the rim-mounted test tire and the rim wheel, while a deviation amount between the test tire and the rim wheel was visually checked, the torque was gradually increased, and a torque value when a deviation with a magnitude at which occurrence of a rim slippage was able to be determined was measured. The rim slip resistance is expressed as an index of the measured torque value with Example 4-1 described below being assigned 100. The larger value indicates less likelihood of dislocation in the tire circumferential direction between the test tire and the rim wheel and superior rim slip resistance. In Conventional Example 4 in the fourth performance evaluation test, the evaluation of air-sealing properties reveals that air leakage occurred, and the evaluation of rim slip resistance reveals that slip occurred.

The first performance evaluation tests were performed on 18 types of pneumatic tires including a pneumatic tire according to Conventional Example 1 corresponding to an example of a conventional pneumatic tire, Examples 1-1 to 1-15 corresponding to the pneumatic tires 1 according to the embodiments of the present technology, and Comparative Examples 1-1 and 1-2 corresponding to pneumatic tires to be compared with the pneumatic tires 1 according to the embodiments of the present technology. Of these pneumatic tires, the pneumatic tire of Conventional Example 1 has a substantially hexagonal cross-sectional shape of the bead core in the tire meridian cross-section, and the bead core does not have vertical lines on the innermost side and the outermost side in the tire width direction. In the pneumatic tires of Comparative Examples 1-1 and 1-2, a vertical line length CV of the bead core is not within the range of 20% or more and 30% or less with respect to the core height CH of the bead core, and the distance Va from the bead core bottom surface to the inner end portion of the vertical line is not within the range of 30% or more and 40% or less with respect to the core height CH.

In contrast, in all of Examples 1-1 to 1-15 corresponding to examples of the pneumatic tires 1 according to the embodiments of the present technology, the bead core 21 has the vertical lines 25 on the innermost side and the outermost side in the tire width direction, the length CV of the vertical line 25 of the bead core 21 is within the range of 20% or more and 30% or less with respect to the core height CH of the bead core 21, and the distance Va from the bead core bottom surface 23 to the inner end portion 25a of the vertical line 25 is within the range of 30% or more and 40% or less with respect to the core height CH. In the pneumatic tires 1 according to Examples 1-1 to 1-15, the ratio (CBW/CW) of the width CBW of the bead core bottom surface 23 to the maximum width CW of the bead core 21, the ratio (Vb/CW) of the distance Vb between the vertical line 25 on the inner side in the tire width direction and the end portion 22in of the bead core top surface 22 to the maximum width CW of the bead core 21, the ratio (Vc/CW) of the distance Vc between the vertical line on the inner side in the tire width direction and the end portion 23in of the bead core bottom surface 23 to the maximum width CW of the bead core 21, and the ratio (CW/CH) of the maximum width CW of the bead core 21 to the core height CH are different from each other.

As a result of the performance evaluation tests by using the pneumatic tires 1, as shown in FIGS. 18A and 18B, it is revealed that in the pneumatic tires 1 according to Examples 1-1 to 1-15, no breakage of the carcass cord 6c occurs in the bead portion 20 differently from Conventional Example 1 and that breakage of the carcass cord 6c is less likely to occur in the bead portion 20 compared to Comparative Examples 1-1 and 1-2. In other words, the pneumatic tires 1 according to Examples 1-1 to 1-15 can provide improved durability of the bead portion 20.

The second performance evaluation tests were performed on 15 types of pneumatic tires including a pneumatic tire according to Conventional Example 2 corresponding to an example of a conventional pneumatic tire, and Examples 2-1 to 2-14 corresponding to the pneumatic tires 1 according to the embodiments of the present technology. Of these pneumatic tires, the pneumatic tire of Conventional Example 2 has a substantially hexagonal cross-sectional shape of the bead core in the tire meridian cross-section, and the bead core does not have vertical lines on the innermost side and the outermost side in the tire width direction. In the pneumatic tire of Conventional Example 2, the ratio (Db/Dc) of the distance Db between the bead core and the carcass cord of the turned-up portion to the distance Dc between the carcass cord of the turned-up portion and the bead portion outer surface is not within the range of 10% or more and 15% or less.

In contrast, in all of Examples 2-1 to 2-14 corresponding to examples of the pneumatic tire 1 according to the embodiments of the present technology, the bead core 21 has the vertical lines 25 on the innermost side and the outermost side in the tire width direction, the length CV of the vertical line 25 of the bead core 21 is within the range of 20% or more and 30% or less with respect to the core height CH of the bead core 21, the distance Va from the bead core bottom surface 23 to the inner end portion 25a of the vertical line 25 is within the range of 30% or more and 40% or less with respect to the core height CH, and the ratio (Db/Dc) of the distance Db between the bead core 21 and the carcass cord 6c of the turned-up portion 6b to the distance Dc between the carcass cord 6c of the turned-up portion 6b and the bead portion outer surface 45 is within the range of 10% or more and 15% or less. In the pneumatic tires 1 according to Examples 2-1 to 2-14, the ratio (Dd/BW) of the distance Dd between the position on the outermost side in the tire width direction of the bead core 21 and the bead portion outer surface 45 to the width BW of the bead base portion 40, the ratio (RC/RB) of the radius of curvature RC of the arc of the carcass line to the radius of curvature RB of the arc RA passing through the inner end portion 25a of the vertical line 25 of the bead core 21, the end portion 23out on the outer side in the tire width direction of the bead core bottom surface 23, and the intermediate vertex 28, and the modulus of the rim cushion rubber 46 at 100% elongation are different from each other.

As a result of the performance evaluation tests by using the pneumatic tires 1, as shown in FIGS. 19A and 19B, it is revealed that in the pneumatic tires 1 according to Examples 2-1 to 2-14, no breakage of the carcass cord 6c occurs in the bead portion 20 differently from Conventional Example 2 and that air-sealing properties are also superior to those of Conventional Example 2. In other words, the pneumatic tires 1 according to Examples 2-1 to 2-14 can provide improved durability of the bead portion 20 and can provide improved air-sealing properties at the bead portion 20.

The third performance evaluation tests were performed on 18 types of pneumatic tires including a pneumatic tire according to Conventional Example 3 corresponding to an example of a conventional pneumatic tire, Examples 3-1 to 1-16 corresponding to the pneumatic tires 1 according to the embodiments of the present technology, and Comparative Example 3 corresponding to a pneumatic tire to be compared with the pneumatic tire 1 according to the embodiments of the present technology. Of these pneumatic tires, the pneumatic tires of Conventional Example 3 and Comparative Example 3 have a substantially hexagonal cross-sectional shape of the bead core in the tire meridian cross-section, and the bead core does not have vertical lines on the innermost side and the outermost side in the tire width direction. In the pneumatic tires of Conventional Example 3 and Comparative Example 3, the inclination angle θp of the carcass body portion is not within the range 60°≤θp≤75°.

In contrast, in all of Examples 3-1 to 3-16 corresponding to examples of the pneumatic tire 1 according to the embodiments of the present technology, the bead core 21 has the vertical lines 25 on the innermost side and the outermost side in the tire width direction, and the inclination angle θp of the carcass body portion 6a is within the range 60°≤θp≤75°. In the pneumatic tires 1 according to Examples 3-1 to 1-16 are different from each other in the presence or absence of the reinforcing layer 60, whether the reinforcing layer 60 includes three or more layers, each of the ratios of Hrf11/Rh, Hrf21/Rh, Hrf31/Rh, Hrf12/Rh, Hrf22/Rh, and Hrf32/Rh regarding the reinforcing layer 60, the inclination angle θrf1 of the cord 66 included in the first reinforcing layer 61, the inclination angle θrf2 of the cord 67 included in the second reinforcing layer 62, and the inclination angle θrf3 of the cord 68 included in the third reinforcing layer 63 are different from each other.

As a result of the performance evaluation tests by using the pneumatic tires 1, as shown in FIGS. 20A and 20B, it is revealed that in the pneumatic tires 1 according to Examples 3-1 to 1-16, no breakage of the carcass cord 6c occurs in the bead portion 20 differently from Conventional Example 3 and Comparative Example 3 and that separation of the carcass 6 is less likely to occur in the bead portion 20 compared to Conventional Example 3 and Comparative Example 3. In other words, the pneumatic tires 1 according to Examples 3-1 to 1-16 can provide improved durability of the bead portion 20 and provide improved carcass separation resistance.

The fourth performance evaluation tests were performed on 18 types of pneumatic tires including a pneumatic tire according to Conventional Example 4 corresponding to an example of a conventional pneumatic tire, and Examples 4-1 to 4-17 corresponding to the pneumatic tires 1 according to the embodiments of the present technology. Of these pneumatic tires, the pneumatic tire of Conventional Example 4 has a substantially hexagonal cross-sectional shape of the bead core 21 in the tire meridian cross-section, and the bead core 21 does not have vertical lines on the innermost side and the outermost side in the tire width direction. In the pneumatic tire of Conventional Example 4, the ratio of the maximum width CW of the bead core 21 is not within the range 0.45≤CW/BW≤0.52 with respect to the width BW of the bead base portion 40, and the inclination angle θt2 of the second tapered portion is not larger than the inclination angle θt1 of the first tapered portion.

In contrast, in all of Examples 4-1 to 4-17 corresponding to examples of the pneumatic tire 1 according to the embodiments of the present technology, the bead core 21 has the vertical lines 25 on the innermost side and the outermost side in the tire width direction, the inner diameter BIC of the bead core 21 is within the range 1.01≤BIC/RD≤1.03 with respect to the specified rim diameter RD, the ratio of the maximum width CW of the bead core 21 is within the range 0.45≤CW/BW≤0.52 with respect to the width BW in the tire width direction of the bead base portion 40, and the inclination angle θt2 of the second tapered portion 43b is larger than the inclination angle θt1 of the first tapered portion 43a. In the pneumatic tires 1 according to Examples 4-1 to 4-17, the rubber compression ratio at the center position 23c in the tire width direction of the bead core bottom surface 23, whether the bent portion 44, which is the connecting portion between the first tapered portion 43a and the second tapered portion 43b, is located more on the inner side in the tire width direction than the center position 23c in the tire width direction of the bead core bottom surface 23, whether the first reinforcing layer 61 is disposed to extend between the bead core innermost portion 26 and the bead core outermost portion 27 of the bead core 21, whether the inner edge 62b in the radial direction of the second reinforcing layer 62 is located more on the inner side in the tire width direction than the end portion 23in on the inner side in the tire width direction of the bead core bottom surface 23 or more on the outer side in the tire width direction of the bead core bottom surface 23 than the end portion 23out on the outer side in the tire width direction of the bead core 21, whether the inclination angle θt1 of the first tapered portion 43a is 5° or larger, the inclination angle θt1 of the first tapered portion 43a, the inclination angle θt2 of the second tapered portion 43b, the ratio of the width T1 of the first tapered portion 43a to the width BW of the bead base portion 40, and the ratio of the width T2 of the second tapered portion 43b to the width BW of the bead base portion 40 are different from each other.

As a result of the performance evaluation tests by using the pneumatic tires 1, as shown in FIGS. 21A and 21B, it is revealed that in the pneumatic tires 1 according to Examples 4-1 to 4-17, no breakage of the carcass cord 6c occurs in the bead portion 20 differently from Conventional Example 4, that air-sealing properties are superior to those of Conventional Example 4, and that rim slippage is less likely to occur. In other words, the pneumatic tires 1 according to Examples 4-1 to 4-17 can provide improved durability of the bead portion 20, can provide improved air-sealing properties at the bead portion 20, and can further suppress rim slippage. tire

The invention claimed is:

1. A pneumatic tire, comprising:
a pair of bead portions disposed on both respective sides of a tire equatorial plane in a tire width direction;
a bead core disposed in each of the pair of bead portions, formed by winding a bead wire in a ring shape, and having a polygonal cross-sectional shape in a tire meridian cross-section; and
a carcass comprising a carcass body portion disposed extending between the pair of bead portions and a turned-up portion formed continuously from the carcass body portion and folded back from an inner side in the tire width direction to an outer side in the tire width direction of the bead core, the carcass being formed by coating a carcass cord with a coating rubber,
the bead core having a portion located on an innermost side in the tire width direction and a portion located on an outermost side in the tire width direction in a contour in the tire meridian cross-section each formed as a vertical line extending along a tire radial direction, where the vertical line is defined as an imaginary straight line contacting a plurality of exposed portions of the bead wire respectively located at the innermost side and the outermost side in the tire width direction when the pneumatic tire is mounted on a specified rim,
the vertical line having a length within a range of 20% or more and 30% or less with respect to a core height that is a height of the bead core in the tire radial direction, where an inner end portion and an outer end portion in the tire radial direction of the vertical line are defined as exposed portions each located at innermost and outermost sides in the tire radial direction among the plurality of exposed portions contacted by the imaginary straight line, and the length of the vertical line is defined as a distance in the tire radial direction between the inner end portion and the outer end portion,
the vertical line having a distance in the tire radial direction from a bead core bottom surface that is an inner peripheral surface of the bead core to an inner end portion in the tire radial direction of the vertical line within a range of 30% or more and 40% or less with respect to the core height,
the length of the vertical line being within a range of 20% or more and 28% or less with respect to the core height that is the height of the bead core in the tire radial direction,
in the bead core, a plurality of circumferential portions of the bead wire wound in a ring shape being aligned in the tire width direction to form a layer, and a plurality of the layers being layered in the tire radial direction,
for a first layer that is the layer located on an innermost circumference in the tire radial direction, a second layer that is the layer layered on an outer side of and adjacent to the first layer in the tire radial direction, and a third layer that is the layer layered on an outer side of and adjacent to the second layer in the tire radial direction of the plurality of the layers,
in two of the layers adjacent to each other in the tire radial direction, the number of the bead wires in the layer located relatively on the outer side in the tire radial direction being larger by two or more than the number of the bead wires in the layer located on an inner side in the tire radial direction, and a misalignment amount in the tire width direction between the bead wires each located at an end portion on one side in the tire width direction being one-half of a thickness of the bead wire, and a side on which the misalignment amount between the bead wires in the first layer and the second layer is one-half of the thickness of the bead wire being opposite in the tire width direction to a side on which the misalignment amount between the bead wires in the second layer and the third layer is one-half of the thickness of the bead wire.

2. The pneumatic tire according to claim 1, wherein the bead core has a width of the bead core bottom surface in the tire meridian cross-section within a range of 35% or more and 45% or less with respect to a maximum width of the bead core.

3. The pneumatic tire according to claim 1, wherein
the bead core
has a distance in the tire width direction between an end portion on an inner side in the tire width direction on a bead core top surface that is an outer peripheral surface in the tire meridian cross-section and the vertical line on the inner side in the tire width direction within a range of 25% or more and 40% or less with respect to a maximum width of the bead core,
has a distance in the tire width direction between an end portion on the inner side in the tire width direction on the bead core bottom surface and the vertical line on the inner side in the tire width direction within a range of 25% or more and 40% or less with respect to the maximum width of the bead core, and
has the maximum width of the bead core within a range of 0.9 times or more and 1.3 times or less as large as the core height.

4. The pneumatic tire according to claim 1, wherein the carcass has an inclination angle $\theta 1p$ of the carcass cord with respect to a tire circumferential direction at a position in the tire radial direction identical to a position in the tire radial direction of a bead core top surface that is an outer peripheral surface of the bead core within a range $80°\leq\theta 1p\leq 89°$.

5. The pneumatic tire according to claim 1, wherein the bead portion has a ratio Db/Dc of a distance Db between the bead core and the carcass cord in the turned-up portion on a straight line drawn from a center of gravity position of the bead core to the outer side in the tire width direction in the tire meridian cross-section to a distance Dc on the straight line between the carcass cord in the turned-up portion and a bead portion outer surface that is a surface on an outer side in the tire width direction of the bead portion within a range of 10% or more and 15% or less.

6. The pneumatic tire according to claim 1, wherein the bead portion has a ratio Dd/BW of a distance Dd between the bead wire located on the outermost side in the tire width direction in the bead core and the bead portion outer surface, which is an outer surface in the tire width direction of the pair of bead portions, to a width BW in the tire width direction of a bead base portion that is an inner peripheral surface of the bead portion within a range of 20% or more and 25% or less.

7. The pneumatic tire according to claim 1, wherein
the bead core has an intermediate vertex projecting in a direction toward the carcass between the inner end portion in the tire radial direction of the vertical line on the outer side in the tire width direction and an end portion on an outer side in the tire width direction of the bead core bottom surface, and
the carcass has a radius of curvature of an arc of a carcass line in a range between the inner end portion in the tire radial direction of the vertical line and the end portion on the outer side in the tire width direction of the bead core bottom surface within a range of 1.0 times or more and 1.5 times or less as large as a radius of curvature of an arc passing through the inner end portion in the tire radial direction of the vertical line, the end portion on the outer side in the tire width direction of the bead core bottom surface, and the intermediate vertex.

8. The pneumatic tire according to claim 1, wherein
the bead portion comprises a rim cushion rubber on an inner side in the tire radial direction of the bead core, and
the rim cushion rubber has a modulus at 100% elongation within a range of 3.5 MPa or more and 5.5 MPa or less.

9. The pneumatic tire according to claim 1, wherein the bead portion has, in the tire meridian cross-section, an inclination angle $\theta p$ in the tire radial direction with respect to the tire width direction of a straight line connecting an intersection point between a straight line drawn in the tire width direction at a flange height and the carcass body portion to an intersection point between a straight line drawn in the tire width direction at an outermost position in the tire radial direction of the bead core and the carcass body portion within a range $60°\leq\theta p\leq 75°$.

10. The pneumatic tire according to claim 1, wherein the bead portion has, in the tire meridian cross-section, an inclination angle $\theta pu$ in the tire radial direction with respect to the tire width direction of a straight line connecting an intersection point between a straight line drawn in the tire width direction at a flange height and the carcass body portion to an intersection point between a straight line drawn in the tire width direction at a position twice as high as the flange height in the tire radial direction and the carcass body portion within a range $50°\leq\theta pu\leq 70°$.

11. The pneumatic tire according to claim 1, wherein a compression ratio of rubber located on an inner side of the bead core in the tire radial direction when the pneumatic tire is mounted on a specified rim is within a range of 40% or more and 50% or less at a center position in the tire width direction of the bead core bottom surface.

12. The pneumatic tire according to claim 1, wherein the vertical line is perpendicular to an axial direction of the bead core.

13. The pneumatic tire according to claim 1, wherein
a bead filler comprising a lower filler and an upper filler on an outer side of the bead core in the tire radial direction is disposed in the bead portion, and
the lower filler has a modulus at 100% elongation within a range of 7.5 MPa or more and 10.5 MPa or less.

14. The pneumatic tire according to claim 13, wherein the lower filler has a height in the tire radial direction from the bead core bottom surface to an end portion on an outer side in the tire radial direction of the lower filler within a range of 50% or more and 70% or less with respect to a height in the tire radial direction from the bead core bottom surface to an end portion on an outer side in the tire radial direction of the turned-up portion.

15. The pneumatic tire according to claim 13, wherein the bead filler has a ratio of an area of the lower filler to an area of the bead filler in the tire meridian cross-section in a range on an inner side in the tire radial direction from an end portion on an outer side in the tire radial direction of the turned-up portion within a range of 45% or more and 55% or less.

16. The pneumatic tire according to claim 1, wherein the bead portion has an inner diameter BIC of the bead core within a range $1.01 \leq BIC/RD \leq 1.03$ with respect to a specified rim diameter RD and a maximum width CW of the bead core within a range $0.45 \leq CW/BW \leq 0.52$ with respect to a width BW in the tire width direction of a bead base portion that is an inner peripheral surface of the bead portion, the bead base portion is formed having a plurality of tapered portions having a different inclination angle in the tire radial direction with respect to the tire width direction, and when, of the plurality of tapered portions, the tapered portion located on an outermost side in the tire width direction is a first tapered portion and the tapered portion located on an inner side of the first tapered portion in the tire width direction and connected to the first tapered portion is a second tapered portion, the second tapered portion has an inclination angle in the tire radial direction with respect to the tire width direction larger than an inclination angle in the tire radial direction with respect to the tire width direction of the first tapered portion.

17. The pneumatic tire according to claim 16, wherein the bead base portion has a bent portion that is a connecting portion between the first tapered portion and the second tapered portion and is located more on an inner side in the tire width direction than a center position in the tire width direction of the bead core bottom surface.

18. The pneumatic tire according to claim 16, wherein the first tapered portion has the inclination angle in the tire radial direction with respect to the tire width direction of 5° or more.

19. The pneumatic tire according to claim 18, wherein the first tapered portion has the inclination angle in the tire radial direction with respect to the tire width direction within a range of 5° or more and 10° or less.

20. The pneumatic tire according to claim 16, wherein the second tapered portion has the inclination angle in the tire radial direction with respect to the tire width direction within a range of 10° or more and 35° or less.

21. The pneumatic tire according to claim 16, wherein the bead base portion has a relationship between a width T1 in the tire width direction of the first tapered portion and the width BW in the tire width direction of the bead base portion within a range $0.45 \leq T1/BW \leq 0.85$.

22. The pneumatic tire according to claim 16, wherein the bead base portion has a relationship between a width T2 in the tire width direction of the second tapered portion and the width BW in the tire width direction of the bead base portion within a range $0.15 \leq T2/BW \leq 0.55$.

23. The pneumatic tire according to claim 1, wherein a reinforcing layer is disposed along the carcass at least on an inner side of the carcass body portion in the tire width direction in the bead portion.

24. The pneumatic tire according to claim 23, wherein the reinforcing layer is a steel reinforcing layer including a steel cord, the steel reinforcing layer is disposed folded back along the carcass from the inner side in the tire width direction to the outer side in the tire width direction of the bead core and has an end portion located on the inner side of the bead core in the tire width direction and an end portion located on the outer side of the bead core in the tire width direction both located more on an outer side in the tire radial direction of a core top surface that is an outer peripheral surface of the bead core, and the steel cord included in the steel reinforcing layer has an inclination angle $\theta rf1$ with respect to the tire circumferential direction at a position in the tire radial direction identical to a position in the tire radial direction of the core top surface within a range $20° \leq \theta rf1 \leq 65°$.

25. The pneumatic tire according to claim 24, wherein the steel reinforcing layer has a height Hrf11 in the tire radial direction from a rim diameter reference position of an inner edge that is an end portion located on the inner side of the bead core in the tire width direction within a range $0.55 \leq Hrf11/Rh \leq 1.10$ with respect to a flange height Rh.

26. The pneumatic tire according to claim 24, wherein the steel reinforcing layer has a height Hrf12 in the tire radial direction from a rim diameter reference position of an outer edge that is an end portion located on the outer side of the bead core in the tire width direction within a range $0.40 \leq Hrf12/Rh \leq 0.95$ with respect to a flange height Rh.

27. The pneumatic tire according to claim 23, wherein the reinforcing layer comprises a plurality of the reinforcing layers including a plurality of cords disposed layered, and the reinforcing layers adjacent to each other of the plurality of the reinforcing layers have inclination directions of the cords in the tire circumferential direction with respect to the tire radial direction opposite to each other.

28. The pneumatic tire according to claim 27, wherein the reinforcing layer comprises three reinforcing layers, the three reinforcing layers each have an inner edge height that is a height in the tire radial direction from a rim diameter reference position of an end portion on an outer side in the tire radial direction located on the inner side of the bead core in the tire width direction in the tire meridian cross-section, each inner edge height being different from each other, of the three reinforcing layers, the inner edge height of a first reinforcing layer, which is the reinforcing layer adjacent to the carcass, is Hrf11, the inner edge height of a second reinforcing layer, which is the reinforcing layer adjacent to the first reinforcing layer on a surface side opposite to a side of the first reinforcing layer on which the carcass is located, is Hrf21, the inner edge height of a third reinforcing layer, which is the reinforcing layer adjacent to the second reinforcing layer on a surface side opposite to a side of the second reinforcing layer on which the first reinforcing layer is located, is Hrf31, a flange height is RH, and the respective inner edge heights and the flange height have relationships satisfying $0.55 \leq Hrf11/Rh \leq 1.10$, $1.05 \leq Hrf21/Rh \leq 1.40$, and $1.25 \leq Hrf31/Rh \leq 1.60$.

29. The pneumatic tire according to claim 28, wherein the first reinforcing layer is disposed folded back along the carcass from the inner side in the tire width direction to the outer side in the tire width direction of the bead core, and an outer edge height Hrf12, which is a height in the tire radial direction from the rim diameter reference position of an end portion of the first reinforcing layer on a side located on the outer side of the bead core in the tire width direction, and the flange height Rh have a relationship satisfying 0.40≤Hrf12/Rh≤0.95.

30. The pneumatic tire according to claim 28, wherein the second reinforcing layer has a relationship between a height Hrf22 in the tire radial direction from the rim diameter reference position of an end portion on an inner side in the tire radial direction of the second reinforcing layer and the flange height Rh satisfying 0.05≤Hrf22/Rh≤0.35, and
the third reinforcing layer has a relationship between a height Hrf32 in the tire radial direction from the rim diameter reference position of an end portion on an inner side in the tire radial direction of the third reinforcing layer and the flange height Rh satisfying 0.20≤Hrf32/Rh≤0.50.

31. The pneumatic tire according to claim 28, wherein
the cord included in the first reinforcing layer has an inclination angle θrf1 with respect to the tire circumferential direction at a position in the tire radial direction identical to a position in the tire radial direction of an outermost portion in the tire radial direction of the bead core within a range 20°≤θrf1≤65°,
the cord included in the second reinforcing layer has an inclination angle θrf2 with respect to the tire circumferential direction at a position in the tire radial direction identical to the position in the tire radial direction of the outermost portion in the tire radial direction of the bead core within a range −65°≤θrf2≤−20°, and
the cord included in the third reinforcing layer has an inclination angle θrf3 with respect to the tire circumferential direction at a position in the tire radial direction identical to the position in the tire radial direction of the outermost portion in the tire radial direction of the bead core within a range 20°≤θrf3≤65°.

32. The pneumatic tire according to claim 23, wherein
the reinforcing layer comprises at least two reinforcing layers,
of the two reinforcing layers, a first reinforcing layer, which is the reinforcing layer adjacent to the carcass, is disposed folded back along the carcass from the inner side in the tire width direction to the outer side in the tire width direction of the bead core and is thus disposed extending at least between a position identical to a position in the tire radial direction of an innermost portion in the tire width direction of the bead core and a position identical to a position in the tire radial direction of an outermost portion in the tire width direction of the bead core,
of the two reinforcing layers, a second reinforcing layer, which is the reinforcing layer adjacent to the first reinforcing layer at a surface side opposite to a side of the first reinforcing layer on which the carcass is located, has an end portion on an outer side in the tire radial direction in a portion located on the inner side of the carcass body portion in the tire width direction, the end portion being located more on an outer side in the tire radial direction than an end portion on an outer side in the tire radial direction in a portion of the first reinforcing layer located on the inner side in the tire width direction of the carcass body portion, and
an end portion on an opposite side of the second reinforcing layer is located more on an inner side in the tire width direction than an end portion on an inner side in the tire width direction of the bead core bottom surface or more on an outer side in the tire width direction than an end portion on an outer side in the tire width direction of the bead core bottom surface.

33. The pneumatic tire according to claim 32, wherein
the first reinforcing layer is a steel reinforcing layer including a steel cord, and
the second reinforcing layer is an organic fiber reinforcing layer including an organic fiber cord.

34. A method for manufacturing a pneumatic tire,
the pneumatic tire comprising:
a pair of bead portions disposed on both respective sides of a tire equatorial plane in a tire width direction;
a bead core disposed in each of the pair of bead portions, formed by winding a bead wire in a ring shape, and having a polygonal cross-sectional shape in a tire meridian cross-section; and
a carcass comprising a carcass body portion disposed extending between the pair of bead portions and a turned-up portion formed continuously from the carcass body portion and folded back from an inner side in the tire width direction to an outer side in the tire width direction of the bead core, the carcass being formed by coating a carcass cord with a coating rubber,
the method comprising:
causing the bead core to have a portion located on an innermost side in the tire width direction and a portion located on an outermost side in the tire width direction in a contour in the tire meridian cross-section each formed as a vertical line extending along a tire radial direction, where the vertical line is defined as an imaginary straight line contacting a plurality of exposed portions of the bead wire respectively located at the innermost side and the outermost side in the tire width direction when the pneumatic tire is mounted on a specified rim;
causing the vertical line to have a length within a range of 20% or more and 30% or less with respect to a core height that is a height of the bead core in the tire radial direction, where an inner end portion and an outer end portion in the tire radial direction of the vertical line are defined as exposed portions each located at innermost and outermost sides in the tire radial direction among the plurality of exposed portions contacted by the imaginary straight line, and the length of the vertical line is defined as a distance in the tire radial direction between the inner end portion and the outer end portion;
causing the vertical line to have a distance in the tire radial direction from a bead core bottom surface that is an inner peripheral surface of the bead core to an inner end portion in the tire radial direction of the vertical line within a range of 30% or more and 40% or less with respect to the core height;
causing the length of the vertical line to be within a range of 20% or more and 28% or less with respect to the core height that is the height of the bead core in the tire radial direction,
in the bead core, aligning a plurality of circumferential portions of the bead wire wound in a ring shape in the tire width direction to form a layer and layering a plurality of the layers in the tire radial direction;
for a first layer that is the layer located on an innermost circumference in the tire radial direction, a second layer that is the layer layered on an outer side of and adjacent to the first layer in the tire radial direction, and a third layer that is the layer layered on an outer side of and adjacent to the second layer in the tire radial direction of the plurality of the layers,
in two of the layers adjacent to each other in the tire radial direction, making the number of the bead wires in the layer located relatively on the outer side in the tire radial direction larger by two or more than the number of the bead wires in the layer located on an inner side in the tire radial direction and making a misalignment amount in the tire width direction between the bead wires each located at an end portion on one side in the tire width direction one-half of a thickness of the bead wire; and making a side on which the misalignment amount between the bead wires in the first layer and the second layer is one-half of the thickness of the bead wire opposite in the tire width direction to a side on which the misalignment amount between the bead wires in the second layer and the third layer is one-half of the thickness of the bead wire.

35. The method for manufacturing a pneumatic tire according to claim 34, wherein the bead wire starts to be wound from an end portion on an outer side in the tire width direction in the first layer.

36. The method for manufacturing a pneumatic tire according to claim 34, wherein the bead portion is made to have a ratio Db/Dc of a distance Db between the bead core and the carcass cord in the turned-up portion on a straight line drawn from a center of gravity position of the bead core to the outer side in the tire width direction in the tire meridian cross-section to a distance Dc on the straight line between the carcass cord in the turned-up portion and a bead portion outer surface that is a surface on an outer side in the tire width direction of the bead portion within a range of 10% or more and 15% or less.

37. The method for manufacturing a pneumatic tire according to claim 34, comprising causing the bead portion to have, in the tire meridian cross-section, an inclination angle θp in the tire radial direction with respect to the tire width direction of a straight line connecting an intersection point between a straight line drawn in the tire width direction at a flange height and the carcass body portion to an intersection point between a straight line drawn in the tire width direction at an outermost position in the tire radial direction of the bead core and the carcass body portion within a range $60°≤θp≤75°$.

38. The method for manufacturing a pneumatic tire according to claim 34, comprising:

causing the bead portion to have an inner diameter BIC of the bead core within a range $1.01≤BIC/RD≤1.03$ with respect to a specified rim diameter RD and a maximum width CW of the bead core within a range $0.45≤CW/BW≤0.52$ with respect to a width BW in the tire width direction of a bead base portion that is an inner peripheral surface of the bead portion;

forming the bead base portion having a plurality of tapered portions having a different inclination angle in the tire radial direction with respect to the tire width direction; and when, of the plurality of tapered portions, the tapered portion located on an outermost side in the tire width direction is a first tapered portion and the tapered portion located on an inner side of the first tapered portion in the tire width direction and connected to the first tapered portion is a second tapered portion, causing the second tapered portion to have an inclination angle in the tire radial direction with respect to the tire width direction larger than an inclination angle in the tire radial direction with respect to the tire width direction of the first tapered portion.

39. The method for manufacturing a pneumatic tire according to claim 34, wherein the vertical line is perpendicular to an axial direction of the bead core.

40. A pneumatic tire, comprising:

a pair of bead portions disposed on both respective sides of a tire equatorial plane in a tire width direction;

a bead core disposed in each of the pair of bead portions, formed by winding a bead wire in a ring shape, and having a polygonal cross-sectional shape in a tire meridian cross-section; and a carcass comprising a carcass body portion disposed extending between the pair of bead portions and a turned-up portion formed continuously from the carcass body portion and folded back from an inner side in the tire width direction to an outer side in the tire width direction of the bead core, the carcass being formed by coating a carcass cord with a coating rubber, the bead core having a portion located on an innermost side in the tire width direction and a portion located on an outermost side in the tire width direction in a contour in the tire meridian cross-section each formed as a vertical line extending along a tire radial direction, where the vertical line is defined as an imaginary straight line contacting a plurality of exposed portions of the bead wire respectively located at the innermost side and the outermost side in the tire width direction when the pneumatic tire is mounted on a specified rim, the vertical line having a length within a range of 20% or more and 30% or less with respect to a core height that is a height of the bead core in the tire radial direction, where an inner end portion and an outer end portion in the tire radial direction of the vertical line are defined as exposed portions each located at innermost and outermost sides in the tire radial direction among the plurality of exposed portions contacted by the imaginary straight line, and the length of the vertical line is defined as a distance in the tire radial direction between the inner end portion and the outer end portion, the vertical line having a distance in the tire radial direction from a bead core bottom surface that is an inner peripheral surface of the bead core to an inner end portion in the tire radial direction of the vertical line within a range of 30% or more and 40% or less with respect to the core height, in the bead core, a plurality of circumferential portions of the bead wire wound in a ring shape being aligned in the tire width direction to form a layer, and a plurality of the layers being layered in the tire radial direction, for a first layer that is the layer located on an innermost circumference in the tire radial direction, a second layer that is the layer layered on an outer side of and adjacent to the first layer in the tire radial direction, and a third layer that is the layer layered on an outer side of and adjacent to the second layer in the tire radial direction of the plurality of the layers, in two of the layers adjacent to each other in the tire radial direction, the number of the bead wires in the layer located relatively on the outer side in the tire radial direction being larger by two or more than the number of the bead wires in the layer located on an inner side in the tire radial direction, and a misalignment amount in the tire width direction between the bead wires each located at an end portion on one side in the tire width direction being one-half of a thickness of the bead wire, a side on which the misalignment amount between the bead wires in the first layer and the second layer is one-half of the thickness of the bead wire being opposite in the tire width direction to a side on which the misalignment amount between the bead wires in the second layer and the third layer is one-half of the thickness of the bead wire, and the bead core having a distance in the tire width direction between an end portion on an inner side in the tire width direction on a bead core top surface that is an outer peripheral surface in the tire meridian cross-section and the vertical line on the inner side in the tire width direction within a range of 25% or more and 40% or less with respect to a maximum width of the bead core.

41. A pneumatic tire, comprising:

a pair of bead portions disposed on both respective sides of a tire equatorial plane in a tire width direction;

a bead core disposed in each of the pair of bead portions, formed by winding a bead wire in a ring shape, and having a polygonal cross-sectional shape in a tire meridian cross-section; and a carcass comprising a carcass body portion disposed extending between the pair of bead portions and a turned-up portion formed continuously from the carcass body portion and folded back from an inner side in the tire width direction to an outer side in the tire width direction of the bead core, the carcass being formed by coating a carcass cord with a coating rubber, the bead core having a portion located on an innermost side in the tire width direction and a portion located on an outermost side in the tire width direction in a contour in the tire meridian cross-section each formed as a vertical line extending along a tire radial direction, where the vertical line is defined as an imaginary straight line contacting a plurality of exposed portions of the bead wire respectively located at the innermost side and the outermost side in the tire width direction when the pneumatic tire is mounted on a specified rim, the vertical line having a length within a range of 20% or more and 30% or less with respect to a core height that is a height of the bead core in the tire radial direction, where an inner end portion and an outer end portion in the tire radial direction of the vertical line are defined as exposed portions each located at innermost and outermost sides in the tire radial direction among the plurality of exposed portions contacted by the imaginary straight line, and the length of the vertical line is defined as a distance in the tire radial direction between the inner end portion and the outer end portion, the vertical line having a distance in the tire radial direction from a bead core bottom surface that is an inner peripheral surface of the bead core to an inner end portion in the tire radial direction of the vertical line within a range of 30% or more and 40% or less with respect to the core height, in the bead core, a plurality of circumferential portions of the bead wire wound in a ring shape being aligned in the tire width direction to form a layer, and a plurality of the layers being layered in the tire radial direction, for a first layer that is the layer located on an innermost circumference in the tire radial direction, a second layer that is the layer layered on an outer side of and adjacent to the first layer in the tire radial direction, and a third layer that is the layer layered on an outer side of and adjacent to the second layer in the tire radial direction of the plurality of the layers, in two of the layers adjacent to each other in the tire radial direction, the number of the bead wires in the layer located relatively on the outer side in the tire radial direction being larger by two or more than the number of the bead wires in the layer located on an inner side in the tire radial direction, and a misalignment amount in the tire width direction between the bead wires each located at an end portion on one side in the tire width direction being one-half of a thickness of the bead wire, a side on which the misalignment amount between the bead wires in the first layer and the second layer is one-half of the thickness of the bead wire being opposite in the tire width direction to a side on which the misalignment amount between the bead wires in the second layer and the third layer is one-half of the thickness of the bead wire, and the misalignment amount in the tire width direction between the bead wires each located at an end portion on inner end portions in the tire width direction of the first layer and the second layer being one-half of the thickness of the bead wire.

* * * * *